(12) United States Patent
Ballard et al.

(10) Patent No.: US 9,460,314 B2
(45) Date of Patent: Oct. 4, 2016

(54) SYSTEMS AND METHODS FOR PROVIDING TASK-BASED INSTRUCTIONS

(71) Applicants: Brian Adams Ballard, Herndon, VA (US); James Leighton Athey, Washington, DC (US); Wonjae Kim, Arlington, VA (US); Jeffrey Edward Jenkins, Clarksburg, MD (US); Edward Robert English, Falls Church, VA (US); Todd Richard Reily, Stoneham, MA (US); Michael Anthony Sciscenti, Ashburn, VA (US)

(72) Inventors: Brian Adams Ballard, Herndon, VA (US); James Leighton Athey, Washington, DC (US); Wonjae Kim, Arlington, VA (US); Jeffrey Edward Jenkins, Clarksburg, MD (US); Edward Robert English, Falls Church, VA (US); Todd Richard Reily, Stoneham, MA (US); Michael Anthony Sciscenti, Ashburn, VA (US)

(73) Assignee: APX LABS, INC., Herndon, VA (US)

( * ) Notice: Subject to any disclaimer, the term of this patent is extended or adjusted under 35 U.S.C. 154(b) by 0 days.

(21) Appl. No.: 14/556,607

(22) Filed: Dec. 1, 2014

(65) Prior Publication Data

US 2015/0153571 A1 Jun. 4, 2015

Related U.S. Application Data

(60) Provisional application No. 61/910,419, filed on Dec. 1, 2013, provisional application No. 61/910,425, filed on Dec. 1, 2013, provisional application No. 62/043,759, filed on Aug. 29, 2014.

(51) Int. Cl.
| | |
|---|---|
| *G09G 5/00* | (2006.01) |
| *G06F 21/71* | (2013.01) |
| *G06F 3/01* | (2006.01) |
| *G06F 3/0482* | (2013.01) |

(Continued)

(52) U.S. Cl.
CPC ............ *G06F 21/71* (2013.01); *A45C 11/00* (2013.01); *G02B 27/017* (2013.01); *G06F 3/012* (2013.01); *G06F 3/013* (2013.01); *G06F 3/017* (2013.01); *G06F 3/0482* (2013.01); *G06F 3/0485* (2013.01); *G06F 3/0487* (2013.01); *G06F 3/04812* (2013.01); *G06F 3/04842* (2013.01); *G06F 3/167* (2013.01); *G06T 19/006* (2013.01); *H04L 12/1822* (2013.01); *H04L 67/18* (2013.01); *H04M 1/72569* (2013.01); *H04W 4/08* (2013.01); *H04W 12/08* (2013.01); *H04W 76/02* (2013.01); *A45C 2011/002* (2013.01); *G02B 2027/0178* (2013.01)

(58) Field of Classification Search
CPC ............ G06F 3/04842; G02B 27/017; G02B 2027/0178
USPC .................... 345/7, 8, 156; 349/11
See application file for complete search history.

(56) References Cited

U.S. PATENT DOCUMENTS

| | | | |
|---|---|---|---|
| 8,749,573 B2* | 6/2014 | Ali et al. | 345/592 |
| 2002/0054130 A1* | 5/2002 | Abbott, III | G06Q 10/109 715/783 |

(Continued)

*Primary Examiner* — Jennifer Nguyen
(74) *Attorney, Agent, or Firm* — Finnegan, Henderson, Farabow, Garrett & Dunner LLP

(57) ABSTRACT

Systems and methods allow a user to interact with an augmented reality device. In one implementation, a wearable device for providing task-based instructions to a user includes a display; a network interface; a data input device configured to capture information relating to progress of a task; and at least one processing device. The at least one processing device is configured to provide to a server system, via the network interface, the captured information relating to progress of the task; receive from the server system, via the network interface, information relating to a next step in the task; and cause the information relating to the next step in the task to be shown on the display.

26 Claims, 33 Drawing Sheets

(51) Int. Cl.

| | | |
|---|---|---|
| *G06F 3/0484* | (2013.01) | |
| *G02B 27/01* | (2006.01) | |
| *G06T 19/00* | (2011.01) | |
| *G06F 3/0485* | (2013.01) | |
| *G06F 3/16* | (2006.01) | |
| *G06F 3/0487* | (2013.01) | |
| *H04L 12/18* | (2006.01) | |
| *H04L 29/08* | (2006.01) | |
| *A45C 11/00* | (2006.01) | |
| *H04M 1/725* | (2006.01) | |
| *H04W 4/08* | (2009.01) | |
| *H04W 76/02* | (2009.01) | |
| *G06F 3/0481* | (2013.01) | |
| *H04W 12/08* | (2009.01) | |

(56) References Cited

U.S. PATENT DOCUMENTS

2014/0071288 A1\* 3/2014 Kim ............................. 348/158
2014/0176603 A1\* 6/2014 Kumar et al. ................ 345/633
2014/0337634 A1\* 11/2014 Starner ................ H04L 9/3231
              713/186

\* cited by examiner

SYSTEMS AND METHODS FOR PROVIDING TASK-BASED INSTRUCTIONS

CROSS-REFERENCES TO RELATED APPLICATIONS

This application claims the benefit of priority of U.S. Provisional Patent Application No. 61/910,419, filed on Dec. 1, 2013, U.S. Provisional Patent Application No. 61/910,425, filed on Dec. 1, 2013, and U.S. Provisional Patent Application No. 62/043,759, filed on Aug. 29, 2014, all of which are incorporated herein by reference in their entirety.

TECHNICAL FIELD

The present disclosure relates generally to an augmented reality device and, more particularly, to methods and systems for representing and interacting with augmented reality content using the augmented reality device.

BACKGROUND

Technology advances have enabled mobile personal computing devices to become more capable and ubiquitous. In many cases, these devices will have both a display as well as a combination of sensors. For example, the devices may include GPS, accelerometers, gyroscopes, cameras, light meters, and compasses or some combination thereof. These devices may include mobile computing devices as well as head mounted displays.

Additionally, these mobile personal computing devices are increasingly capable of both displaying information for the user as well as supplying contextual information to other systems and applications on the device. Such contextual information can be used to determine the location, orientation and movement of the user interface display of the device.

SUMMARY

Embodiments consistent with the present disclosure provide an apparatus and methods for representing and interacting with augmented reality content.

Consistent with a disclosed embodiment, a wearable device provides a virtual menu to a user. The wearable device may include a display; at least one sensor configured to provide an output indicative of an orientation of a head of the user; and at least one processing device. The at least one processing device may be configured to monitor an orientation of the head of the user based on the output of the at least one sensor, determine based on the monitored orientation of the head whether the user is looking upward or downward with respect to a predetermined horizontal threshold; and cause the virtual menu to be shown on the display if the user is determined to be looking upward or downward with respect to the predetermined horizontal threshold.

Consistent with another disclosed embodiment, a method provides a virtual menu to a user of a wearable device. The method may include monitoring, based on output of at least one sensor, an orientation of a head of the user; determining based on the monitored orientation of the head whether the user is looking upward or downward with respect to a predetermined horizontal threshold; and causing the virtual menu to be shown on a display of the wearable device if the user is determined to be looking upward or downward with respect to the predetermined horizontal threshold.

Consistent with another disclosed embodiment, a wearable device provides a virtual menu to a user. The wearable device may include a display; at least one sensor configured to provide an output indicative of a viewing direction of the user, and at least one processing device. The at least one processing device may be configured to cause a virtual menu to be shown on the display, the virtual menu including at least one selectable element; monitor a viewing direction of the user based on the output of the at least one sensor; determine, based on the monitored viewing direction, whether the user is looking in a direction of the at least one selectable element of the virtual menu; determine an amount of time that the user looks in the direction of the at least one selectable element of the virtual menu; and cause at least one action associated with the at least one selectable element of the virtual menu if the amount of time exceeds a predetermined dwell time threshold.

Consistent with another disclosed embodiment, a method provides a virtual menu to a user of a wearable device. The method may include causing a virtual menu to be shown on a display of the wearable device, wherein the virtual menu includes at least one selectable element; monitoring, based on output of at least one sensor, a viewing direction of the user; determining, based on the monitored viewing direction, whether the user is looking in a direction of the at least one selectable element of the virtual menu; determining an amount of time that the user looks in the direction of the at least one selectable element of the virtual menu; and causing at least one action associated with the at least one selectable element of the virtual menu if the amount of time exceeds a predetermined dwell time threshold.

Consistent with another disclosed embodiment, a wearable device provides a virtual menu to a user. The wearable device may include a display; at least one sensor configured to provide an output indicative of a viewing direction of the user, and at least one processing device. The at least one processing device may be configured to monitor a viewing direction of the user based on the output of the at least one sensor; provide a menu on the display; determine, based on the monitored viewing direction, whether the user is looking in a direction of the location of the menu on the display; and expand the menu if the user is determined to be looking in the direction of the location of the menu on the display.

Consistent with another disclosed embodiment, a method provides a virtual menu to a user of a wearable device. The method may include monitoring, based on output of at least one sensor, a viewing direction of the user, providing a menu on a display of the wearable device; determining, based on the monitored viewing direction, whether the user is looking in a direction of the location of the menu on the display; and expanding the menu if the user is determined to be looking in the direction of the location of the menu on the display.

Consistent with a disclosed embodiment, a wearable device establishes a communication path with a user of the wearable device and at least one individual. The wearable device includes a display; at least one sensor configured to provide an output indicative of a viewing direction of the user; and at least one processing device. The at least one processing device is configured to monitor the viewing direction of the user based on the output of the at least one sensor; determine, based on the monitored viewing direction, whether the user is looking in the direction of the at least one individual; and establish the communication path between the user and the at least one individual if the user is determined to be looking in the direction of the at least one individual.

Consistent with another disclosed embodiment, a method establishes a communication path with a user of a wearable device and at least one individual. The method includes monitoring, based on an output of at least one sensor, a viewing direction of the user; determining, based on the monitored viewing direction, whether the user is looking in the direction of the at least one individual; and establishing the communication path between the user and the at least one individual if the user is determined to be looking in the direction of the at least one individual.

Consistent with a disclosed embodiment, a lockable, wearable device is provided. The wearable device comprise a display, at least one sensor configured to provide an output indicative of a viewing direction of a user, and at least one processing device. The at least one processing device is configured to track a pattern of the viewing direction of the user; and unlock the lockable, wearable device to provide the user with access to information on the display of the device when the tracked pattern of movement matches a predetermined pattern of movement.

Consistent with another disclosed embodiment, a lockable, wearable device is provided. The wearable device comprise a display; at least one sensor configured to provide an output indicative of a viewing direction of a user; and at least one processing device. The at least one processing device is configured to cause an array of graphical objects to be shown on the display of the wearable device; detect selection by the user of at least two graphical objects from among the array of graphical objects based on the output indicative of the viewing direction of the user; and unlock the lockable, wearable device to provide the user with access to information on the display of the device based on whether the detected selection of the at least two graphical objects matches a predetermined object selection sequence.

Consistent with another disclosed embodiment, a method unlocks a wearable device. The method includes tracking, using at least one sensor of the wearable device, a viewing direction of a user of the wearable device; and unlocking the wearable device to provide the user with access to information on a display of the wearable device when the tracked viewing direction matches a predetermined pattern of movement.

Consistent with another disclosed embodiment, a method unlocks a wearable device. The method includes causing an array of graphical objects to be shown on a display of the wearable device; detecting selection by the user of at least two graphical objects from among the array of graphical objects based on an output of at least one sensor of the wearable device, wherein the output is indicative of a viewing direction of a user of the wearable device; and unlocking the wearable device to provide the user with access to information of a display of the device based on whether the detected selection of the at least two graphical objects matches a predetermined object selection sequence.

Consistent with another disclosed embodiment, a wearable device provides task-based instructions to a user. The wearable device may include a display; a network interface; a data input device configured to capture information relating to progress of a task; and at least one processing device. The at least one processing device may be configured to provide to a server system, via the network interface, the captured information relating to progress of the task; receive from the server system, via the network interface, information relating to a next step in the task; and cause the information relating to the next step in the task to be shown on the display.

Consistent with another disclosed embodiment, a method provides task-based instructions to a user of a wearable device. The method may include capturing, via a data input device of the wearable device, information relating to progress of a task; providing to a server system, via a network interface, the captured information relating to progress of the task; receiving from the server system, via the network interface, information relating to a next step in the task; and causing the information relating to the next step in the task to be shown on a display of the wearable device.

Consistent with another disclosed embodiment, a wearable device controls operation of an on-board component. The wearable device may include a display; at least one sensor configured to provide an output indicative of a viewing direction of a user; and at least one processing device. The at least one processing device may be configured to cause at least one graphical icon associated with a control of at least one aspect of the on-board component to be shown on the display such that the user perceives the location of the at least one graphical icon as fixed relative to real world coordinates; determine, based on the output of the at least one sensor, whether the user is looking in a direction of the at least one graphical icon; and initiate the control of the at least one aspect of the on-board component when the user is determined to be looking in the direction of the at least one graphical icon.

Consistent with another disclosed embodiment, a method controls operation of an on-board component of a wearable device. The method may include causing at least one graphical icon associated with a control of at least one aspect of the on-board component to be shown on a display of the wearable device such that the user perceives the location of the at least one graphical icon as fixed relative to real world coordinates; determining, based on an output of at least one sensor of the wearable device configured to provide an output indicative of a viewing direction of the user of the wearable device, whether the user is looking in a direction of the at least one graphical icon; and initiating the control of the at least one aspect of the on-board component when the user is determined to be looking in the direction of the at least one graphical icon.

Consistent with another disclosed embodiment, a system interacts with and shares information between a plurality of users of a corresponding plurality of wearable devices. The system may include a network interface; and at least one processing device. The at least one processing device may be configured to receive, via the network interface, information from a first wearable device; select from the plurality of wearable devices one or more designated wearable devices to receive the information; and send, via the network interface, the information to the one or more designated wearable devices.

Consistent with another disclosed embodiment, a method interacts with and shares information between a plurality of users of a corresponding plurality of wearable devices. The method may include receiving, via a network interface, information from a first wearable device; selecting from the plurality of wearable devices one or more designated wearable devices to receive the information; and sending, via the network interface, the information to the one or more designated wearable devices.

Consistent with other disclosed embodiments, non-transitory computer-readable storage media may store program instructions, which are executed by at least one processor and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
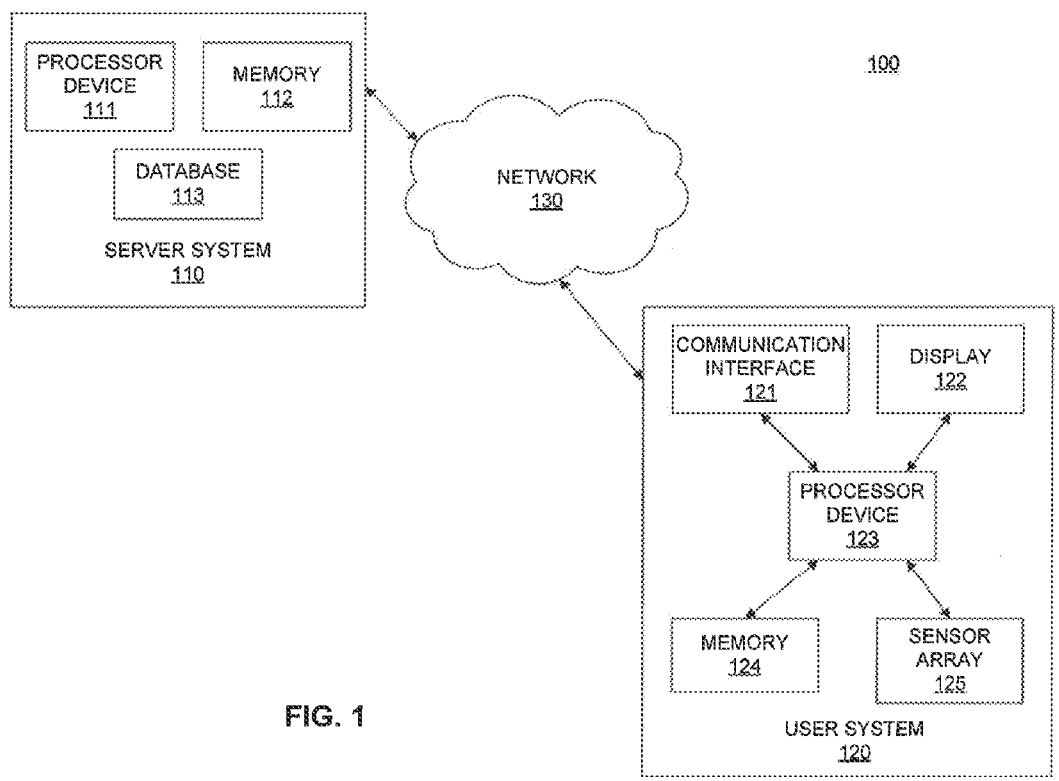
FIG. 1 illustrates an exemplary system for implementing disclosed embodiments.

Mobile personal computing devices may include one or more portable displays used to overlay virtual objects with real world objects. Virtual content that relates to one or more real world objects (e.g., places, things, people, etc.) and that may be provided on a display may be referred to as Augmented Reality (AR) content. Such AR content may be provided on a display together with the real world objects to which the AR content relates. Further, the views of the real world objects on a display may correspond to computer-generated representations of those objects or, in some embodiments (e.g., where at least a portion of the display passes or channels light), may correspond to actual, non-computer-generated views of the objects.

In some embodiments, a device may provide various menus from which a user may select. For example, in one embodiment, a wearable augmented reality device may provide a menu that appears to hover over a user's head and outside of the user's field of view when the user is looking at the horizon. To access the menu, the user looks up toward the spot where the user perceives the menu to be located. For example, in one embodiment, the wearable augmented reality device may provide a user interface that enables a user to select a menu item by looking at the menu item. In another embodiment, the wearable augmented reality device may provide a nested menu system that enables the user to look toward a menu shown on a display, select the menu, and expand the menu upon selection. In another embodiment, a system may provide the capability to monitor the progress of a task assigned to a particular user of a wearable augmented reality device. As steps in the task are completed, information relating to the next steps is passed to the user.

Users of AR systems may wish to control other devices. For example, in another embodiment, a wearable augmented reality device may provide an interface for controlling the operation of a camera without relying upon voice or button activated controls.

Users of AR systems may also wish to communication with other users. Accordingly, in another embodiment, a system may allow a user of a wearable augmented reality device to establish a communication connection with another individual or group of individuals using wearable augmented reality devices by looking in the direction of those individuals or group. In another embodiment, a one-to-many system may enable sharing of information between multiple wearable augmented reality device users. For example, information available to a particular user can be made available to multiple other users by showing that information on the displays of the multiple users.

Users of such devices may also wish for their content to be secure from being accessed by unauthorized users. Accordingly, in another embodiment, a wearable augmented reality device may provide a technique for locking and unlocking the device such that information stored on the device or conveyed to and from the device remains protected and accessible only by the intended/authorized user.

FIG. 1 illustrates an exemplary system 100 for implementing the disclosed embodiments. In one aspect, system 100 may include a server system 110, a user system 120, and network 130. It should be noted that although a single user system 120 is shown in FIG. 1, more than one user system 120 may exist in system 100. Furthermore, although a single server system 110 is shown in FIG. 1, more than one server system 110 may exist in system 100.

Server system 110 may be a system configured to provide and/or manage services associated with providing AR content to users. Consistent with the disclosure, server system 110 may provide AR content to user system 120 based on information received from user system 120. For example, server system 110 may provide AR content to user system 120 based on a detected position, detected position change, or detected/determined context of user system 120. Such AR content may also be provided to user system 120 based upon requests received from user system 120 or based on a detected and/or recognized object within a field of view of an imaging device associated with user system 120. In general, any type of AR content, including any desired form of information, can be provided from server system 110 to user system 120 based on the requirements of a particular application. Further, any suitable trigger may be used to initiate transfer and/or updating of AR content provided to user system 120 by server system 110.

Server system 110 may include one or more components that perform processes consistent with the disclosed embodiments. For example, server system 110 may include one or more computers, e.g., processor device 111, a CPU, and/or other hardware-based applications processing devices, configured to execute software instructions programmed to perform aspects of the disclosed embodiments. Such software instructions may be stored, for example, in database 113 and when implemented may create and/or maintain a global coordinate system, provide AR objects to user systems for display, transmit information associated with the AR objects to user system 120, or any other relevant function. In one aspect, database 113 may be co-located with server system 110. Alternatively, database 113 may be located remotely from the server system 110. Database 113 may include computing components (e.g., database management system, database server, etc.) configured to receive and process requests for data stored in memory devices of database(s) 113 and to provide data from database 113.

User system 120 may include a system associated with a user (e.g., a consumer, field technician, equipment operator, or any other individual that may benefit from received AR content) that is configured to perform one or more operations consistent with the disclosed embodiments. In one embodiment, a user may operate user system 120 to perform one or more such operations. User system 120 may include a communication interface 121, a processor device 123, a memory 124, a sensor array 125, a display 122, and/or any other components that may facilitate the display of AR content to the user. The processor device 123 may be configured to execute software instructions to perform aspects of the disclosed embodiments. User system 120 may be configured in the form of an AR device, such as a head mounted display (HMD). Although in the present disclosure user system 120 is described in connection with a HMD, user system 120 may include tablet devices, mobile phone(s), laptop computers, a wearable device, such as a smart watch, and any other computing device(s) known to those skilled in the art.

Communication interface 121 may include one or more communication components, such as cellular, WiFi, Bluetooth transceivers, or any other wireless transceivers or communication equipment. Communication interface 121 may package and send user commands or input across network 130 to server system 110. Based on these commands and/or input, server system may return additional or updated AR content to be displayed to the user by user system 120. This additional or updated AR content, or instructions for providing the additional or updated AR content, may be received from server system 110 via communication interface 121. Processor device 123 may access and use information received via communication interface 121.

Display 122 may include any suitable display for providing AR content to a user. For example, in some embodiments, display 122 may include one or more translucent, transparent, or semi-transparent components configured to pass at least some light from a scene to the eyes of a user. Display 122 may also include opaque lenses or components, e.g., where the images seen by the user are computer-generated, constitute light-guided projections of real world objects, or include images captured by one or more cameras (or other image acquisition devices) associated with user system 120. In such embodiments, generated, captured, and/or light-guided images of real world objects may be projected onto opaque or semi-opaque components associated with display 122. Display 122 may also project information using holographic images.

Sensor array 125 may include any type of sensor configured to provide an output signal useful in providing AR content to a user. In some embodiments, sensor array 125 may include one or more GPS sensors, cameras, barometric sensors, proximity sensors, physiological monitoring sensors, chemical sensors, magnetometers, gyroscopes, accelerometers, bar code scanners, motion detectors, image sensors, depth sensors, eye tracking sensors, etc.

Processor devices 111 and 123 may include one or more suitable hardware-based processing devices, such as a microprocessor, controller, central processing unit, etc. that can execute software-based instructions. In some embodiments, processor devices 111 and/or 123 may include a microprocessor from the OMAP family manufactured by Texas Instruments, the Snapdragon™ family manufactured by Qualcomm™, or any of various types of processor devices manufactured by other microprocessor manufacturers.

Consistent with disclosed embodiments, one or more components of system 100, including server system 110 and user system 120, may also include one or more memory devices (such as memories 112 and 124) as shown in exemplary form in FIG. 1. The memory devices may include magnetic storage units, optical storage units, RAM, ROM, hard drives, flash memory, etc. Such memory units may be located together with server system 110 and/or user system 120 or may be located remotely with respect to either or both systems. Memory 112 and or 124 may store software instructions that are executed by processor devices 111 and 123, such as one or more applications, network communication processes, operating system software, software instructions relating to the disclosed embodiments, and any other type of application or software known to be executable by processing devices. The memory devices may be a volatile or non-volatile, magnetic, semiconductor, tape, optical, removable, non-removable, or other type of storage device or non-transitory computer-readable medium. The memory devices may be two or more memory devices distributed over a local or wide area network, or may be a single memory device.

In certain embodiments, the memory devices may include database systems, such as database storage devices, including one or more database processing devices configured to receive instructions to access, process, and send information stored in the storage devices. By way of example, database systems may include Oracle™ databases, Sybase™ databases, or other relational databases or non-relational databases, such as Hadoop sequence files, HBase, or Cassandra.

In some embodiments, server system 110 and user system 120 may also include one or more additional components (not shown) that provide communications with other components of system environment 100, such as through network 130, or any other suitable communications infrastructure.

Network 130 may be any type of network that facilitates communications and data transfer between components of system environment 100, such as, for example, server system 110 and user system 120. Network 130 may be a Local Area Network (LAN), a Wide Area Network (WAN), such as the Internet, and may include a single network or a combination of networks. Further, network 130 may include a single type of network or a combination of different types of networks, such as the Internet and public exchange networks for wireline and/or wireless communications. Network 130 may utilize cloud computing technologies that are familiar in the marketplace. Network 130 is not limited to the above examples, and system 100 may implement any type of network that allows the entities (and others not shown) included in FIG. 1 to exchange data and/or information.

Figure 2:
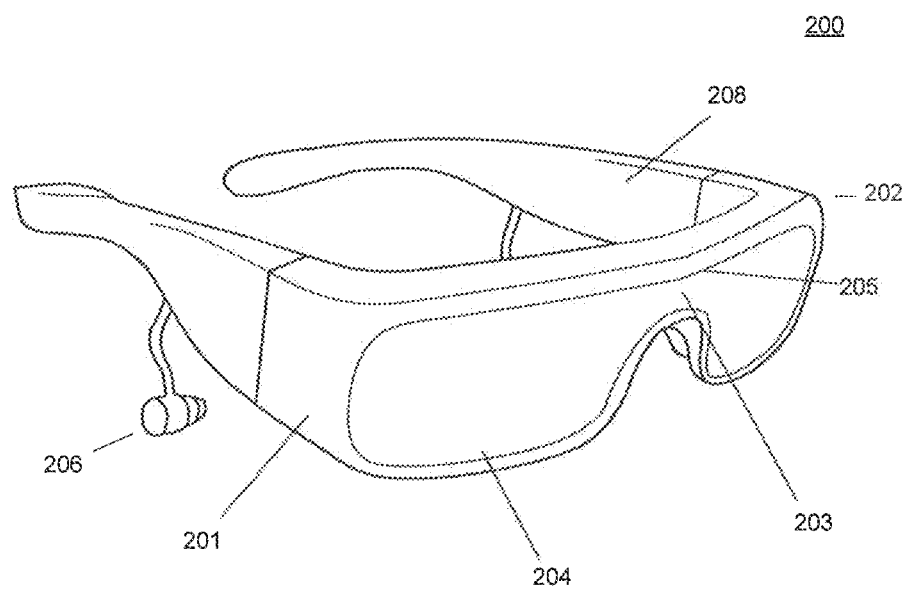
FIG. 2 illustrates an exemplary Augmented Reality (AR) device consistent with disclosed embodiments.

FIG. 2 illustrates an exemplary AR device 200, which may correspond to and include any of the components and features of user system 120. At present, augmented reality glasses are the most common type of AR device. It is also possible to use a smart phone as an AR device. Therefore, it will be understood that the disclosed embodiments are not limited to augmented reality glasses or any one type of AR device. For example, a relatively simple AR device might involve a projector with a camera interacting with the surrounding environment, where the projection could be on a glass surface or on top of other objects.

As shown in FIG. 2, AR device 200 may include features relating to navigation, orientation, location, sensory input, sensory output, communication and computing. For example, AR device 200 may include an inertial measurement unit (IMU) 201. IMU 201 may include axial accelerometers or gyroscopes for measuring position, velocity and orientation. IMUs may enable determination of the position, velocity and/or orientation of AR device 200 within the surrounding real world environment and/or its position, velocity and orientation relative to real world objects within that environment in order to perform its various functions.

AR device 200 may also include a Global Positioning System (GPS) unit 202. GPS units receive signals transmitted by a plurality of geosynchronous earth orbiting satellites in order to triangulate the location of the GPS unit. In more sophisticated systems, the GPS unit may repeatedly forward a location signal to an IMU to supplement the IMUs ability to compute position and velocity, thereby improving the accuracy of the IMU. In the present case, AR device 200 may employ GPS to identify a location of AR device 200. In some embodiments, AR device 200 may determine the user's presence and/or location using other devices in an environment of the user of AR device 200 (e.g., AR device 200 may communicate with, for example, Bluetooth low energy beacons).

As mentioned above, AR device 200 may include a number of features relating to sensory input and sensory output. AR device 200 may include at least a front facing camera 203 to provide visual (e.g., video) input, a display (e.g., a translucent or a stereoscopic translucent display) 204 to provide a medium for displaying computer-generated information to the user, a microphone 205 to provide sound input and audio buds/speakers 206 to provide sound output. In some embodiments, the visually conveyed digital data may be received by AR device 200 through the front facing camera 203. In some embodiments, AR device 200 may include one or more eye tracking sensors that may be configured to monitor and/or track a viewing direction of a user based on the position of one or both of the user's eyes, and provide an output relating to the viewing direction of the user (e.g., a direction of the user's gaze).

AR device 200 may also have communication capabilities, similar to other mobile devices, through the use of a cellular, WiFi, Bluetooth or tethered Ethernet connection. AR device 200 may also include an on-board microprocessor 208. The on-board microprocessor 208 may control the aforementioned and other features associated with AR device 200.

In one exemplary embodiment, AR device 200 may include a see-through display and sensor systems that provide the device's location, orientation, and bearing (for example, latitude, longitude, altitude, pitch, roll or degree tilt from horizontal and vertical axes, and compass heading). AR device 200 could be configured as glasses that can be worn by a person. Further, one or more elements of the sensor system may be located on peripheral devices physically separate from the display.

Additionally, in this embodiment, AR device 200 may rely on a computer software application to instruct the glasses to render virtual objects on the display field of view. Virtual objects include, but are not limited to, text, images, models, icons. The user may view or interact with virtual objects using the hardware and software application associated with the AR glasses 200.

Figure 3:
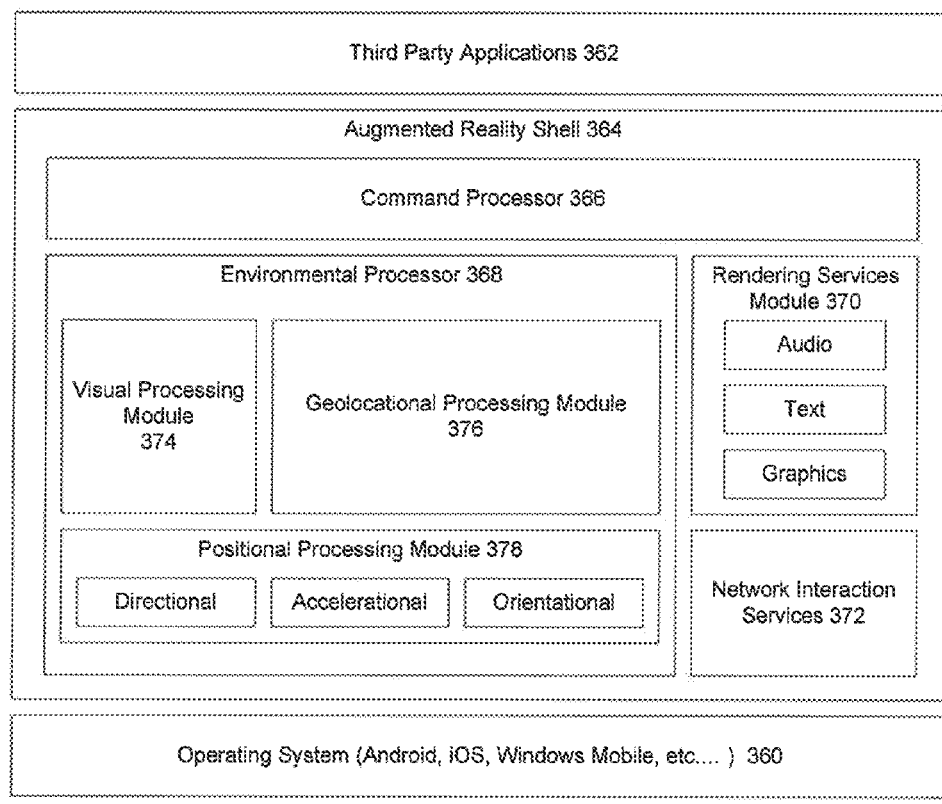
FIG. 3 is a block diagram illustrating a configuration of a software-driven system consistent with disclosed embodiments.

FIG. 3 is a system block diagram 300 illustrating a software-driven system associated with an AR device, in accordance with exemplary disclosed embodiments. As illustrated, the software system may be configured into three layers. At the lowest layer is the augmented reality device operating system 360. The operating system 360 may, for example, be an Android based operating system, an iPhone based operating system, a Windows Mobile operating system or the like. At the highest layer may reside a third party applications layer 362. Applications that are designed to work with the operating system 360 that either came with the AR device or were loaded by the user may reside in this third layer.

The middle layer is referred to as the augmented reality shell 364. The augmented reality shell 364, as shown, includes a number of components including a command processor 366, an environmental processor 368, a rendering services module 370, and a network interaction services module 372. It should be understood that each of the functional modules and/or components may be hardware, software, firmware or a combination thereof.

Environmental processor 368, in general, monitors the surrounding, real world environment of the AR device (e.g., AR device 200) based on input signals received and processed by the AR device (e.g., from sensor array 125). Environmental processor 368 may be implemented, as shown in FIG. 3, similar to the other processing components, or it may be implemented separately, for example, in the form of an application specific integrated chip (ASIC). In one embodiment, the environmental processor 68 may be configured to operate whenever the AR device is powered on.

Environmental processor 368, in turn, may also include several processing modules: a visual processing module 374, a geolocational processing module 376, and a positional processing module 378. Visual processing module 374 is primarily responsible for processing the received video, detecting and decoding the frames and processing the digital data included with the video that was visually conveyed to the AR device.

Geolocational module 376 may receive and process signals relating to the location of the AR device. The signals may, for example, relate to GPS coordinates, the location of a WiFi hotspot, the proximity to one or more local cell towers, or the proximity to one or more other devices (e.g., one or more Bluetooth low energy beacons).

Positional module 378 may receive and process signals relating to the position, velocity, acceleration, direction and orientation of the AR device. Positional module 378 may receive these signals from an IMU (e.g., IMU 201). Positional processing module 378 may, alternatively or additionally, receive signals from a GPS receiver, where it is understood that the GPS receiver can only approximate position (and therefore velocity and acceleration) and where positional processing module 378 can then provide a level of detail or accuracy based on the GPS approximated position. Thus, for example, the GPS receiver may be able to provide the general GPS coordinates of a movie theater, but positional processing module 378 may be able to provide the user's orientation within the movie theater. Positional processing module 380 may be employed in conjunction with visual processing module 374 to synchronize user head movements with viewing experiences (e.g., what rendering services module 370 will render on the display and, therefore, what the user sees).

Command processor 366 may process messaging between the modules and/or components. For example, after visual processing module 374 processes the digital data that was visually received through the video, visual processing module 374 communicates with the command processor 366 which, in turn, generates one or more commands to rendering services module 370 to produce the computer generated data (e.g., text, graphics, additional video, sound) that will be used to supplement the video and enhance the user's viewing experience.

Rendering services module 370 may process the content of the digital data that was visually received and, based on instructions provided through command processor 366, generate and present (e.g., display) data in the form of sound, graphics/animation, text, additional video and the like. The user can thus view the video and, in addition, experience the computer-generated information to supplement the video and enhance the viewing experience.

In some embodiments, the software applications associated with the AR device may create and maintain coordinate systems that correspond to the position and orientation of the AR device, the field of view of the AR device, and the virtual content. These coordinate systems may correspond to locations in the real physical world or may be referenced with respect to the AR device or to any other suitable reference. The maintained coordinate systems may include a two dimensional Cartesian coordinate system, a three dimensional Cartesian coordinate system, a two dimensional Spherical coordinate system, a three dimensional Spherical coordinate system, or any other suitable coordinate system.

AR content, including virtual objects or information, may be rendered at positions on the display of the AR device defined by the software application. These positions may be relative to the user. For example, the initial position for display may be in the center of the user's field of view or at any other desired location with the user's field of view. The AR content may also be rendered such that the user perceives the AR content as associated with a particular location or object in the real world. For example, the virtual content may be rendered on the display to appear to the user as located at coordinate positions corresponding to a location in the real-world, for example, referring to a specific geographic coordinate, or to the current coordinate location of another person or object. User movements relative to the specific geographic coordinate, person, object, etc. may prompt the system to update the display of the AR content such that it appears snapped to the specific geographic coordinate, person, object, etc.

If the user desires to move or "snap" the virtual content to a new position, the user may select a virtual object, or group of objects, using an input method supported by the hardware and software application associated with the AR device. For illustration purposes, one method could be to move a selection device, such as a mouse or pointer device. Another method would be to use gesture inputs (pointing of a finger, etc.), a push button device, touch sensitive surface, or voice commands to augment selection. Another exemplary method would be to use a reticle rendered on the display that would allow head-movements made by the user to indicate the direction or location of the virtual object to be selected. Following the selection, the user may define a new position for the virtual object relative to the display of the AR device.

For example, a user of user system 120/AR device 200 may include a field technician, and the AR content to be displayed may include a service manual for a particular type of equipment. Initially, and by operation of a voice command, input device, etc., the technician may request display of AR content in the form of the service manual. In some embodiments, this information may be retrieved from server system 110 or may be retrieved from a local memory 124 and may be displayed in display 122. Initially, the AR content may be displayed in the center of the user's field of view. Such positioning would enable natural access and viewing of the desired content. AR content in the center of the user's field of view, however, may be distracting or may impede the view of the real world objects with which the technician needs to interact. Therefore, system 120 may be configured to re-position the AR content to another location on display 122 or even to another location in virtual space (maintained in memory) relative to the user (e.g., relative to the user's head position).

Furthermore, the repositioned AR content can be accessed by the user. For example, the user may turn his head in the direction of the repositioned AR content and, based on the sensed motion of the head, the rendering of the AR content may be updated relative to the motion of the user's head. As another example, one or more eye tracking sensors may be configured to track a viewing direction of the user, such as the user's gaze direction, and the rendering of the AR content may be updated relative to changes in the user's gaze direction. In some embodiments, the rendered AR content may appear to the user as fixed at the repositioned location, and the user may turn his head in the direction of the repositioned location in order to bring the AR content toward and into the center of the field of view of display 122. Subsequent turning of the head away from the repositioned location will cause the rendered AR content on the display to move away from the center of the field of view. In this way, the user (e.g., the technician) may move the desired AR content to a virtual location that does not impede viewing of objects in the center of the field of view, but that still allows access to the desired AR content, for example, by turning toward the virtual position of that content.

The user may define the new position of the virtual object by using an input device or method supported by the hardware and software associated with AR device. For example, one method would be to "drag and drop" by first selecting the content to be moved, moving it by dragging it to the desired new location and deselecting it to drop it in the new, repositioned location. Establishing a new position of the virtual object may create a new coordinate or change an existing coordinate associated with the virtual object in the software application of the AR device.

The user (or routines in the software) may define additional snapping properties or rules associated with the virtual objects or new coordinates. These properties may include parameters, tags, or instructions for the software application of the AR device. For example, a property of the "snapped" virtual AR content may be to share the new coordinates for the object with other users of system 100. Another example may be to delete the new coordinates of the virtual objects after a period of time and then revert to the previous position. Yet another example would be to lock the virtual object from being moved to another coordinate by a different user of the AR device.

When the user initiates the steps to "snap" a virtual object to a new position, the software application of the AR device may use information from sensor systems to define a first coordinate system for the AR device and a second coordinate system for the virtual object that is selected by the user, which may be referred to as cardinal snapping herein.

As will be appreciated by a person skilled in the art having the benefit of this disclosure, numerous variations and/or modifications may be made to the foregoing disclosed embodiments. For example, not all components are essential for the operation of AR device 200. Further, any component may be located in any appropriate part of AR device 200 and the components may be rearranged into a variety of configurations while providing the functionality of the disclosed embodiments. Therefore, the foregoing configurations are examples and, regardless of the configurations discussed above, AR device 200 can provide various features that allow a user to interact and/or control AR device 200. Further details regarding various features provided by AR device 200 are discussed below in further detail.

Virtual Overhead Menu

In one embodiment, a menu is provided for a wearable augmented reality device. The menu may appear to hover over a user's head and potentially just outside of the user's field of view when the user is looking at the horizon. To access the menu, the user may simply look up or down toward a spot where the user perceives the menu to be located.

This menu system may avoid the difficulties associated with menus provided at the sides of a user's field of view. For example, when positioning a menu to the side of a user's field of view, it may be difficult to determine whether a user turned his or her head to the side to access a menu or whether the user merely wished to look in that direction without accessing the menu.

For example, consistent with an embodiment, a wearable device that provides a virtual menu to a user may include a display and at least one sensor configured to provide an output indicative of an orientation of a head of the user. The wearable device may further include at least one processing device configured to monitor an orientation of the head of the user based on the output of the at least one sensor. Based on the monitored orientation of the head, the at least one processing device may be further configured to determine whether the user is looking upward or downward with respect to a predetermined horizontal threshold. If the user is determined to be looking upward or downward with respect to the predetermined horizontal threshold, the at least one processing device may further be configured to cause the virtual menu to be shown on the display.

Figure 4:
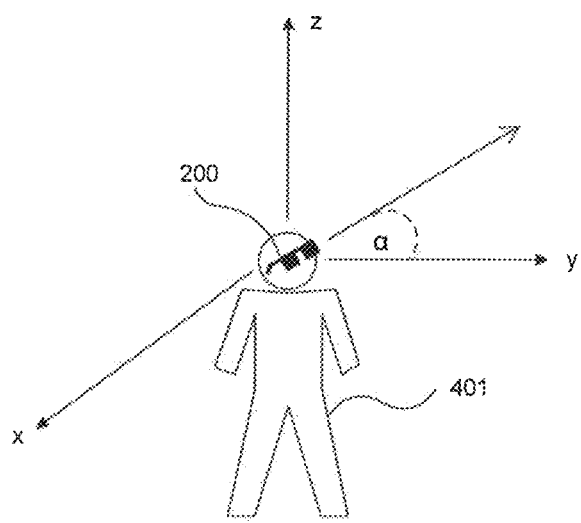
FIG. 4 illustrates an example of a user wearing an AR device consistent with disclosed embodiments.

FIG. 4 illustrates an example of a user wearing an AR device consistent with disclosed embodiments. As shown in FIG. 4, user 401 is in an environment 400 and is wearing an AR device 200, as discussed above regarding FIG. 2. AR device 200 may include a frame configured to secure the device to the head of user 401. As discussed above, AR device 200 may include sensor array 125. Sensor array 125 may include one or more sensors configured to detect a viewing direction of the user. In some embodiments, the one or more sensor may detect a viewing direction of the user by detecting the orientation of the head of user 401 by detecting the orientation of the AR device 200. The one or more sensors may include any one or more of a motion detector (e.g., a gyroscope and/or an accelerometer), a camera, a location determination device (e.g., a GPS device, an NFC reader), a magnetometer, and/or an orientation sensor (e.g., a theodolite, infra-red sensor). Such sensors may include magnetometers (compasses) to detect orientation or a direction that a user is looking, accelerometers (e.g., three axis accelerometers) to detect the direction and speed of movements associated with AR device, or the like. For example, the orientation of the head of user 401 may be defined according to a coordinate system, such as a three-dimensional coordinate system (x, y, z) having the origin at a point on AR device 200, such as a central point of display 204, the position at which IMU 201 is located, or any other reference point on AR device 200. In other embodiments, one or more eye tracking sensors may be configured to track a viewing direction of the user by tracking and/or monitoring the eyes of the user to determine the user's gaze direction.

In some embodiments, positional processing module 378 shown in FIG. 3 may be configured to store instructions that when executed by a processing device (e.g., microprocessor 208) of AR device 200, determine the orientation of the head of user 401 based on output from the one or more sensors.

For example, in order to access a virtual menu, user 401 may move his or her head upward or downward, forming an angle α with respect to the horizontal plane. The one or more sensors included in AR device 200 may be configured to detect a viewing direction of the user. The sensors may then output the detected viewing direction (e.g., the orientation of the user and/or the user's gaze direction) to a processor device, such as microprocessor 208 provided in FIG. 2.

In some embodiments, the one or more sensors may be configured to detect the orientation of the head of user 401 periodically. For example, the one or more sensors may be configured to detect the origination of the head of user 401 at any suitable time interval (e.g., every second, multiple times per second (2, 4, 6, 10 or more times per second), or once over the course of multiple seconds, etc.). Further, the one or more sensors may be configured to output the detected angle of AR device 200 with respect to the horizontal plane to a processing device (e.g., microprocessor 208). Alternatively, the one or more sensors may be configured to output the detected coordinates of one or more predetermined reference points of AR device 200 with reference to a predetermined coordinate system. For example, the one or more sensors may be configured to detect coordinates of multiple points of display 204 in a predetermined three-dimensional coordinate system having an origin set as the central point of AR device 200.

The processing device (e.g., microprocessor 208) of AR device 200 may be configured to monitor the orientation of the head of user 401 based on the output of the one or more sensors. For example, the processing device may be configured to determine the orientation of the head of user 401 based on received coordinates of points of the device from the one or more sensors. In some embodiments, the processing device may be configured to monitor both the orientation of the head of user 401 and the time duration that the head of user 401 stays in that orientation based on output received from the sensor. For example, if the time duration that the head of user 401 stays in a detected orientation is less than a predetermined time threshold, the processing device may determine that user 401 does not intend the detected orientation to cause AR device 200 to take an action. On the other hand, if the time duration that the head of user 401 stays in a detected orientation is greater than or equal to the predetermined time threshold, the processing device may determine that user 401 intends the detected orientation to cause AR device 200 to take an action.

The processing device may be further configured to determine whether user 401 is looking upward or downward with respect to a predetermined horizontal threshold based on the detected orientation of the head of user 401. For example, the processing device may be further configured to compare the detected orientation of the head of user 401 with the predetermined horizontal threshold. If the detected orientation of the head of user 401 is greater than or equal to the predetermined horizontal threshold, the processing device may be configured to determine that the user is looking upward. On the other hand, if the detected orientation of the head of user 401 is less than the predetermined horizontal threshold, the processing device may be configured to determine that the user is not looking upward.

The predetermined horizontal threshold may be pre-configured by user 401 through a user interface of AR device 200 or be pre-set based on a default setting of AR device 200. For example, display 204 may display a menu with different values of the predetermined horizontal threshold to enable user 401 to make a selection. As another example, display 204 may display a field that enables user 401 to input a desirable value of the predetermined horizontal threshold. The predetermined horizontal threshold may be set in units of degrees, radians, or any other units of angular measurement. As an example, the predetermined horizontal threshold may be set as 20, 30, or 60 degrees or more according to a preference of user 401.

As discussed above, in some embodiments, alternative or in addition to monitoring an orientation of the user's head, the processing device of AR device 200 may be configured to monitor a user's gaze direction based on output received from one or more eye tracking sensors. For example, the processing device may be configured to determine whether user 401 is looking upward or downward with respect to a predetermined horizontal threshold based on the direction of the user's gaze.

If the processing device determines that user 401 is looking upward or downward with respect to the predetermined horizontal threshold, the processing device may cause a virtual menu to be shown on a display (e.g., display 204) of AR device 200. The virtual menu may be shown at a predetermined position on display 204, such as a central location of display 204 or at any other suitable location on display 204.

AR device 200 may be configured to display the menu either continuously or in response to a predetermined trigger. For example, in some embodiments, AR device 200 may display a virtual menu on display 204 such that the menu is always visible within the field of view of the user (e.g., at a location in an upper portion of the user's field of view). In other embodiments, the menu may be displayed in response to a trigger, which may include, for example, a determination that the user is looking upward relative to a horizontal plane. In such embodiments, the menu may be caused to appear on the display in response to a determination that the user is looking upward relative to a horizontal plane by an angle of 20 degrees, 30 degrees, 60 degrees, or more. Thus, regardless of the user's side to side head orientation, when the user is determined to be looking in an upward direction, the menu may be shown on the display. In some cases the user may be looking to the right and then look upward to access the menu. In other cases, the user may be looking to the left and then look upward to access the menu. In still other cases, the user may be looking forward and then look upward to access the menu.

Once the menu is provided on the display, it can remain in a fixed location relative to the display or may move relative to the display. For example, in some embodiments, the virtual menu may be locked in the user's field of view, such as in a locked mode, while user 401 moves his or her head to a new position. That is, once the menu has been provided on the display, the menu may be locked to a particular location relative to the display such that subsequent movements of the head of the user do not cause movement of the menu relative to the display.

In other embodiments, the virtual menu may be provided at a fixed, perceived location relative to the user. For example, the user may perceive that the virtual menu hovers above the user's head at a particular angle relative to a horizontal looking direction. Thus, while the user looks left, right, or forward along a horizontal plane (or below a horizontal plane), the virtual menu may not appear on the display. To access the menu, however, the user may simply look upward above the predetermined angular threshold (regardless of left-right head orientation), and the menu will be shown on the display. This may provide the user with the perception that the menu "hovers" at a location above and forward of the user's forehead, for example. Once the menu is displayed, the menu location on the display may be unaffected by subsequent left-right movement of the user's head. On the other hand, once the menu is shown on the display, subsequent changes in vertical orientation of the user's head (e.g., looking upward or downward, for example) may cause changes in the location of the menu on the display. For example, once the menu is shown on the display, subsequent head movements further in the upward direction may cause the location of the menu to move downward on the display. Similarly, subsequent head movements in a downward direct may cause the location of the menu to move upward on the display. Such behavior may be consistent with a user perception that the menu "hovers" above the user's head at a fixed vertical angle, regardless of horizontal angle. In this mode (e.g., unlocked mode), once the head of user 401 is moved downward away from the perceived location of the menu, the virtual menu may disappear from display 204, and the virtual menu may reappear when the head of user 401 is moved upward again. Of course, the processor device may be configured to also cause changes in the left-right position of the virtual menu relative to the display in response to detected horizontal movements of the user's head (e.g., right-left changes in the looking direction of the user's head).

In some embodiments, AR device 200 may provide an interface for user 401 to select the menu positioning mode of the virtual menu. For example, a button may be placed on AR device 200 for user 401 to switch between the locked and unlocked modes. As another example, selectable options for the locked and unlocked modes may be displayed on display 204, and user 401 may select a desirable mode to display the virtual menu.

Figure 5A:
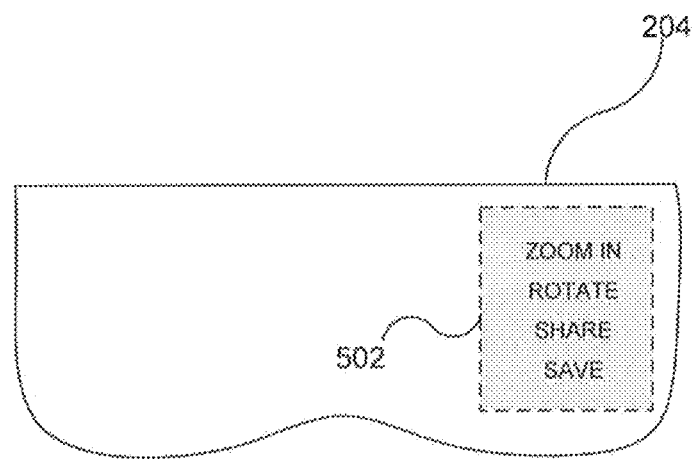
FIG. 5A illustrates an example of a virtual menu being displayed by an AR device consistent with disclosed embodiments.

FIG. 5A illustrates an example of a virtual menu being displayed by an AR device consistent with disclosed embodiments. For example, rendering services module 370, discussed above in reference to FIG. 3, may store software instructions that, when executed by a processing device (e.g., microprocessor 208), cause audio messages to be played, and/or cause text messages and/or graphics to be displayed. As illustrated in FIG. 5A, a virtual menu 502 is shown on display 204 of AR device 200 when user 401 is determined to be looking upward. As discussed above, display 204 may include one or more lenses included on a pair of glasses, and virtual menu 502 may be displayed on the lens in a semi-transparent form or opaque form. In some embodiments, the level of transparency of the shown menu may be selectable by the user.

Virtual menu 502 may include one or more selectable elements each associated with one or more actions that may be taken by AR device 200 upon selection by user 401. For example, virtual menu 502 may present options for user 401 to save AR content, share it with other users, rotate the display of the AR content, initiate a phone call, change settings associated with a camera on AR device 200, and any other options or tasks that the user may select to provide input, request information, or initiate a task associated with AR device 200.

As noted, virtual menu 502 may be displayed on display 204 such that the user perceives the virtual menu to be located at a predetermined, fixed angle of rise above the predetermined horizontal threshold. Additionally, initiation of the display of the virtual menu may occur based on certain timing constraints. For example, in some embodiments, virtual menu 502 may be shown on display 204 after user 401 is determined to be looking upward with respect to a predetermined horizontal threshold for a time period that exceeds a predetermined time threshold (e.g., 0.25 seconds, 0.5 seconds, 1 second, 2 seconds, or any other suitable time). Accordingly, if user 401 looks upward with respect to the predetermined horizontal threshold for less than the predetermined time threshold, the processing device may be configured to not display virtual menu 502.

In some embodiments, the processing device of AR device 200 may be further configured to determine whether user 401 is looking in a direction intersecting any of the selectable items of virtual menu 502 and cause a selection of a particular item if the user looks in the direction of the particular item for a time that exceeds a predetermined time threshold. For example, with reference to FIGS. 4 and 5A, if the processing device of AR device 200 determines that user 401 is looking in a direction intersecting the item "save" on the virtual menu 502 for a time period that exceeds a predetermined threshold, the processing device may cause the item "save" on the virtual menu 502 to be selected and take the corresponding action (e.g., saving data, such as an image).

Figure 5B:
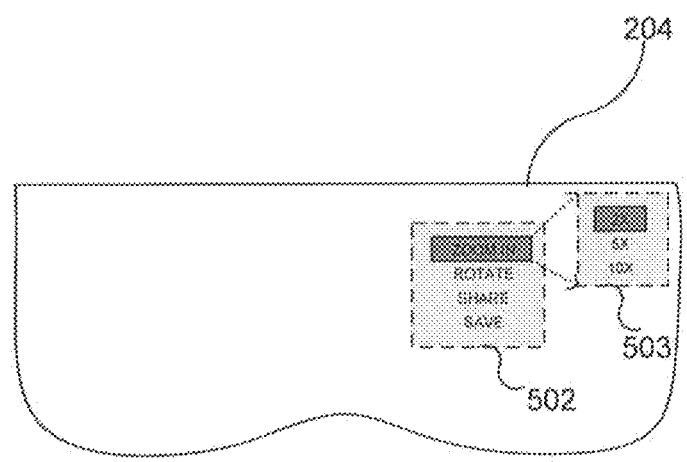
FIG. 5B illustrates an example of displaying a sub-menu by an AR device consistent with disclosed embodiments.

FIG. 5B illustrates an example of displaying a sub-menu by an AR device consistent with disclosed embodiments. In some embodiments, virtual menu 502 may include a nested menu, and the processing device of AR device 200 may be configured to cause a display of one or more sub-menu elements in response to a sensed selection of a higher level menu element. As shown in FIG. 5B, virtual menu 502 is a nested menu, and sub-menu 503 may be displayed on display 204 in response to a sensed selection of a higher level menu item. For example, upon selection of the menu item "zoom in" of the virtual menu 502, the sub-menu 503 may be displayed containing different levels of zoom-in options. The virtual menu may be a text menu, a graphical interface, or a combination of text and graphics.

The selection of the menu item or sub-menu item may be caused by user 401 looking in the direction of the sub-menu item, touching the particular menu item on the display, moving a selector to the position of the particular menu item, intersecting a reticle with the menu item, generating a voice command, or the like. For example, user 401 may move a selector to the position of the particular menu item on the display to make a selection by moving or rotating the position of the user's head. As another example, user 401 may touch the part of display 204 at which the menu item is shown to make a selection of the item. In another example, user 401 may generate a voice command corresponding to the menu item to make a selection. In some embodiments, the selection of the menu item or sub-menu item may be caused by user 401 looking in a direction intersecting the particular item for a time period that exceeds a predetermined threshold. For example, a sensor of AR device 200 may sense that user 401 is looking in a direction intersecting a particular menu item, and the processing device may in turn cause a selection of the item based on output received from the sensor. For example, the processing device of AR device 200 may cause the selection of a menu item "zoom in" of the virtual menu 502 if user 401 looks in a direction intersecting the item "zoom in" for a time period that exceeds the predetermined threshold. As another example, the processing device of AR device 200 may cause the selection of sub-menu item "2×" of the sub-menu 503 if user 401 looks in a direction intersecting the item "2×" for a time period that exceeds the predetermined threshold. In some embodiments, the function of selecting an item by sight may be turned on or off by user 401. For example, a button may be placed on the AR device for user 401 to turn on or turn off the function of sight selection. As another example, a selectable option may be displayed on display 204 of AR device 200 for user 401 to turn on or off the function of selecting an item by sight.

Figure 6:
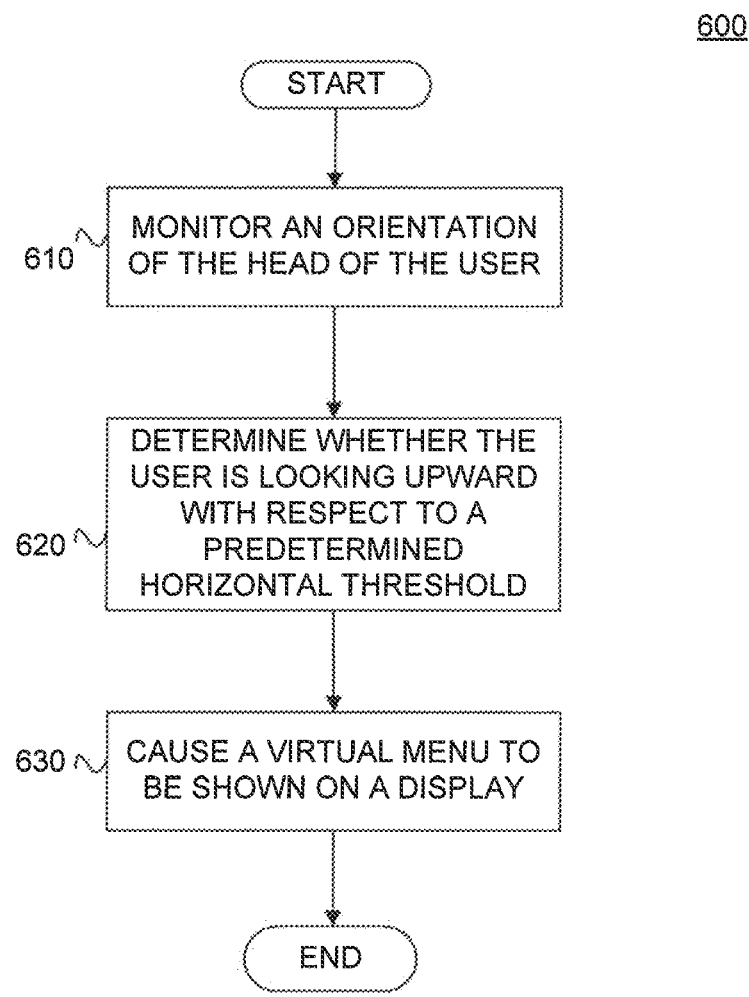
FIG. 6 is a flowchart of an exemplary process for providing a virtual menu to a user by an AR device consistent with disclosed embodiments.

FIG. 6 is a flowchart of an exemplary process 600 for providing a virtual menu to a user by an AR device consistent with disclosed embodiments. As an example, one or more steps of process 600 may be performed by AR device 200 shown in FIG. 2. For example, in process 600, a sensor of AR device 200 may detect an orientation of a head of user 401 and provide a corresponding output to a processing device of AR device 200. The processing device may cause a virtual menu to be shown on the display based on the detected orientation of the head of user 401.

At step 610, AR device 200 may monitor an orientation of the head of user 401 based on output of at least one sensor associated with the AR device. For example, the processing device (e.g., microprocessor 208) of AR device 200 may execute instructions of positional processing module 378, discussed above in relation to FIG. 3, to perform this step. The sensor may be included in AR device 200 and be configured to provide an output indicative of the orientation of the user's head.

At step 620, AR device 200 may determine, based on the monitored orientation of the head of user 401, whether user 401 is looking upward or downward with respect to a predetermined horizontal threshold. For example, the processing device of AR device 200 may execute instructions of positional processing module 378 to perform this step. The predetermined horizontal threshold may be configured by the positional processing module 378 or preconfigured by the user via a user interface. The predetermined horizontal threshold may be set in units of degrees, radians, or another other units for measurement of angles.

At step 630, AR device 200 may cause a virtual menu to be shown on display 204 if user 401 is determined to be looking upward or downward with respect to the predetermined horizontal threshold. For example, the processing device of AR device 200 may execute instructions of rendering services module 370 to perform this step.

The virtual menu displayed in step 630 may be displayed such that the user perceives the virtual menu as located at a predetermined, fixed angle of rise above the predetermined horizontal threshold. Further, the virtual menu may be semi-transparent and displayed on the lens. In some embodiments, AR device 200 may change a location at which the virtual menu is shown on display 204 in response to a sensed change in orientation of the user's head.

The virtual menu displayed in step 630 may include one or more selectable elements and/or the virtual menu may be a nested menu. After receiving a selection of one or more of the elements, AR device 200 may take other actions. For example, AR device 204 may determine whether user 401 is looking in a direction intersecting any of the selectable menu items, and cause a selection of a particular item if user 401 looks in a direction of the particular item for a time period that exceeds a predetermined threshold.

Look and Dwell to Select

In some embodiments, a user interface that is displayed by a wearable augmented reality device may include a menu item that is selectable based on a user looking at the menu item. The AR device may recognize selection of the menu item by monitoring a viewing direction of the user (e.g., the orientation of the user's head and/or the orientation of the user's gaze) to determine the direction in which the user is looking. In addition, the AR device may determine whether the user dwells on the menu item longer than a predetermined dwell threshold (e.g., 0.25 seconds, 0.5 seconds, one second, three seconds, five seconds, within a range of 0.25 seconds to 2.0 seconds, etc.). If the user dwells on the menu item for the predetermined dwell threshold, the menu item may be selected.

For example, consistent with some embodiments, a wearable device provides a virtual menu to a user. The device comprises a display and at least one sensor configured to provide an output indicative of a viewing direction of the user. The device further comprises at least one processing device configured to cause a virtual menu to be shown on the display. The virtual menu includes at least one selectable element. The at least processing device is further configured to monitor a viewing direction of the user based on the output of the at least one sensor, determine based on the monitored viewing direction whether the user is looking in a direction of the at least one selectable element of the virtual menu; determine an amount of time that the user looks in the direction of the at least one selectable element of the virtual menu; and cause at least action associated with the at least one selectable element of the virtual menu if the amount of time exceeds a predetermined dwell time threshold.

Referring to FIG. 4, as described above, one or more sensors (e.g., one or more sensors included in sensor array 125) included in AR device 200 may be configured to detect a viewing direction of user 401 (e.g., an orientation of a head of user 401 and/or an orientation of the gaze of user 401) and provide an output indicative of the orientation to a processing device (e.g., microprocessor 208) of AR device 200. The processing device may be configured to display a virtual menu on display 204 in response to actions of user 401. For example, the processing device may be configured to display a virtual menu on display 204 if it is determined that the user is looking in a certain predetermined direction (e.g., to the user's left or right, or upward). In some embodiments, display of the virtual menu may be triggered by one or more head movements of the user. For example, if the user's head or eyes are determined to move in a predetermined pattern (e.g., left-right-left, or any other suitable pattern) or if the user's head or eyes are determined to move such that the user is determined to be looking in a certain predetermined direction or orientation, then the processing device may cause the virtual menu to appear on the display. In other embodiments, the menu can be continuously shown on the display, and the processing device may cause the menu to be shown outside of a user's primary looking direction until the user's head movement indicates a desire to access the menu. For example, the virtual menu may hover to the left, right, or above a user's primary looking direction, and may be locked in real world coordinates such that movements of the user's head (e.g., in a manner causing the user's looking direction to intersect with the virtual location of the menu relative to the real world coordinates) may cause the processing device to move the location of the virtual menu relative to the display (e.g., more toward a center of the user's field of view). The virtual menu may include one or more selectable items, such as icons, check-boxes, and/or texts.

As described above in connection with FIG. 4, the processing device of AR device 200 may be configured to monitor a viewing direction of user 401 (e.g., an orientation of the head of user 401 and/or an orientation of the gaze of user 401) based on output received from the one or more sensors. Such sensors may include, for example, one or more components associated with IMU 201 and/or sensor array 125. Such sensors may also include one or more accelerometers, gyroscopes, magnetometers, eye tracking sensors, etc. as discussed in detail above. For example, the detected orientation of the head of user 401 may include an angle of the user's head formed with respect to the horizontal plane, which is associated with upward or downward movement of the head of the user, along with a direction of the user's head in the horizontal plane, which may be associated with left or right movement of the head of the user. For example, the one or more sensors of AR device 200 may output three-dimensional coordinates of multiple points of AR device 200 to the processing device, and the processing device may determine the angle of the user's head with respect to the horizontal plane and the direction of the user's head within the horizontal plane based on the received coordinates.

In some embodiments, the processing device may be configured to determine the direction of the user's sight line based on the detected orientation of the user's head and/or the detected orientation of the user's gaze. For example, the processing device may determine or assume that the direction of the user's sight line is coincident with a certain head orientation reference line (e.g., a line extending through and perpendicular to a horizontal and/or vertical midpoint of the display, or any other suitable reference). As another example, the processing device may derive the direction of the user's sight line by applying one or more correction operations relative to a determined head orientation reference. For example, for some users, a sight line may be above, below, leftward, or rightward of a standard head orientation reference, as determined by any combination of the onboard head orientation sensors.

In some embodiments, the processing device of AR device 200 may be configured to determine, based on the monitored orientation of the head or the monitored orientation of the user's gaze, whether the user is looking in a direction of a selectable element of the virtual menu. For example, positional processing module 378 shown in FIG. 3 may be configured to store instructions that, when executed by a processing device (e.g., microprocessor 208) of AR device 200, determine whether user 401 is looking in a direction of a selectable element of the virtual menu based on output from the one or more sensors.

For example, the processing device may detect that the direction of the user's sight line intersects with a particular selectable element of the virtual menu, and as a result, determine that the user is looking in the direction of the particular selectable element. In some embodiments, the processing device may be configured to divide the area of the virtual menu shown on display 204 into a number of sections, each of which may contain one or more selectable menu items. If the direction of the user's sight intersects with any of the sections, the processing device may determine that the user is looking in the direction of the one or more menu items contained in the section.

In some embodiments, the processing device of AR device 200 may be configured to determine an amount of time that user 401 looks in the direction of particular menu item of the virtual menu. In some embodiments, positional processing module 378 shown in FIG. 3 may be configured to store instructions that, when executed by a processing device (e.g., microprocessor 208) of AR device 200, determine an amount of time that user 401 looks in the direction of particular menu item of the virtual menu.

For example, the sensors of the AR device 200 may periodically detect the viewing direction of the user (e.g., the orientation of the user's head and/or the orientation of the user's gaze) at a predetermined time interval and provide an output to the processing device. The processing device may determine the viewing direction periodically based on the periodical output received from the sensors. The predetermined time interval may be set as every second, multiple times per second (2, 4, 6, 10 or more times per second), once over the course of multiple seconds, or any other suitable time interval. This setting may be a default setting or a user adjustable setting.

If the currently detected orientation of the user's viewing direction stays unchanged from the previously detected orientation (e.g., at the last time interval), the processing device may determine whether user 401 has looked in the same direction long enough to trigger an action (e.g., selecting a menu item). However, if the currently detected orientation of the user's viewing direction has changed from the previously detected orientation, the processing device may determine that user 401 changed the direction of his or her sight line and may set the amount of elapsed time that the user has looked in the new direction to zero.

In some embodiments, the processing device may allow a small amount of difference between the currently detected orientation of the user's viewing direction and the previously detected orientation and still consider the user to have not changed his or her sight line. This may account for slight movements of the user's eyes and/or head such that the user does not need to remain perfectly still in order to cause an action. For example, if the currently detected orientation of the user's viewing direction changes from the previously detected orientation for less than a predetermined threshold, the processing device may determine that the direction of user's sight line remains unchanged. On the other hand, if the currently detected orientation of the user's viewing direction changes from the previously detected orientation equal to or more than the predetermined threshold, the processing device may determine that the direction of the user's sight line has changed.

If it is determined that user 401 looks in the direction of a particular item of the virtual menu for an amount of time that exceeds a predetermined dwell time threshold, the processing device of AR device 200 may cause an action associated with the particular item to be performed. For example, if it is determined that user 401 looks in the direction of a camera icon of the virtual menu for an amount of time that exceeds the predetermined dwell time threshold, the processing device of AR device 200 may activate an onboard camera and/or may cause a picture of the user's field of view to be taken (e.g., after a predetermined delay period), among other actions. As another example, if it is determined that user 401 looks in the direction of a text command of the virtual menu for an amount of time that exceeds the predetermined dwell time threshold, the processing device of AR device 200 may cause an audio output of the text to be provided to the user.

The predetermined dwell time threshold may be set as 0.1 seconds, 0.25 seconds, 0.5 seconds, 1 second, or multiple seconds, such as a value of 3, 5, or 10 seconds, or any other suitable value. In some embodiments, the dwell time threshold may fall within a range of about 0.1 second to about 5 seconds. In other embodiments, the dwell time threshold may fall without a range of about 0.25 seconds to about 2 seconds. The predetermined dwell time threshold may be pre-configured by user 401 through a user interface of AR device 200 or be pre-set based on a default setting of AR device 200. For example, display 204 may display a menu with different values of the predetermined dwell time threshold to enable user 401 to make a selection. As another example, display 204 may display a field that enables user 401 to input a desirable value of the predetermined dwell time threshold. In some embodiments, display 204 may also display options of different actions and allow user 401 to configure the specific action to perform in response to looking at the direction of a menu item for an amount of time that exceeds the predetermined dwell time threshold. For example, display 204 may display options such as opening an application, providing audio output of text, and/or moving the menu item to the center of the display. Accordingly, user 401 may configure the types of actions that are to be taken by AR device 200 when the user looks in the direction of an item for a predetermined period of time.

In some embodiments, as discussed above, alternative or in addition to monitoring an orientation of the user's head, the processing device of AR device 200 may be configured to monitor a user's gaze direction based on output received from one or more eye tracking sensors.

Figure 7A:
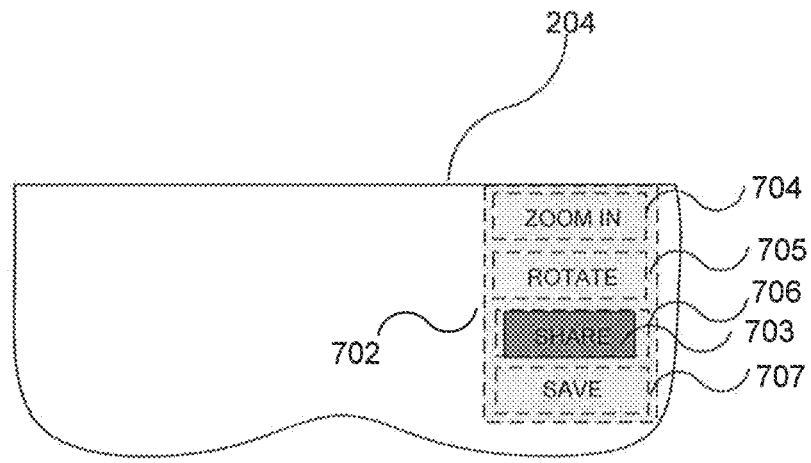
FIG. 7A illustrates an example of a selectable element of virtual menu being displayed by an AR device by consistent with disclosed embodiments.

FIG. 7A illustrates an example of a selectable element of virtual menu that is displayed by an AR device consistent with disclosed embodiments. For example, rendering services module 370, discussed above in reference to FIG. 3, may store software instructions that, when executed by a processing device (e.g., microprocessor 208), cause audio messages to be played, and/or cause text messages and/or graphics to be displayed.

As shown in FIG. 7A, a virtual menu 702 which includes multiple selectable items, is displayed on display 204 of AR device 200. While the selectable items of virtual menu 702 in this example include text, they are not limited to text and can be icons, check-boxes, graphics, or a combination thereof. Virtual menu 702 may be semi-transparent such that virtual menu 702 is layered on top of the user's field of view and does not completely block the user's field of view. Virtual menu 702 may also be displayed such that it contrasts with other areas of display 204. For example, the color, brightness, and/or transparency of virtual menu 702 may be different from other areas of display 204. In some embodiments, the transparency of virtual menu 702 may be adjustable based on input received from user 401. For example, display 204 may display values of transparency associated with virtual menu 702 that are selectable by user 401. As another example, display 204 may display an input field that enables user 401 to input a desirable transparency value. The transparency value may be set in terms of percentage that the item is transparent and that light can pass through the item. As an example, the transparency value may be set as 20, 30, 50 percent or more according to a preference of user 401. In some embodiments, one or more buttons may be placed on AR device 200 for user 401 to increase or decrease the transparency of virtual menu 702.

In some embodiments, when user 401 looks at a menu item for a prolonged period of time (e.g., an amount of time that exceeds a predetermined dwell time threshold), the processing device of AR device 200 may cause an action associated with the menu item to be performed. As illustrated in FIG. 7A, user 401 looks at menu item 703 for a prolonged period of time. In response, the processing device may cause menu item 703 to be highlighted in display 204 and may initiate the corresponding action associated with menu item 703. In this example, menu item 703 defines an operation to share the user's current field of view with other users. Accordingly, when the processing device determines that the user's sight line intersects with the region of menu item 703 for a prolonged period of time (e.g., an amount of time that exceeds a predetermined dwell time threshold), the processing device proceeds to perform the action of sharing the user's current field of view with other users.

In some embodiments, the processing device of AR device 200 may be configured to divide the area of virtual menu 702 into multiple sections, such as sections 704-707 illustrated in FIG. 7A. Each of the sections may include one selectable menu item. The area of each section may be the same or different depending on the size of the menu item included in each section. The area of the sections may be configured to be slightly larger than the area that the menu item itself occupies such that if the direction of the user's sight is sufficiently near the menu item, even though it does not intersect with the menu item, the processing device may still determine that the user intends to invoke actions associated with the menu item to be performed and may proceed to initiate such actions. If the processing device determines that the user is looking in a direction intersecting the area of any of the sections for a predetermined time period, the processing device may cause corresponding actions associated with the menu item contained within the section to be performed. For example, if the processing device determines that the user is looking in a direction intersecting the area of section 706 which contains menu item 703, the processing device may cause corresponding actions associated with menu item 703 to be performed.

As shown in FIG. 7A, in some embodiments, the processing device may cause menu item 703 to be highlighted on display 204 if it determines that the user is looking in a direction intersecting the area of section 706 which contains menu item 703. Menu item 703 may remain highlighted during the time period that the user is looking in a direction intersecting the area of section 706 until the processing device initiates actions associated with menu item 703. In other embodiments, menu item 703 may be highlighted for a predetermined time period, such as one second or multiple seconds, if the processing device determines that the user is looking in a direction intersecting the area of section 706 which contains menu item 703. In some embodiments, the processing device may cause the entire section 706 to be highlighted if it determines that the user is looking in a direction intersecting the area of section 706 which contains menu item 703.

In some embodiments, if the processing device of AR device 200 determines that the user is looking in a direction intersecting the selectable menu item (or the area of the section containing the menu item) for a predetermined time period (e.g., an amount of time that exceeds a predetermined dwell time threshold), the processing device may cause an application associated with the menu item to be opened. For example, referring to FIG. 7A, the processing device may cause an application associated with menu item 703 to be opened, such as a social media application installed on AR device 200 that allows user 401 to share a digital file with other users. The application may be one of the third party applications 362 provided in FIG. 3. In some embodiments, the processing device may cause interface of the application associated with menu item 703 to be displayed on display 204 such that user 401 may perform further operations through the interface of the application.

In some embodiments, if the processing device of AR device 200 determines that the user is looking in a direction intersecting the selectable menu item (or the area of the section containing the menu item) for a prolonged time period (e.g., an amount of time that exceeds a predetermined dwell time threshold), the processing device may cause an audible output associated with the menu item to be provided. For example, referring to FIG. 7A, the processing device may cause an audible output of the text of menu item 703 to be provided to user 401. The AR device 200 may include a speaker, such as speaker 206 shown in FIG. 2, to provide the audible output of the text to the user. In some implementations, the speaker may be included in an earbud that is configured for placement inside the user's ear (or a bone conducting microphone configured for placement in contact with a side of the user head). In other implementations, the speaker may be placed in a frame of the AR device that is configured to secure the AR device to the head of the user.

Figure 7B:
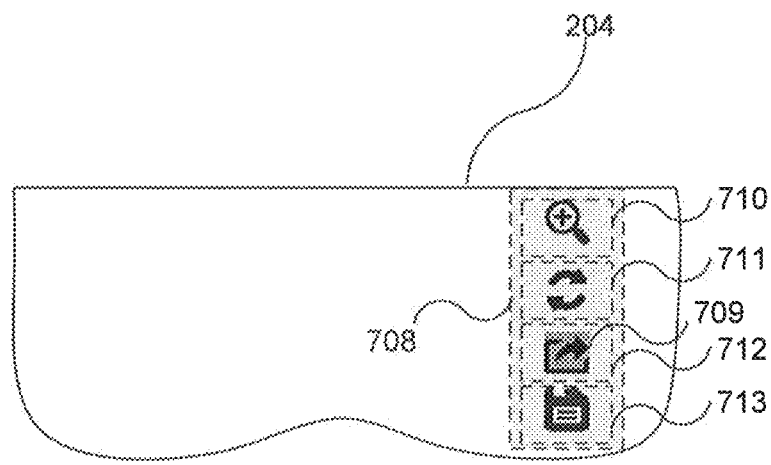
FIG. 7B illustrates another example of a selectable element of virtual menu being displayed by an AR device consistent with disclosed embodiments.

FIG. 7B illustrates another example of a selectable element of virtual menu that is displayed by an AR device consistent with disclosed embodiments. As shown in FIG. 7B, a virtual menu 708, which includes multiple selectable items, is displayed on display 204 of AR device 200. The selectable items of virtual menu 708 are presented as graphical icons. A corresponding operation may be performed in response to a selection of any of the icons. For example, in some embodiments, when user 401 looks at one of the icons for a predetermined period of time (e.g., an amount of time that exceeds a predetermined dwell time threshold), the processing device of AR device 200 may cause an action associated with the icon to be performed. As illustrated in FIG. 7B, user 401 looks at icon 709 for a predetermined period of time. In response, the processing device of AR device 200 may cause icon 709 to be highlighted in the display 204 and initiates the corresponding action associated with icon 709. In this example, icon 709 represents an operation to share the user's current field of view with other users. When the processing device determines that the user's sight line intersects with the region of icon 709 for a predetermined period of time (e.g., an amount of time that exceeds a predetermined dwell time threshold), the processing device may proceed to perform the action of sharing the user's current field of view with other users.

In some embodiments, the processing device of AR device 200 may be configured to divide the area of the virtual menu 708 into multiple sections, such as sections 710-713 illustrated in FIG. 7B. Each of the sections includes one selectable icon. The area of each section may be the same or different depending on the size of the icon included in each section. The area of the sections may be configured to be slightly larger than the area that the icon itself occupies such that if the direction of the user's sight line is sufficiently near the icon, even though it does not intersect with the icon itself, the processing device may still determine that the user intends to invoke actions associated with the icon to be performed and may proceed to initiate such actions. If the processing device determines that the user is looking in a direction intersecting the area of any of the sections for a prolonged time period, the processing device may cause corresponding actions associated with the icon contained within the section to be performed. For example, if the processing device determines that the user is looking in a direction intersecting the area of section 712 which contains icon 709, the processing device may cause corresponding actions associated with icon 709 to be performed.

Figure 7C:
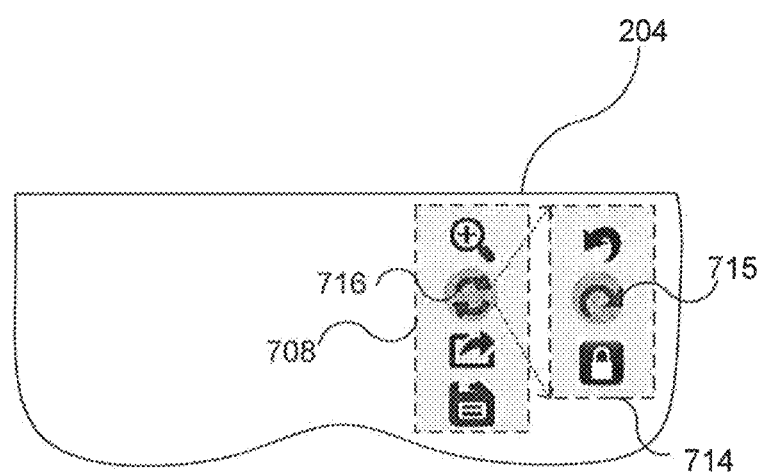
FIG. 7C illustrates an example of expanding an element of virtual menu being displayed by an AR device consistent with disclosed embodiments.

FIG. 7C illustrates an example of expanding an element of virtual menu that is displayed by an AR device consistent with disclosed embodiments. In some embodiments, the virtual menu may include a nested menu, and the processing device of AR device 200 may be configured to cause a display of one or more sub-menu elements in response to a user looking in the direction of a higher level menu element for a predetermined time period. As shown in FIG. 7C, virtual menu 708 is a nested menu. If the processing device determines that user 401 is looking at the direction of a higher level menu element for a predetermined period of time, the processing device may cause the higher level menu element to be expanded. As illustrated in FIG. 7C, the processing device determines that user 401 is looking at the direction of a rotation icon 716, and consequently, causes rotation icon 716 to be selected and expanded to sub-menu 714. The sub-menu 714 may be displayed containing different rotation options, such as clockwise rotation, counter clockwise rotation, rotation lock, etc. The sub-menu 714 may be a text menu, a graphical interface, or a combination of text and graphics.

The sub-menu 714 may include one more selectable sub-menu items. If the processing device of AR device 200 determines that user 401 looking in the direction of a sub-menu item for a predetermined period of time (e.g., any of the times or time ranges associated with the predetermined dwell time threshold), the processing device may cause an action associated with the sub-menu item to be performed, such as opening an application associated with the sub-menu item, providing an audible output of the sub-menu item, performing a task associated with the sub-menu item, etc. For example, the processing device may cause the clockwise rotation of the current display if user 401 looks in a direction intersecting the clockwise rotation icon 715 in the sub-menu for a time period that exceeds a predetermined threshold. In some embodiments, the processing device may cause a sub-menu item to be highlighted on the display if user 401 looks in a direction intersecting the sub-menu item. For example, the processing device may cause the clockwise rotation icon 715 to be highlighted on the display if it determines that user 401 is looking in a direction intersecting the icon.

Figure 8:
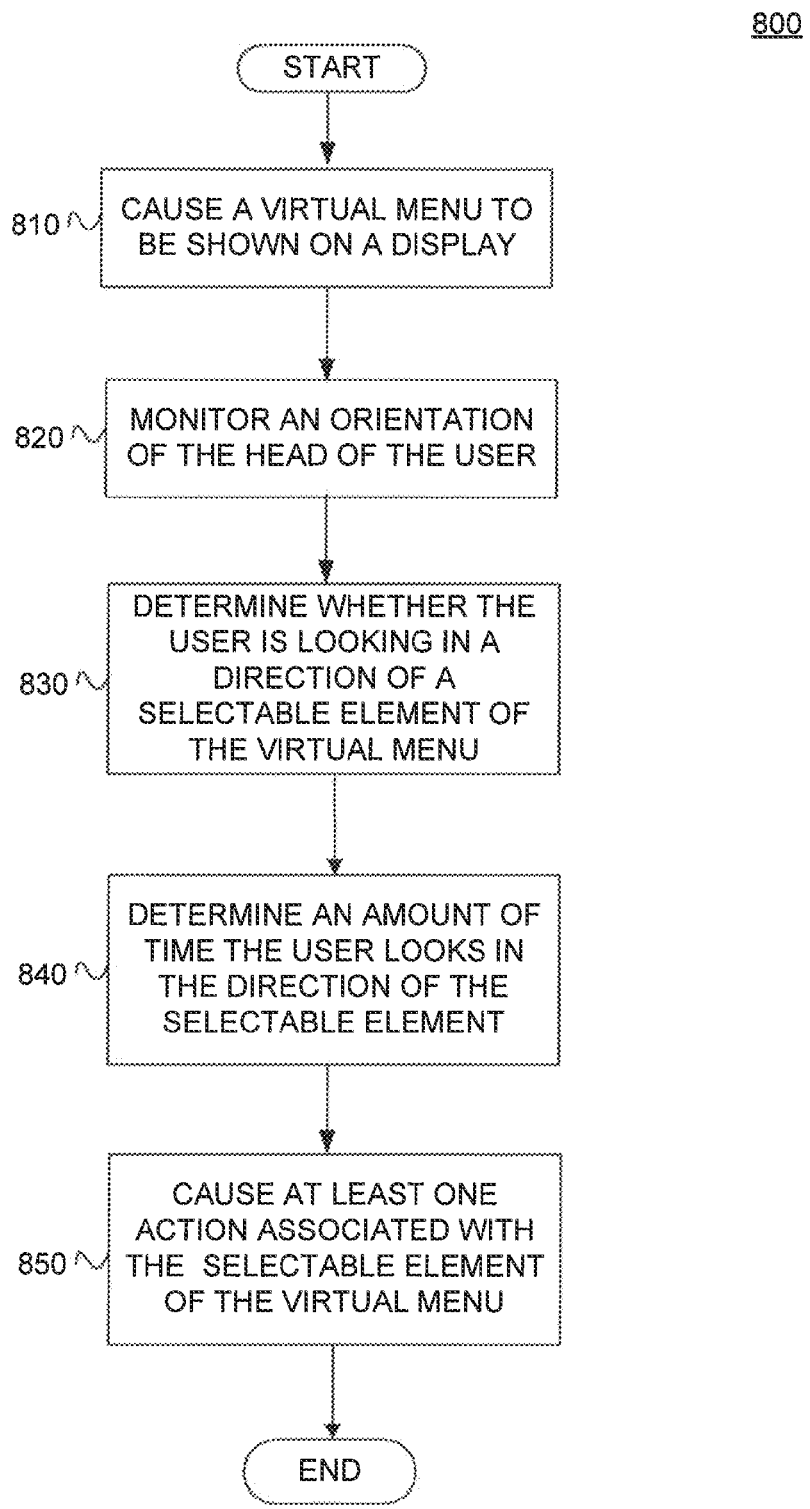
FIG. 8 is a flowchart of an exemplary process for causing an action associated with an element of virtual menu to be performed by an AR device consistent with disclosed embodiments.

FIG. 8 is a flowchart of an exemplary process 800 for causing an action associated with an element of a virtual menu to be performed by an AR device consistent with disclosed embodiments. As an example, one or more steps of process 800 may be performed by AR device 200 shown in FIG. 2. For example, in process 800, a sensor of AR device 200 may detect a viewing direction of user 401 (e.g., an orientation of the head of user 401 and/or an orientation of the gaze of the eyes of user 401) and provide a corresponding output to a processing device of AR device 200. The processing device may cause a virtual menu to be shown on the display which includes one or more selectable elements.

At step 810, AR device 200 may cause a virtual menu to be shown on display 204. For example, the processing device of AR device 200 may execute instructions of rendering services module 370 to perform this step. The virtual menu displayed in step 810 may include one or more selectable elements and/or the virtual menu may be a nested menu. The selectable element of the virtual menu may include an icon, a check-box, and/or text. Further, the virtual menu may be semi-transparent and displayed on the lens. The transparency of the virtual menu may be adjustable based on an input received by the processing device from user 401.

At step 820, AR device 200 may monitor a viewing direction of user 401 based on output of at least one sensor associated with the AR device. For example, the processing device (e.g., microprocessor 208) of AR device 200 may execute instructions of positional processing module 378, discussed above in relation to FIG. 3, to perform this step. The sensor may be included in AR device 200 and be configured to provide an output indicative of the viewing direction of the user. For example, the sensor may be configured to provide an output indicative of the viewing direction of the user by tracking a pattern of movement of an orientation of the head of the user. The sensor may also be configured to provide an output indicative of the viewing direction of the user by tracking a gaze of the user's eyes.

At step 830, AR device 200 may determine, based on the monitored viewing direction of user 401, whether user 401 is looking in a direction of a selectable element of the virtual menu. For example, the processing device of AR device 200 may execute instructions of positional processing module 378 to perform this step. For example, the processing device may determine the direction of the user's sight based on the orientation of the head of user 401 and/or based on the orientation of the gaze of the user's eyes. The processing device may further use coordinates of multiple references points of AR device 200 received from the sensors to determine the direction of the user's sight line.

At step 840, AR device 200 may determine an amount of time that the user looks in the direction of the selectable element of the virtual menu. For example, the processing device of AR device 200 may execute instructions of positional processing module 378 to perform this step. AR device 200 may determine the amount of time that the user looks in the direction of the selectable element based on periodical output received from the sensors at a predetermined time interval.

At step 850, AR device 200 may cause at least one action associated with the selectable element of the virtual menu if the amount of time determined in step 840 exceeds a predetermined dwell time threshold. For example, the processing device of AR device 200 may execute instructions of rendering services module 370, command processor 366, and/or third party applications 362 to perform this step. The predetermined dwell time threshold may be set as 3, 5, 10 seconds, or any other suitable time value. Further, the predetermined dwell time threshold may be configured by the positional processing module 378 or selected by the user via a user interface.

The at least one action associated with the selectable element may include expanding the selectable element, opening an application associated with the selectable element, providing an audible output of the text of the selectable element, performing a command of the selectable element, and so on. AR device 200 may include a speaker and the audible output of the text of the selectable element may be provided to the user via the speaker. For example, the speaker may be included in an earbud configured for placement inside the user's ear.

Nested Menu

Some embodiments may include a nested menu system that enables the user to look toward a menu shown on a display, select the menu, and expand the menu upon selection. The menu may appear to the user at a fixed location relative to real world coordinates. In some embodiments, the device may use eye tracking to control scrolling through a menu item.

For example, consistent with an embodiment, a wearable device provides a virtual menu to a user. The device comprises a display and at least one sensor configured to provide an output indicative of a viewing direction of a user (e.g., an orientation of a head of the user and/or an orientation of a gaze of the user's eyes). The device further comprises at least one processing device configured to monitor a viewing direction of the user based on the output of the at least one sensor. The at least one processing device is further configured to provide a menu on the display and determine based on the monitored viewing direction whether the user is looking in a direction of the location of the menu on the display. The at least one processing device is further configured to expand the menu if the user is determined to be looking in the direction of the location of the menu on the display.

Referring to FIG. 4, as described above, one or more sensors (e.g., one or more sensors included in sensor array 125) included in AR device 200 may be configured to detect a viewing direction of user 401 and provide an output indicative of the viewing direction to a processing device (e.g., microprocessor 208) of AR device 200. The processing device may be configured to display a virtual menu on display 204 in response to actions of user 401. For example, the processing device may be configured to display a virtual menu on display 204 if it is determined that the user is looking upward with respect to a predetermined horizontal threshold, to the right or to the left by a certain amount, or based on any other suitable trigger for displaying the menu. In some embodiments, the menu may be displayed based on voice commands from the user or by touch input to one or more user interface components associated with AR device 200. In some embodiments, the virtual menu may include a nested menu that can be expanded to display one or more new menu items not shown on the initial display of the menu.

As described above in connection with FIG. 4, the processing device of AR device 200 may be configured to a viewing direction of user 401 based on output received from the one or more sensors (e.g., any combination of accelerometers, gyroscopes, magnetometers, eye tracking sensors, or other suitable sensors, as discussed in more detail above). The processing device may be configured to determine whether user 401 is looking in a direction of the location of the menu on the display based on the monitored viewing direction of user 401. In some embodiments, positional processing module 378, as shown in FIG. 3, may be configured to store instructions that, when executed by a processing device (e.g., microprocessor 208) of AR device 200, determine whether the user is looking in a direction of the location of the menu based on output from the one or more sensors.

For example, the processing device may determine the direction of the user's sight line based on the monitored viewing direction of user 401. The processing device may identify a region on display 204 that includes the virtual menu. The identified region may be the same as or slightly larger than the area the virtual menu occupies. If the direction of the user's sight falls into the identified region, the processing device may determine that user 401 is looking in the direction of the location of the menu. On the other hand, if the direction of the user's sight falls outside the identified region, the processing device may determine that user 401 is not looking in the direction of the location of the menu.

In some embodiments, the processing device may be configured to determine the time duration that user 401 looks in a direction of the location of the menu based on output received from the sensor. For example, the sensors of AR device 200 may sense the viewing direction of the user at a predetermined time interval (e.g., 2, 4, 6, 10 or more times per second) and provide an output to the processing device. The processing device may determine the time duration that user 401 looks in a direction of the location of the menu based on whether the sensed orientation of the user's head changes from the previously detected orientation. For example, if the currently detected viewing direction of the user stays unchanged from the previously detected viewing direction (e.g., at the last time interval), the processing device may increase the amount of time that the user looks in the location of the menu by the predetermined time interval. If the currently detected viewing direction changes from the previously detected viewing direction, the processing device may determine that the user moves the direction of his or her sight line away from the location of the menu and may reset the amount of elapsed time that the user has looked in the location of the menu to zero. If the time duration that the user 401 looks in a direction of the location of the menu is less than a predetermined time threshold, the processing device may determine that user 401 does not intend to access the nested menu and may not take any action. On the other hand, if the time duration that the head of user 401 stays in a detected viewing direction is greater than or equal to the predetermined time threshold, the processing device may determine that user 401 intends to access the nested menu and may cause the menu to be expanded on display 204.

In some embodiments, the processing device may allow a small amount of difference between the currently detected viewing direction of the user and the previously detected viewing direction and still consider the user to have not changed his or her sight line. This may account for slight movements of the user's head and/or eyes such that the user does not need to remain perfectly still in order to cause a nested menu to be expanded. For example, if the currently detected viewing direction of the user changes from the previously detected orientation for less than a predetermined orientation threshold, the processing device may determine that the user is looking into the direction of the location of the nested menu and cause the menu to be expanded. On the other hand, if the detected viewing direction of the user changes from the previously detected orientation for equal to or more than the predetermined orientation threshold, the processing device may determine that the user is not looking into the direction of the location of the nested menu anymore and may not cause the menu to be expanded.

In some embodiments, a discussed above, alternative or in addition to monitoring an orientation of the user's head, the processing device of AR device 200 may be configured to monitor a user's gaze direction based on output received from one or more eye tracking sensors. For example, as discussed above, the processing device may be configured to determine whether user 401 is looking in a direction of the location of the menu on the display based on the direction of the user's gaze.

Figure 9A:
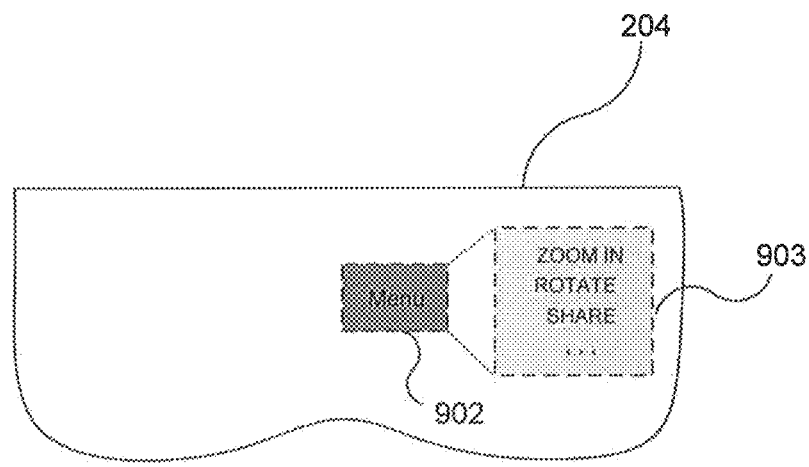
FIG. 9A illustrates an example of a nested menu that is displayed by an AR device consistent with disclosed embodiments.

FIG. 9A illustrates an example of a nested menu that may be displayed by an AR device by consistent with disclosed embodiments. For example, rendering services module 370, discussed above in reference to FIG. 3, may store software instructions that, when executed by a processing device (e.g., microprocessor 208), cause a nested menu including text and/or graphics to be displayed. Rendering services module 370 may further store instructions that are executable by the processing device to cause the nested menu to be expanded into one or more sub-menus in response to user input.

As shown in FIG. 9A, a nested menu 902 is displayed on display 204 of AR device 200. Nested menu 902 may include text, icons, check-boxes, graphics, or a combination thereof. In some embodiments, user 401 may look in the direction of the location of nested menu 902 in order to access the nested menu. The processing device of AR device 200 may determine that user 401 is looking in the direction of the location of nested menu 902 based on the monitored orientation of the head of user 401 and/or based on the monitored orientation of the user's gaze. In response to the determination, the processing device may cause nested menu 902 to be expanded into sub-menu 903 on display 204. As illustrated in FIG. 9A, sub-menu 903 may include new menu items that were not previously shown on nested menu 902. Although the items that are shown on sub-menu 903 include text in this example, the sub-menu items are not limited to text and can be text, icons, check-boxes, graphics, or a combination thereof. Sub-menu 903 may be displayed near nested menu 902 such that user 401 does not need to move the direction of the user's sight drastically in order to access sub-menu 903.

In some embodiments, sub-menu 903 may be displayed at a predetermined location on display 204, such as the center of display 204, an upper portion of display 204, or any other suitable location. The predetermined location for sub-menu 903 to be displayed may be pre-configured by user 401 through a user interface of AR device 200. For example, display 204 may allow user 401 to select a location of display 204 at which sub-menu 903 should display. In some embodiments, after sub-menu 903 is displayed at a pre-set location, user 401 may be allowed to drag sub-menu 903 to another location on display 204 that is preferred by user 401. The processing device of AR device 200 may set the new location as a default location for displaying sub-menu 903, and display sub-menu 903 at the new location subsequently when the processing device determines to expand nested menu 902 in future instances. In other embodiments, the location of sub-menu 903 may be locked to a predetermined position of display 204 such that user 401 cannot reposition the sub-menu.

In some embodiments, the processing device of AR device 200 may cause nested menu 902 to be highlighted on display 204 if the processing device detects that the user is looking in the direction of the location of nested menu 902. Nested menu 902 may remain highlighted during the time period that the user is looking in the direction of the location of nested menu 902 until sub-menu 903 is displayed on display 204. If the direction of the user's sight line is moved away from the location of nested menu 902 before a sub-menu is being displayed, the processing device may stop highlighting nested menu 902 and not display the sub-menu to the user. In other embodiments, nested menu 902 may be highlighted for a predetermined time period, such as one second or multiple seconds, if the processing device determines that user 401 is looking in the direction of the location of nested menu 902.

Once a nested menu is provided on display 204, AR device 200 may be configured to display the nested menu in a fixed location relative to the display, such as in a locked mode. For example, nested menu 902 may be locked in the user's field of view while user 401 moves his or her head to a new position. That is, once nested menu 902 has been provided on the display, nested menu 902 may be locked to a particular location relative to display 204 such that subsequent movements of the head of the user do not cause movement of nested menu 902 relative to display 204.

In other embodiments, nested menu 902 may be provided at a fixed, perceived location relative to the user, such as in an unlocked mode. For example, nested menu 902 may appear on the display whenever the head of user 401 is moved to a particular orientation, e.g., rotated a certain degree to the right, to the left, or vertically. Once the nested menu is displayed in such an unlocked mode, the location of the nested menu may be changed as the user rotates the head toward the perceived location of the menu (as described in more detail above). For example, once nested menu 902 is shown on the display, subsequent head movements and/or eye movements further in the upward direction may cause the location of nested menu 902 to move downward on the display. Similarly, subsequent head movements and/or eye movements in a downward direction may cause the location of nested menu 902 to move upward on the display. Additionally, the processing device may be configured to also cause changes in the left-right position of the nested menu relative to the display in response to detected horizontal movements of the user's head and/or eyes (e.g., right-left changes in the looking direction of the user's head and/or eyes).

In other embodiments, the nested menu may be provided at a fixed location relative to real world coordinates, where the fixed location remains constant irrespective of user movements. In such embodiments, display of the nested menu may depend on whether the user's head orientation and/or gaze direction of the user's eyes are determined, by the processing device, to cause the fixed, virtual position of the menu to be within the user's field of view. When the menu's location is determined to be within the user's field of view, it is provided to the display. When the menu's location is determined to be outside of the user's field of view, the menu is not displayed. For example, the user may perceive that the nested menu occurs at a particular location of particular coordinates in the real world, and when the user moves or looks away from that particular location, the nested menu may not appear on the display. That is, the display of the nested menu may depend not only on the specific viewing direction of the user, but also the physical location/orientation of the user or user's head and/or eyes relative to real world coordinates. Even if the orientation of the head and/or eyes of the user remains the same, if the physical location of the user changes, the nested menu may disappear from the display. The nested menu may reappear on the display when the user looks again at the particular location in the real world designated as the perceived location of the menu in real world coordinates.

The above described methods of moving nested menu 902 on the display can be applied similarly to sub-menu 903, items shown on sub-menu 903, and the like. It should be understood that one method may be applied to move the location of nested menu 902 on the display, such as the locked mode, while another method may be applied to move the location of sub-menu 903, such as the unlocked mode.

In some embodiments, sub-menu 903 may contain multiple items, and it may not be desirable to display the complete list of menu items on display 204. The processing device of AR device 200 may be configured to show a partial list of menu items when nested menu 902 is expanded into sub-menu 903. For example, the processing device may display a punctuation mark, such as an ellipsis, on the bottom of sub-menu 903, indicating to the user that additional menu items are available and not being currently displayed. As illustrated in FIG. 9A, sub-menu 903 shows three menu items and an ellipsis indicating that more menu items are available but are not currently in display. In some implementations, the processing device may be configured to place the most frequently used menu items by user 401 on the top list of sub-menu 903 such that those items may be shown to user 401 when nested menu 902 is expanded into sub-menu 903. In other implementations, the processing device may be configured to allow user 401 to make a selection via a user interface as to the order of the menu items being shown on the display.

Figure 9B:
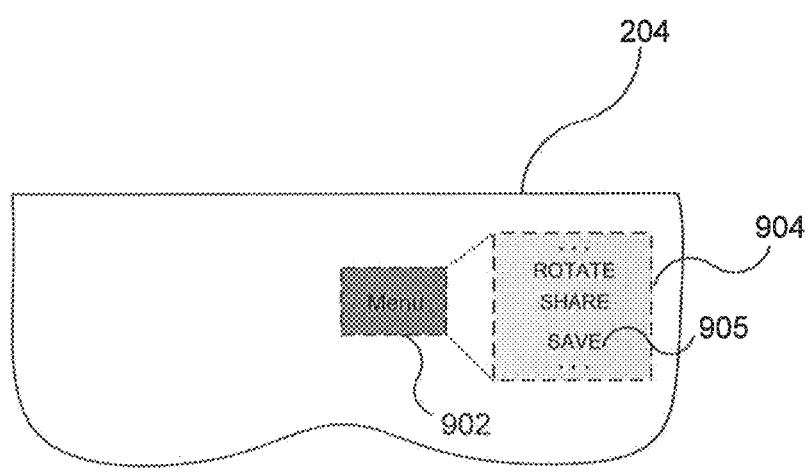
FIG. 9B illustrates another example of a nested menu that is displayed by an AR device consistent with disclosed embodiments.

FIG. 9B illustrates another example of a nested menu that is displayed by an AR device consistent with disclosed embodiments. In some embodiments, the processing device of AR device 200 may be configured to scroll through a virtual menu in response to user input. The user input may include an output of an eye tracking sensor configured to determine a direction of the user's gaze. For example, after sub-menu 903 is displayed, user 401 may look in a direction of the ellipsis at the bottom of sub-menu 903, or downward relative to the location of sub-menu 903, continuously for a certain period of time, such as one second or multiple seconds. In response to the user looking in the direction of the ellipsis at the bottom of sub-menu 903 or a downward direction relative to the location of sub-menu 903, the processing device may be configured to scroll down sub-menu 903. As shown in FIG. 9B, in sub-menu 904, the menu items shown on sub-menu 903 are scrolled down for one line, the menu item "zoom in" on the top line of sub-menu 903 is not shown in sub-menu 904, and a new menu item 905 is shown in sub-menu 904. If user 401 changes the direction of sight to the ellipsis at the top of sub-menu 904, or an upward direction relative to the location of sub-menu 904, continuously for a certain period of time, the processing device may be configured to scroll up sub-menu 904, and sub-menu 903 may be displayed again on the display.

In some embodiments, user 401 may be able to configure the speed the menu is scrolled through. For example, AR device 200 may display an interface for user 401 to configure the time period that the menu will scroll through one line. For example, user 401 may select 0.5, 1, or 2 seconds, or any other suitable time interval that before a menu to scroll up or down for a single line. Thus, if user 401 looks at a direction downward to the location of sub-menu 903 for 2 seconds, sub-menu 903 may be scrolled down for 4 lines, 2 lines, or 1 line depending on the user's selection of the time interval for the menu to be scrolled through for a single line.

In some embodiments, the processing device of AR device 200 may be configured to display a scrolling mark on the sub-menu, such as an ellipsis, an arrow, or a scrolling bar. If it is determined that the user is looking in a direction of the scrolling mark, the processing device may cause the sub-menu to be scrolled up or down in the corresponding direction. For example, if the processing device determines that the user is looking in a direction of a scrolling mark placed in the upper region of the sub-menu, the processing device may cause the sub-menu to be scrolled up. If the processing device determines that the user is looking in a direction of a scrolling mark placed in the lower region of the sub-menu, the processing device may cause the sub-menu to be scrolled down.

In some embodiments, the processing device of AR device 200 may be configured to identify a region above or below the menu such that if it is determined that the user's gaze falls into the region, the processing device may cause the menu to be scrolled up or down. For example, the processing device may identify a rectangular region on display 204 that is located directly above sub-menu 904 such that if it is determined that a direction of the user's gaze falls into the region, the processing device may cause sub-menu 904 to be scrolled up. Similarly, the processing device may identify a rectangular region on display 204 that is located directly below sub-menu 904 such that if it is determined that a direction of the user's gaze falls into the region, the processing device may cause sub-menu 904 to be scrolled down.

Figure 10:
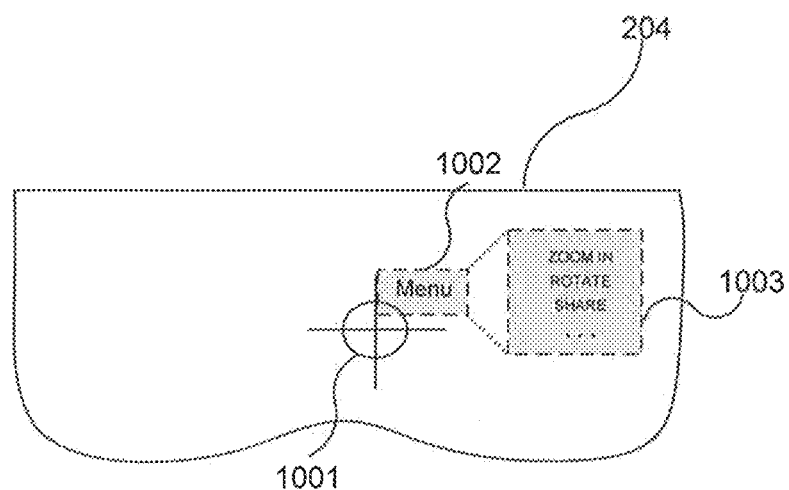
FIG. 10 illustrates an example of accessing a nested menu that is displayed by an AR device consistent with disclosed embodiments.

FIG. 10 illustrates an example of accessing a nested menu that is displayed by an AR device consistent with disclosed embodiments. As shown in FIG. 10, a reticle 1001 may be shown on display 204. Reticle 1001 may constitute a virtual reticle shown on display 204 whose position on display 204 may be changed in response to user input. For example, one or more eye tracking sensors, as described above, may enable tracking of a user's gaze direction, and the position of reticle 1001 on display 204 may be changed with determined changes in the user's gaze direction.

In some embodiments, reticle 1001 may be fixed relative to display 204 (e.g., may be physical inscribed or otherwise marked on display 204 or any other suitable component of AR device 200) such that reticle 1001 moves with changes in the user's head orientation. In such embodiments, reticle 1001 may be used, e.g., to selectively overlap with and select portions of a nested menu that remains unlocked relative to display 204 and fixed relative to real world coordinates.

In some embodiments, reticle 1001 may be turned on or off on display 204 by user input. For example, if user 401 presses the portion of display 204 at which reticle 1001 is shown for a certain period of time, the processing device may be configured to remove reticle 1001 from display 204. As another example, one or more buttons may be placed on AR device 200 for user 401 to turn on or turn off reticle 1001 on display 204. Display of reticle 1001 and/or selection of any menu components may also be facilitated by recognized voice commands or recognized hand gestures (or any other suitable triggers) made by the user.

In some embodiments, reticle 1001 may be shown at the center of display 204 when it is initially turned on, and may be moved to other locations in response to user input. For example, user 401 may drag reticle 1001 from one position to another position on display 204 by touching display 204. Alternatively or additionally, the processing device may be configured to move the position of reticle 1001 in response to sensed changes in the user's gaze direction (as discussed above). Further, as discussed above, the position of reticle 1001 relative to any displayed menu items may be changed by tracking the user's head orientation and updating the position on display 204 at which the menu items are displayed as the user's head orientation changes. The processing device may move the position of the menu items in the opposite direction as the detected direction of the movement of the head of user 401, such that reticle 1001 intercepts any of the displayed menu items. Regardless of the configuration of reticle 1001 (e.g., whether fixed relative to display 204 or floating relative to display 204), if the processing device determines that the position of reticle 1001 is moved to intercept a portion of the nested menu 1002, the processing device may expand the nested menu 1002 to sub-menu 1003 or make a selection of any portion of nested menu 1002 or sub-menu 1003.

As shown in FIG. 10, if the processing device determines that the position of reticle 1001 is moved to intercept a portion of nested menu 1002, the processing device may expand the nested menu 1002 to sub-menu 1003. The reticle 1001 may intercept any part of nested menu 1002, such as upper part, lower part, or other parts of the menu, to cause it to be expanded. In some embodiments, the processing device may cause nested menu 1002 to be expanded if the area of the portion of the menu that is intercepted by reticle 1001 is greater than or equal to a predetermined area threshold. If the area of the portion of the menu that is intercepted by reticle 1001 is less than the predetermined area threshold, the processing device may determine that the user does not intend to expand the nested menu and would not cause the nested menu to be expanded. The predetermined area threshold may be set as a percentage of the area of the nested menu, such as 10 percent, 20 percent, or more of the area of the nested menu.

After nested menu 1002 is expanded into sub-menu 1003, user 401 may further move the position of reticle 1001 to the position of certain item of sub-menu 1003 to cause further actions to be performed by AR device 200. For example, user 401 may move the position of reticle 1001 to intercept the sub-menu item "share" on sub-menu 1003, and correspondingly, the processing device may proceed to perform the action of sharing the user's current field of view with other users.

Figure 11:
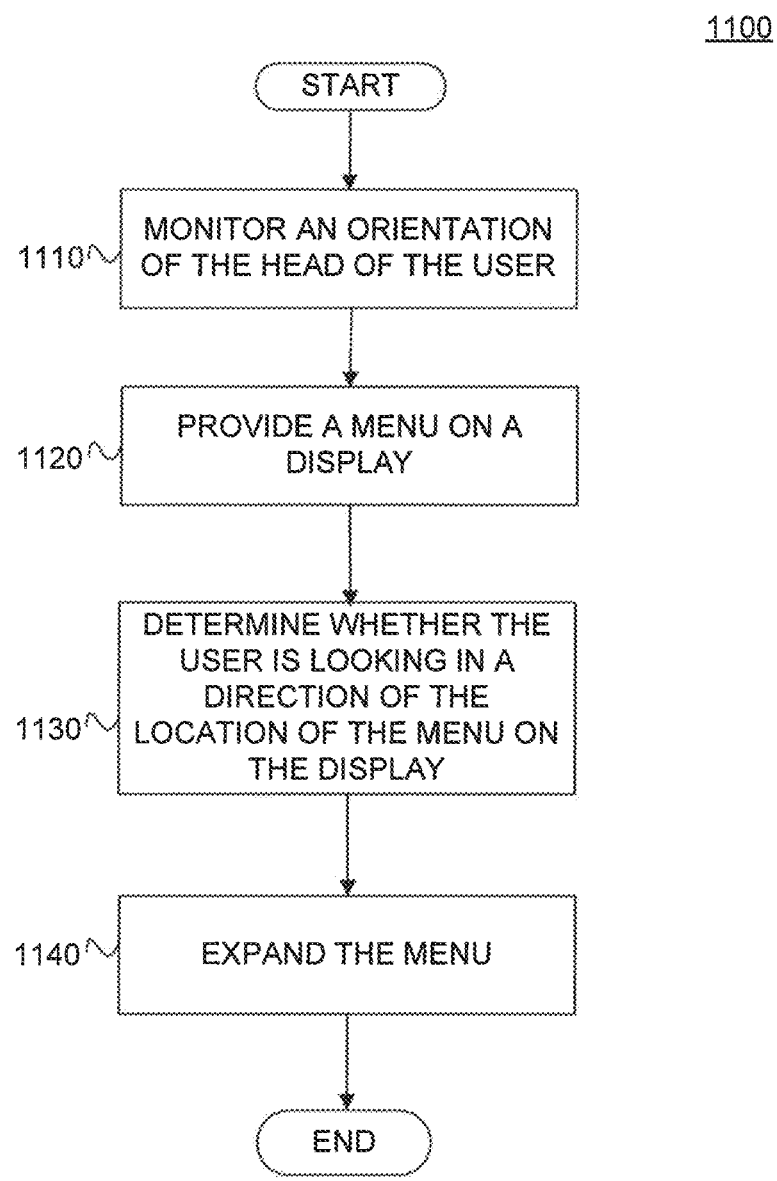
FIG. 11 is a flowchart of an exemplary process for accessing a nested menu by an AR device consistent with disclosed embodiments.

FIG. 11 is a flowchart of an exemplary process 1100 for accessing a nested menu by an AR device consistent with disclosed embodiments. As an example, one or more steps of process 1100 may be performed by AR device 200 shown in FIG. 2. For example, in process 1100, a sensor of AR device 200 may detect an orientation of a head of user 401 and/or an orientation of the gaze of the eyes of user 401 and provide a corresponding output to a processing device of AR device 200.

At step 1110, AR device 200 may monitor a viewing direction of the user (e.g., an orientation of the head of the user and/or an orientation of the gaze direction of the user's eyes) based on the output of the at least one sensor associated with the AR device. For example, the processing device (e.g., microprocessor 208) of AR device 200 may execute instructions of positional processing module 378, discussed above in relation to FIG. 3, to perform this step. The sensor may be included in AR device 200 and be configured to provide an output indicative of the orientation of the user's head. For example, the sensor may be configured to provide an output indicative of the viewing direction of the user by tracking a pattern of movement of an orientation of the head of the user. As another example, the sensor may be configured to provide an output indicative of the viewing direction of the user by tracking a gaze of the user's eyes.

At step 1120, AR device 200 may provide a menu on display 204. For example, the processing device of AR device 200 may execute instructions of rendering services module 370 to perform this step. The processing device may show the menu on display 204 such that the user perceives the menu location as fixed relative to real world coordinates and variable relative to display coordinates. In some embodiments, the processing device may be configured to change a location of the menu relative to the display when the user rotates the head toward the menu.

At step 1130, AR device 200 may determine, based on the monitored viewing direction of user 401, whether user 401 is looking in a direction of the location of the menu on the display. For example, the processing device of AR device 200 may execute instructions of positional processing module 378 to perform this step. For example, the processing device may determine the direction of the user's sight line based on the orientation of the head of user 401 and/or the orientation of the gaze direction of the eyes of user 401. The processing device may further use coordinates of multiple references points of AR device 200 received from the sensors to determine the direction of the user's sight line.

At step 1140, AR device 200 may expand the menu if the user is determined to be looking in the direction of the location of the menu on the display. For example, the processing device of AR device 200 may execute instructions of rendering services module 370 to perform this step. Expanding the menu may include showing to the user at least one menu element not shown upon initial display of the menu. Expanding the menu may also include exploding the menu into a plurality of new menu items shown on the display, and the plurality of new menu items may be arranged around an originally displayed menu item. In some embodiments, the processing device may be configured to display a reticle on the display and expand the menu if the user moves a position of the reticle to intercept at least a portion of the menu.

Look-Initiated Communication

In some embodiments, a wearable AR device may be configured to initiate and maintain a communication link with another device, such as another AR device, a smartphone, a tablet, or other computing device. That is, in one example, a wearable AR device may initiate a communication link that allows a user of the device to communicate with another individual, such as another user of a wearable AR device. The communication link may include any electronic pathway through which two or more individuals may communicate (e.g., by speaking, sharing information, etc.) with each other.

A wearable AR device that is configured to allow a user to communicate with another individual presents an opportunity for an enhanced and/or improved communication experience. For example, such AR devices may allow individuals to communicate with each other in situations in which alternative forms of communication may be difficult or impossible. Such communication may include, for example, private or secretive communication, remote communication, communication in environments that are too loud or too quiet for speaking at natural volume, etc. Further, such a device may enhance convenience and reduce effort when it comes to communicating (e.g., directly speaking) with another person.

A wearable AR device according to the present disclosure may include features that allow for initiation of a communication link through a process that incorporates aspects of natural communication experiences and minimizes the steps necessary to open the communication link. These features may enhance the user's augmented reality experience, allowing for increased and efficient communication abilities between individuals while providing a natural and easy-to-use experience.

In an exemplary embodiment, a wearable AR device may initiate a communication link based on an orientation of the device. For example, in an embodiment in which a wearable AR device is worn on a head of a user, the device may initiate a communication link based on a head orientation of the user. In one example, a wearable AR device may be configured for communication by a user orientating a head-worn AR device towards a person of interest, resulting in the wearable AR device opening a communication link between the user and the person of interest. In some embodiments, alternative or in addition to monitoring an orientation of the user's head, the processing device of AR device 200 may be configured to monitor a user's gaze direction based on output received from the one or more eye tracking sensors. For example, the processing device may be configured to initiate a communication link based on the direction of the user's gaze.

Figure 12:
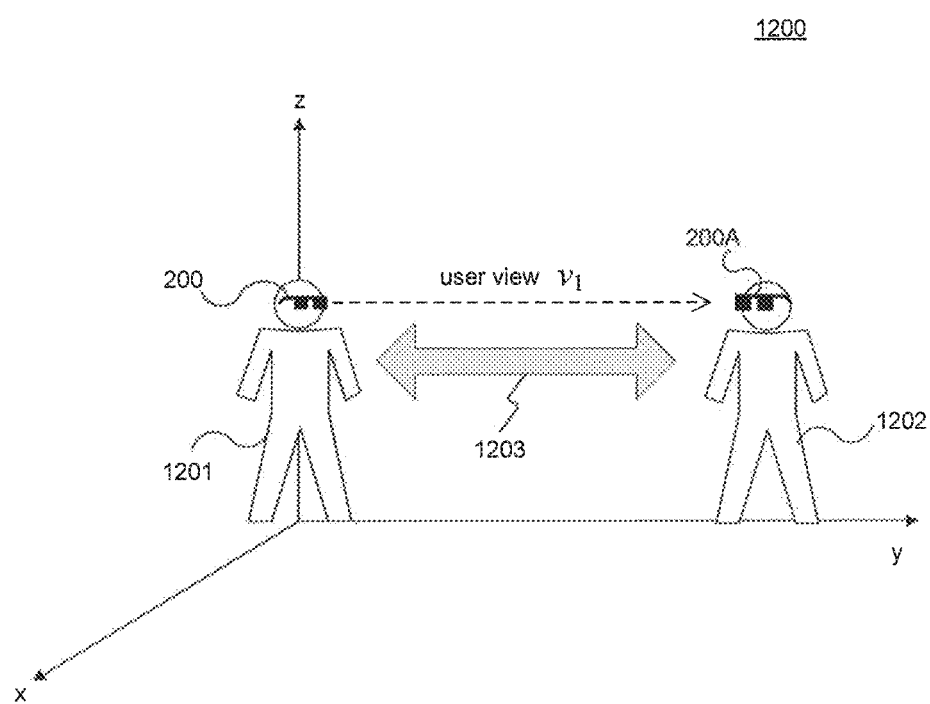
FIG. 12 illustrates an example of a user of a wearable AR device initiating communication with another user consistent with disclosed embodiments.

FIG. 12 illustrates an example of a user 1201 wearing an AR device consistent with disclosed embodiments. As shown in FIG. 12, user 1201 is in an environment 1200 and is wearing AR device 200, as discussed above regarding FIG. 2. AR device 200 may include a frame configured to secure the device to the head of user 1201. As discussed above, AR device 200 may include sensor array 125. Sensor array 125 may include one or more sensors configured to detect the viewing direction of user 1201 by detecting the position and/or orientation of AR device 200. The one or more sensors may include any one or more of a motion detector (e.g., a gyroscope and/or an accelerometer), a camera, a location determination device (e.g., a GPS device and/or an NFC reader), a magnetometer, and/or an orientation sensor (e.g., a theodolite, infra-red sensor). Such magnetometers (compasses) may detect orientation or a direction that a user is looking, accelerometers (e.g., three-axis accelerometers) to detect the direction and speed of movements associated with AR device 200, or the like. In addition, as discussed above, AR device 200 may include input/output features that enable communication with another device, such as a microphone, audio buds/speakers, a front facing camera, and a display. Further, as discussed above, sensor array 125 may include one or more eye tracking sensors configured to detect a viewing direction of the user's gaze.

In some embodiments, a memory of AR device 200 (e.g., positional processing module 378) may be configured to store instructions that when executed by a processing device (e.g., microprocessor 208) of AR device 200, determine the viewing direction of user 1201 (e.g., the orientation of the head of user 1201 and/or the gaze direction of the eyes of user 1201) based on output from the one or more sensors. The processing device may be further configured to execute instructions to initiate a communication link between AR device 200 and another device (e.g., another AR device), based on the determined viewing direction of user 1201.

In one embodiment, AR device 200 may be oriented toward a direction that corresponds to a user view v1. For example, in an embodiment in which AR device 200 is wearable as glasses, AR device 200 may be oriented in a direction that user 1201 is looking. In this way, a head orientation determined by the sensors associated with AR device 200 may correspond to a direction that user 1201 is looking.

In an exemplary embodiment, AR device 200 may be configured to initiate a communication link with a device 200A based on a determination that AR device 200 is oriented towards a device 200A and/or a user associated with device 200A. For example, as shown in FIG. 12 user 1201 may look at a user 1202 (i.e., user 1202 is located in the user view v1), who may possess (e.g., be wearing) device 200A, which in an exemplary embodiment is another AR device. It should be understood that device 200A may be of the same or a different type than AR device 200 being used by user 1201, and is not necessarily an augmented reality device. That is, user 1202 may possess and/or wear any device that may provide its location to server system 110 (e.g., via a smartphone, tablet, computer, etc., using GPS) and/or that may have communication capabilities. For example, user 1202 may be using a smartphone and user 1201 may identify a location of and/or communicate with the smartphone using AR device 200.

Based on at least the determination that AR device 200 is oriented toward user 1202 (and/or device 200A), AR device 200 may be configured to initiate a communication link 1203 that allows user 1201 to communicate with user 1202 and, in some embodiments, vice versa. For example, in some embodiments, as user 1201's AR device 200 rotates in the environment and its field of view changes, different people of interest and/or representations (e.g., an image, text, icon, etc.) of people of interest may be displayed on the display of AR device 200 when its field of view overlaps with the location of each person of interest. Then looking at a person of interest or an icon representing them may establish a communication link, even if the person is using a different type of device (e.g., a smartphone).

AR device 200 may be configured to identify people of interest and display them and/or representations of them based on information received by AR device 200. For example, AR device 200 may populate a list of people of interest from a list of contacts received by AR device 200. In some embodiments, AR device 200 may designate any individual possessing a device, to which AR device 200 may establish a communication link, as a person of interest. It should be understood that AR device 200 may define people of interest in advance of user 1201 using AR device 200. In some embodiments, server system 110 may automatically define people of interest. For example, certain groups (e.g., corporations, military units, etc.) may register associated individuals with server system 110 and allow any AR device connected to server system 110 to use the registered individuals as a list of people of interest. AR device 200 may receive location information associated with people of interest and display representations of these people to user 1201 (e.g., when they are within a certain distance of AR device 200).

As shown in FIG. 12, communication link 1203 may be a pathway through which user 1201 may communicate with user 1203. For example, communication link 1203 may allow user 1201 to speak into AR device 200 such that the speech is reproduced by device 200A. For instance, user may speak into a microphone of AR device 200, which may transmit audio data to device 200A over a network (e.g., cellular connection, Wi-Fi connection, radio connection, etc.). Device 200A may interpret the audio data and audibly provide user 1201's voice to user 1202, such as through an associated audio bud/speaker. In some embodiments, user 1202 may communicate with user 1201 in a similar manner (e.g., by speaking into a microphone associated with device 200A). In this way, communication link 1203 may allow user 1201 to communicate with user 1202 based on the orientation of AR device 200.

Figure 13:
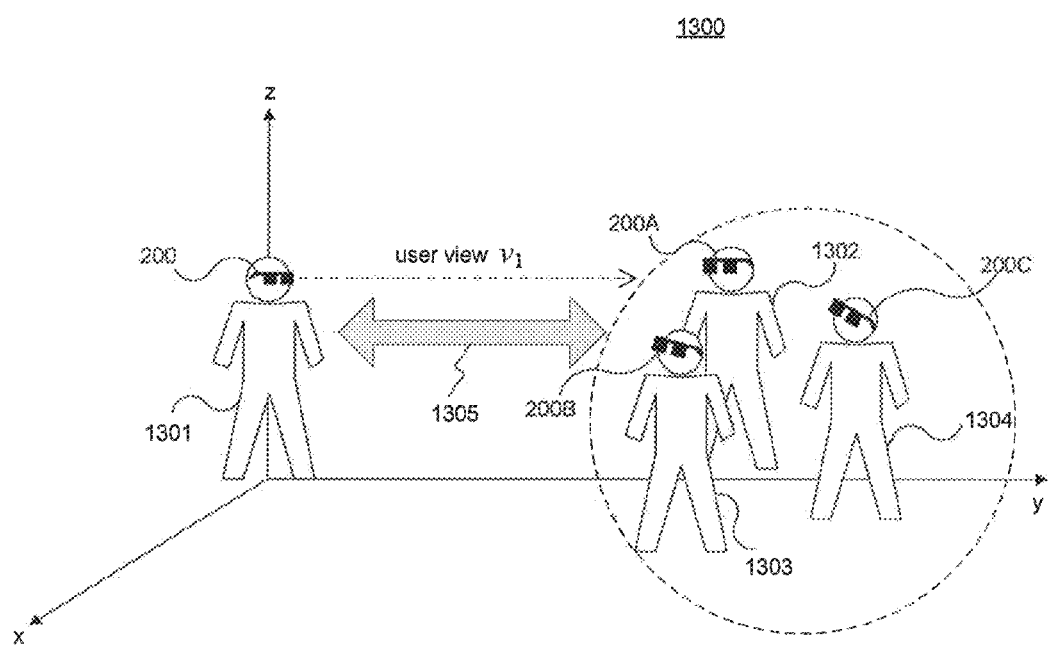
FIG. 13 illustrates an example of a user of a wearable AR device initiating communication with a group of users consistent with disclosed embodiments.

FIG. 13 depicts another embodiment, in which a user 1301 in an environment 1300 may communicate with a group of users 1302, 1303, and 1304. In an exemplary embodiment, user 1301 may wear AR device 200. AR device 200 may be configured to initiate a communication link 1305 based on a head orientation of AR device 200, in manner similar to that described above with respect to FIG. 12. For example, AR device 200 may be configured to initiate communication link 1305 between AR device 200 and a device 200A possessed (e.g., worn) by user 1302 based on a determination that user 1301 is looking at user 1302. Users 1301 and 1302 may subsequently communicate with (e.g., speak to) each other through communication link 1305, using AR device 200 and device 200A. In some embodiments, as discussed above, alternative or in addition to monitoring an orientation of the user's head, the processing device of AR device 200 may be configured to monitor a user's gaze direction based on output received from the one or more eye tracking sensors. For example, the processing device may be configured to initiate a communication link 1305 based on the detected gaze direction of user 1301.

In the embodiment of FIG. 13, communication link 1305 may further allow user 1301 to communicate with users 1303 and 1304, who may possess (e.g., wear) devices of their own, such as AR devices 200B and 200C, respectively. For example, AR device 200 may determine that users 1302, 1303, and 1304 are part of a group, and therefore communication with any one of devices of 200A, 200B, and 200C may be replicated across all of the devices such that user 1301 may communicate (e.g., by speaking, sharing information, etc.) with each of users 1302, 1303, and 1304. Users 1302, 1303, and 1304 may communicate with each other and/or user 1301 in a similar manner. Further, while AR device 200 is described as initiating communication link 1305 based on being oriented toward user 1301, it should be understood that communication link 1305 may be initiated based on AR device 200 being oriented toward any of users 1302, 1303, 1304 (or being generally oriented toward two or more of them).

It should be understood that communication link 1305 may be configured such that various types of group communication may be possible. In some instances, communication link 1305 may operate like a conference call, where all individuals connected through communication link 1305 can hear and can talk to all others. In other instances, communication link 1305 may be one way communication where members of the group (e.g., users 1302, 1303, 1304) can hear a communication leader (e.g., user 1301) and can talk with the communication leader but cannot hear or talk with others in the group. AR device 200 may be configured such that a user can select the type of group communication to be used.

Figure 14:
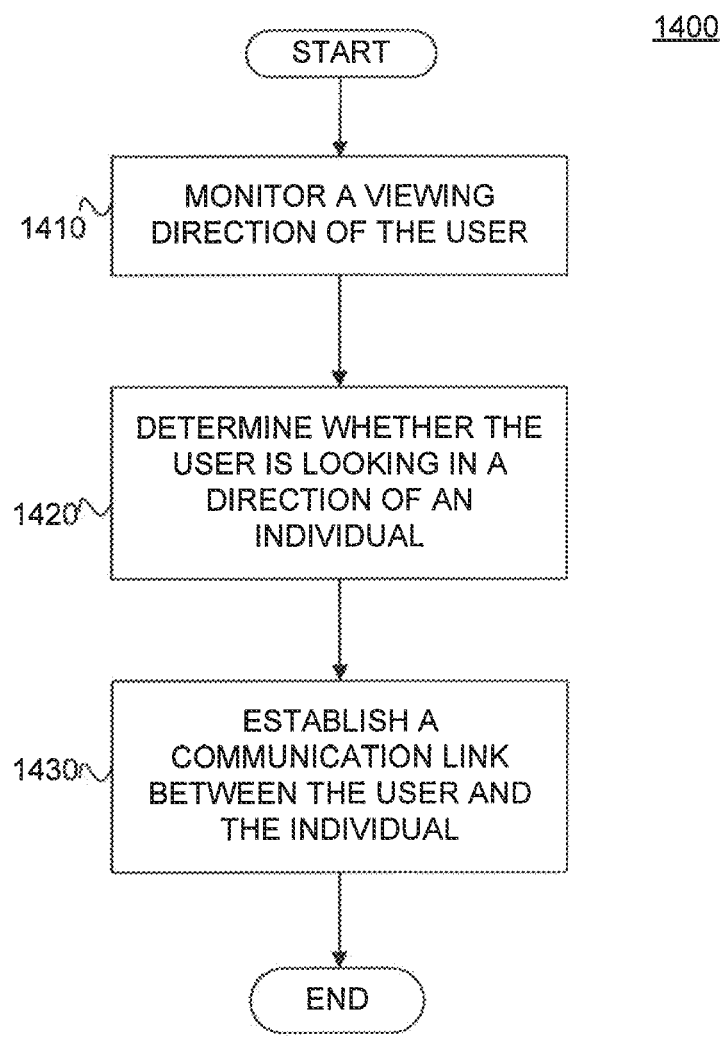
FIG. 14 is a flowchart of an exemplary process for initiating communicating with a user of a wearable AR device consistent with disclosed embodiments.

FIG. 14 is a flowchart of an exemplary process 1400 for providing a communication link between at least two users, such as users 1201 and 1202 of FIG. 12, wearing AR device 200 and device 200A, respectively. In one example, one or more steps of process 1400 may be performed by an AR device 200 as shown in FIG. 2. For example, user 1201 may wear AR device 200 and move their head and/or eyes in a particular viewing direction. The sensors associated with AR device 200 may determine the viewing direction of user 1201.

At step 1410, AR device 200 may monitor a viewing direction user 1201 (e.g., an orientation of the head of user 1201 and/or a gaze direction of the eyes of user 1201) based on output of at least one sensor associated with AR device 200. For example, a processing device (e.g., microprocessor 208) of AR device 200 may execute instructions of positional processing module 378, discussed above in relation to FIG. 3, to perform this step. The sensor may be included in AR device 200 and may be configured to provide an output indicative of the viewing direction of the user. For example, the sensor may be configured to provide an output indicative of the viewing direction of the user by tracking a pattern of movement of an orientation of the head of the user. As another example, the sensor may be configured to provide an output indicative of the viewing direction of the user by tracking a gaze of the user's eyes.

At step 1420, AR device 200 may determine whether the user is looking in a direction of an individual. For example, AR device 200 may compare a viewing direction of user 1201 with additional information to determine that user 1201 is looking in a direction of user 1202. The additional information may include, for example, a location of user 1202. The location of user 1202 may be determined, for example, through input from a sensor (e.g., a camera) associated with AR device 200 and/or through location data determined by device 200A and sent to AR device 200 (e.g., over a wireless network). Further, as discussed above, AR device 200 may locate any suitable device (e.g., a smartphone, tablet, computer, etc.) and provide information to AR device 200 regarding devices that are available for communication.

At step 1430, AR device 200 may establish a communication link between the user and the individual. For example, AR device 200 may establish a communication link 1203 between user 1201 and user 1202, via AR device 200 and device 200A. The established communication link may be a pathway through with user 1201 may communicate (e.g., speaking, sharing information, etc.) with user 1202. As described herein, the communication link may be two-way (e.g., user 1202 can reciprocally communicate with user 1201), although not necessarily.

In some embodiments, the communication link may be established when user 1201 speaks into AR device 200. For example, AR device 200 may determine that the speech is intended for user 1202 (since user 1201 is looking at user 1202) and transmit audio data to device 200A. In some embodiments, AR device 200 may determine whether user 1202 is oriented toward user 1201 before a communication link is established. It should be understood, however, that, in at least some embodiments, user 1202 need not be looking at user 1201 in order for AR device 200 to determine that user 1201 is looking in a direction of an individual (and/or establish a communication link). Similarly, AR device 200 may determine whether another individual is a recognized person. For example, AR device 200 may process image data from a sensor (e.g., camera) and determine that at least a portion of an individual is in the image data. AR device 200 may compare image data with stored image data, to determine whether the at least one individual is a recognized person. In some embodiments, AR device 200 may establish a communication path between the user and the at least one individual if the at least one individual is a recognized person.

Once the communication link is established, users 1201 and 1202 may continue to communicate with each other until the communication link is deactivated. In an exemplary embodiment, the communication link may remain active even if user 1201 stops looking at user 1202 (e.g., moves their head around). AR device 200 may include a feature to allow the communication link to be deactivated. For example, AR device 200 may deactivate the communication link when AR device 200 determines that user 1201 is no longer looking at user 1202 (e.g., for a threshold period of time). In other embodiments, user 1201 may cause the communication link to be deactivated by pressing a button, using a voice command, looking in a certain direction (e.g., up) or in a certain pattern, selecting a hang up icon on the display with eye tracking or by moving a reticle to a hang up icon.

It should be understood that AR device 200 may perform a process similar to process 1400 to communicate with a group of individuals. For example, as described with respect to FIG. 13, AR device 200 may establish a communication link between users and determine that the communication link should be used to connect to additional users, such as other individuals in the area and possessing (e.g., wearing) their own devices capable of communication through the communication link.

In some embodiments, AR device 200 may be configured to establish a communication link between a user and another individual who is physically separated from the user by a wall, building, and/or geographic distance which would prevent the user and the other individual from seeing each other. For example, AR device 200 may present an indication (e.g., text, an icon, an image of a person's face, etc.) in the view of the user through a display associated with AR device 200. The indication may identify other individuals that the user is facing, even though the use cannot see them. AR device 200 may determine the existence of these individuals based on an orientation of AR device 200 and location information associated with the other individuals.

As described above, AR device 200 may display representations of individuals in a manner consistent with their relative location with respect to AR device 200. For example, in some embodiments, a representation (e.g., an image, text, icon, etc.) representing a person of interest may be displayed in a user's field of view, if that user's location is or would be in the field of view. A user may select the representation to establish a communication link.

The user may select the representation by, for example, orienting a reticle with the representation. For example, AR device 200 may display a reticle on its display and allow head-movements made by the user to indicate the direction or location of the representation to be selected by lining up the reticle with the representation. In some embodiments, a particular representation may be selected if the time that the user looks in the direction of the representation on the display exceeds a predetermined dwell time threshold (e.g., 1 second, 2 seconds, 3 seconds, 5 seconds, 10 seconds, etc.). It should be understood, however, that other selection mechanisms are possible (e.g., pressing a button, speaking an audible command, etc.). After the user has selected the representation, a communication link may be established between the user's AR device and the other user's device.

In the above embodiment, by rotating or changing head orientation and/or eye orientation and, therefore, the associated field of view, a user may see the individuals that are located in a position that is or would be in the user's field of view (e.g., are located in a position that is generally aligned with a direction that the user is looking). Further it should be understood that AR device 200 may present information associated with the location of individuals in a convenient manner. For example, representations shown in AR device 200's display may vary based on a relative distance to user 1201. For example, for individuals that are close by, AR device 200 may display individual pictures, text, icons, etc. For individuals that are far away, AR device 200 may display a nested icon that can be expanded upon selection, allowing selection of a particular individual included in the nested icon. In addition, AR device 200 may be configured to filter information associated with other individuals such that only certain individuals and/or representations are displayed at a given time. For example, AR device 200 may use a filter that shows only people that are within a certain distance range from the user, or show only people within a particular azimuth range. In another embodiment, AR device 200 may show only certain user-selected people (e.g., "favorites" specific to the user of AR device 200.).

In some embodiments, AR device 200 may be configured to be used to communicate with people within certain radiuses of the user. For example, AR device 200 may display a representation only for people within 100 m, 500 m, 1 km, etc. of the user. AR device 200 may also show representations for people at farther distances, such as one mile, several miles, or even hundreds or thousands of miles, if desired. For example, user 1202 may look in a general direction and AR device 200 may display a representation of a person in that direction or virtual location, even though the associated person is in a different city or country. User 1202 may nonetheless select the representation, and AR device 200 may establish a communication link between user 1202 and the person in the different city or country.

Consistent with disclosed embodiments, a device, such as an AR device, may establish a communication link with another device based on an orientation of a user of the AR device, such as an orientation that includes the user looking at another individual. This feature may align naturally with the normal interaction of human communication, where users look at each other while talking. The ability to communicate through an AR device based on looking at another person may allow for improved and efficient communication in a simple and natural manner, allowing people to more easily communicate in instances when it may otherwise be difficult. For example, AR device 200 may allow for communication between users that can see each other but are too far away to talk at a normal or acceptable speaking volume, users that wish to speak privately or secretly even though others are present in a room, users that are relatively nearby but cannot see each other, and the like).

Unlocking a Wearable Device

In some embodiments, a wearable augmented reality device may be configured to secure digital data associated with the device with password protection or similar security features. Wearable AR devices, in some cases, may not include typical input devices familiar to users of personal computing devices, such as a mouse and a keyboard. Accordingly, wearable AR devices consistent with disclosed embodiments may be configured to allow a user to enter user credentials and passwords using other inputs and methods that, in some embodiments may allow for hands-free interaction. For example, in some cases including a head mounted wearable AR device, user credentials and passwords may be entered based on the detected orientation of the user's head and/or the detected gaze direction of the user's eyes, among other techniques.

This system of credential entry may avoid challenges and security risks typically associated with attempting to enter passwords on a user device. Entering long strings of letters, numbers, and/or characters requires memorization of these strings, which may be difficult. Entry of passwords on touch screen devices leaves smudges or other visual indicia that can be used to steal those passwords. And entering letters, numbers, and characters without external input devices may be difficult and time-consuming.

For example, consistent with some embodiments, a wearable device may include a display and at least one sensor configured to provide an output indicative of a viewing direction of a user (e.g., an orientation of the head of a user and/or a gaze direction of the eyes of a user). The wearable device may further include at least one processing device configured to monitor a viewing direction of the user based on the output of the at least one sensor. On the display, the user may be presented with a visual depiction of a series of points. In operational scenarios where entry of passwords or other credentials is required, the user may "dwell" or orient a depiction of a cursor (or reticle) over specific points for specified periods of time. The "password" may thus represented by a predetermined pattern of the displayed points. To enter the password, the user may follow the predetermined pattern, dwelling on the first point, then the next, etc. until the pattern is completed. Based on the monitored viewing direction, the at least one processing device may be further configured to determine whether the user has successfully "entered" the password.

As discussed above, in some embodiments, alternative in addition to monitoring an orientation of the user's head, the processing device of AR device 200 may be configured to monitor a user's gaze direction based on output received from one or more eye tracking sensors. For example, the processing device may be configured to determine whether the user has successfully "entered" the password based on the direction of the user's gaze.

Figure 15:
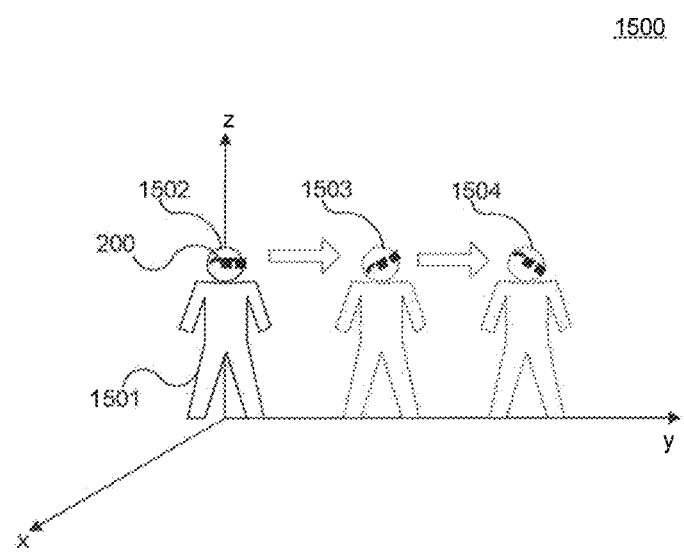
FIG. 15 illustrates an example of a user unlocking a wearable AR device consistent with disclosed embodiments.

FIG. 15 illustrates an example of a user wearing an AR device consistent with disclosed embodiments. As shown in FIG. 15, user 1501 is in an environment 1500 and is wearing an AR device 200, as discussed above regarding FIG. 2. AR device 200 may include a frame configured to secure the device to the head of user 1501. As discussed above, AR device 200 may include a sensor array 125. Sensor array 125 may include one or more sensors configured to detect a viewing direction of user 1501. The one or more sensors may include any one or more of a motion detector (e.g., a gyroscope and/or an accelerometer), a camera, a location determination device (e.g., a GPS device and/or an NFC reader), a magnetometer, an eye tracking sensor, and/or an orientation sensor (e.g., a theodolite, infra-red sensor). Such magnetometers (compasses) may detect orientation or a direction that a user is looking, accelerometers (e.g., three-axis accelerometers) to detect the direction and speed of movements associated with AR device 200, or the like. For example, the viewing direction of user 1501 may be defined according to a coordinate system, such as a three-dimensional coordinate system (x,y,z) having the origin at a point on AR device 200, such as a central point of display 204, the position at which IMU 201 is located, or any other reference point on AR device 200.

In some embodiments, positional processing module 378 shown in FIG. 3 may be configured to store instructions that when executed by a processing device (e.g., microprocessor 208) of AR device 200, determine the viewing direction of user 1501 based on output from the one or more sensors.

For example, in order to perform various tasks and/or access various features, such as locking and unlocking AR device 200, user 1501 may move his or her head and/or eyes to various orientations within a three-dimensional coordinate system. As described above, one or more sensors included in AR device 200 may be configured to detect the viewing direction of user 1501. The sensors may then output information indicative of the viewing direction to a processor device, such as microprocessor 208 shown in FIG. 2.

In some embodiments, the one or more sensors may be configured to detect the viewing direction of user 1501 periodically. For example, the one or more sensors may be configured to detect the viewing direction of user 1501 at any suitable time interval (e.g. every second, multiple times per second (2, 4, 6, 10 or more times per second), or once over the course of multiple seconds, etc.). Further, the one or more sensors may be configured to output a detected angle of AR device 200 with respect to the horizontal plane (or other suitable reference plane) to a processing device (e.g., microprocessor 208). Alternatively, the one or more sensors may be configured to output the detected coordinates of one or more predetermined reference points of AR device 200 with reference to a predetermined coordinate system. For example, the one or more sensors may be configured to detect coordinates of multiple points of display 204 in a predetermined three-dimensional coordinate system having an origin set as the central point of AR device 200.

The processing device (e.g., microprocessor 208) of AR device 200 may be configured to monitor the viewing direction of user 1501 based on the output of the one or more sensors. For example, the processing device may be configured to determine the viewing direction of user 1501 based on received coordinates of points of the device from the one or more sensors. In some embodiments, the processing device may be configured to monitor both the viewing direction of user 1501 and the time duration (or "dwell time") that the head and/or eyes of user 1501 stays in the viewing direction based on output received from the sensor. For example, if the time duration that the head and/or eyes of user 1501 stays in a detected viewing direction is less than a predetermined time threshold, the processing device may determine that user 1501 does not intend the detected viewing direction to cause AR device 200 to take an action. On the other hand, if the time duration that the head of user 1501 stays in a detected viewing direction is greater than or equal to the predetermined time threshold, the processing device may determine that user 1501 intends the detected viewing direction to cause AR device 200 to take an action.

In the example illustrated in FIG. 15, user 1501's head (and by extension, AR device 200) is initially oriented at position 1502. As described above, position 1502 may be detected and processed in many ways within AR device 200, including as an angle relative to horizontal or vertical planes, or as a set of coordinates denoting the position of AR device 200 within a three-dimensional coordinate system, as in the example shown in FIG. 15. As AR device 200 progressively samples the orientation and position of the device, user 1501 changes the orientation of his or her head. At position 1503, user 1501 has tilted his or her head to assume a different orientation than position 1502. Later, a third position 1504 is registered. Although three positions are depicted in the example shown in FIG. 15, a sequence for causing AR device 200 to perform a function may comprise any number of positions. Each of these orientations may be detected and registered by AR device 200 and microprocessor 208 to execute commands or access various functions and features of the device, as will now be described in detail. Alternatively, as discussed above, in other embodiments, the processing device of AR device 200 may be configured to monitor a user's gaze direction based on output received from one or more eye tracking sensors. For example, the processing device may be configured to determine whether the user has successfully "entered" the password based on the direction of the user's gaze as the user's gaze moves in a sequence of positions.

Figure 16A:
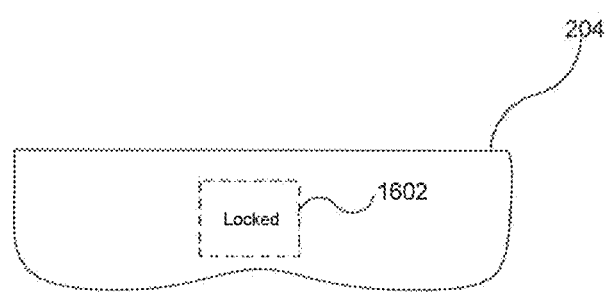
FIG. 16A illustrates an example of a display showing a wearable AR device in a locked state consistent with disclosed embodiments.
Figure 16B:
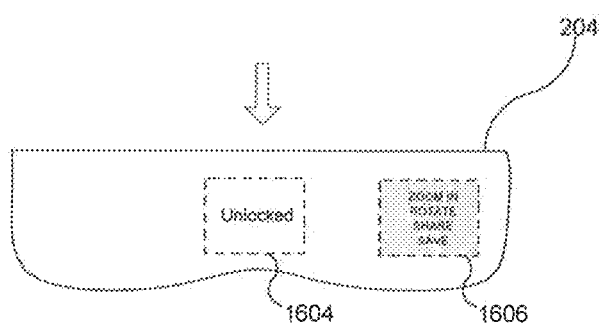
FIG. 16B illustrates an example of a display showing a wearable AR device in an unlocked state consistent with disclosed embodiments.

FIGS. 16A-16B illustrate an example of unlocking a lockable, wearable AR device consistent with disclosed embodiments. For example, rendering services module 370, discussed above in reference to FIG. 3, may store software instructions that, when executed by a processing device (e.g., microprocessor 208), cause audio messages to be played, and/or cause text and/or graphics to be displayed to a user. As illustrated in FIG. 16A, when AR device 200 is in a locked state, a virtual graphical element 1602 may be shown on display 204 of AR device 200 to indicate this fact to the user. When in a locked state, such as one displayed in the example of FIG. 16A, various features of AR device 200 may be inaccessible or otherwise unavailable in order to secure data on the device and/or data accessible via the device (e.g., data accessible via network 130).

AR device 200 may be configured to enter an unlocked state upon receiving a predetermined input from a user, such as a password. This process will be described in further detail below in association with FIGS. 17A-17K and 18. In some embodiments, AR device 200, via rendering services module 370, may cause an array of graphical objects to be shown on display 204 of AR device 200. Rendering services module 370 may further prompt the user to enter a predetermined input, such as a password, by way of visual cues, audio cues, or both. Positional processing module 378 may then be configured to detect "selection" of the password within the displayed graphical array by receiving output indicative of the orientation of the head of the user from one or more sensors, such as sensor array 125, IMU 201, and/or GPS unit 202.

Upon receiving input of the password from the user AR device 200, via processor device 123 and memory 124, may verify that the correct password has been entered. If the correct password has been received, AR device 200 may be configured to enter an "unlocked" state to provide the user with access to information on display 204 of AR device 200.

In FIG. 16B, AR device 200 has verified correct password entry, and has been unlocked. A virtual graphical element, such as virtual graphical element 1604 may be shown on display 204 of AR device 200 to indicate to the user that the device has entered an unlocked state and that further options and resources may be accessible. For example, virtual menu 1606 may become accessible to the user when AR device 200 is in an unlocked state. Conversely, when AR device 200 is in a locked state, virtual menu 1606 may be inaccessible to the user and may not appear on display 204 of AR device 200. Alternatively, virtual menu 1606 may appear on display 204, but may be rendered by rendering services module 370 in a manner indicating that it is inaccessible. For example, virtual menu 1606 may be blurred, faded, shrunk, etc.

Virtual menu 1606 may include one or more selectable elements each associated with one or more actions that may be taken by AR device 200 upon selection by a user, such as user 1501, when AR device 200 is in an unlocked state. For example, virtual menu 160 may present options for user 1501 to save AR content, share it with other users, rotate the display of the AR content, zoom the display in or out, initiate a phone call, change settings associated with a camera on AR device 200, or any other options or tasks that user 1501 may select to provide input, request information, or initiate a task associated with AR device 200.

FIGS. 17A-17K illustrate an example of a series of interactive graphical displays that may be rendered on display 204 of AR device 200 by rendering services module 370. The example graphical displays depicted in FIGS. 17A-17K illustrate an embodiment in which a user (such as user 1501) may enter a password or other user credential in order to transition AR device 200 from a locked state to an unlocked state, as shown in FIGS. 16A-16B. The graphical displays depicted in FIGS. 17A-17K are exemplary only and are not intended to be limiting. Any graphical arrangement or display suitable for receiving input of information may be used.

In some embodiments, AR device 200 may receive an indication that user 1501 seeks to unlock the device. The indication may be a verbal indication from user 1501. In other embodiments, the indication may include a tactile indication, or may be received based on positional changes detected by IMU 201, such as a shake or nod of the head of user 1501. After receiving the indication, rendering services module 370 may present a graphical display to user 1501 on display 204. Any graphical display is contemplated that comprises some array of at least two graphical objects. In some embodiments, the rendered graphical array may comprise a plurality of points. The points may be arranged in any pattern and in a manner such that there is sufficient distance between any two points to allow them to be distinguishable.

For security purposes, the total number of points displayed may exceed the number of inputs needed to enter the password or user credential. For instance, if the password to unlock AR device 200 consists of three characters, at least four points may be presented on display 204. This configuration may increase security, as it reduces the likelihood that a second person could steal the password sequence simply by watching the movements of user 1501 as they enter the sequence. In alternative embodiments, the total number of points displayed may exactly equal the number of inputs needed to enter the password or user credential, and additional security may be provided by assigning various "dwell times," or specific periods of time that the user must orient a cursor, reticle, or other selection device over a given point to select it as an input. In some embodiments, each point to be selected within a password sequence may be assigned a different dwell time to increase security.

Figure 17A:
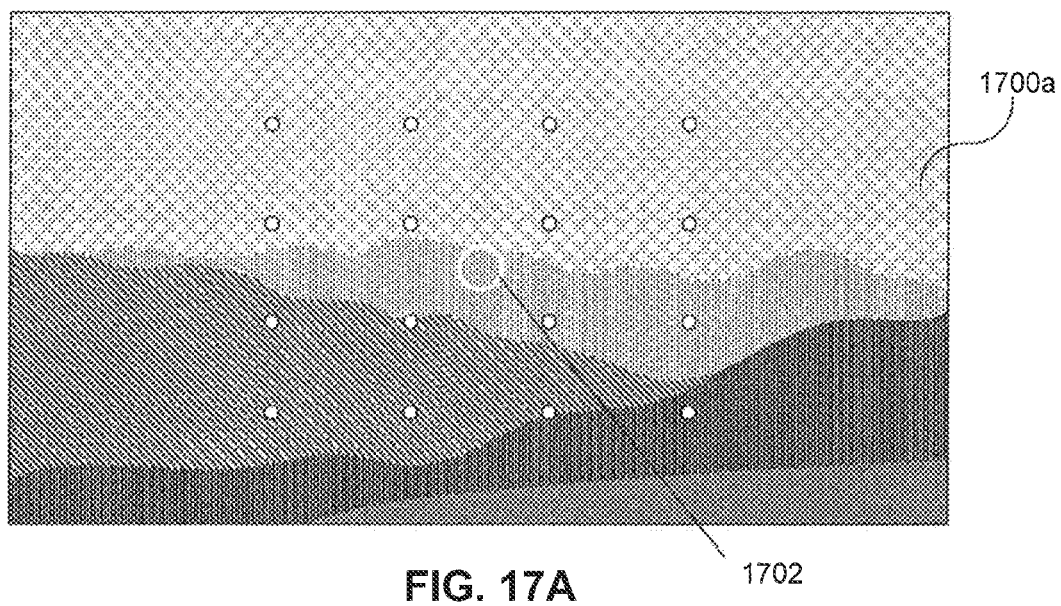
FIGS. 17A-17K illustrate another example of a display showing a wearable AR device changing from a locked to an unlocked state consistent with disclosed embodiments.

In FIG. 17A, interactive graphical display 1700*a* is shown. Graphical display 1700*a* may represent an image shown to a user, such as user 1501, on display 204 of AR device 200. Graphical display 1700*a* may be displayed by rendering services module 370 upon receipt of an indication by AR device 200 that user 1501 wishes to unlock the device. Graphical display 1700*a* may comprise an initial arrangement of points for entering a password or other user credential. In the example presented in FIG. 17A, a cursor 1702 is also displayed within graphical display 1700*a*. Cursor 1702 may be an icon, a trackable reticle, a pointer, or any other such cursor known in the art of computer graphics. Cursor 1702 may be movable by user 1501 based on the orientation of the user's head, and thus the orientation of the device. Alternatively or in addition to monitoring the orientation of the user's head, cursor 1702 may be moveable by user 1501 based on the direction of the gaze of the user's eyes, Detection of user movement and translation of the movement into cursor motion on display 204 may be processed by rendering services module 370, visual processing module 374, and positional processing module 378. To enter the password to unlock AR device 200, user 1501 may move or orient cursor 1702 over specific points within graphical display 1700*a* for specific periods of time.

Figure 17B:
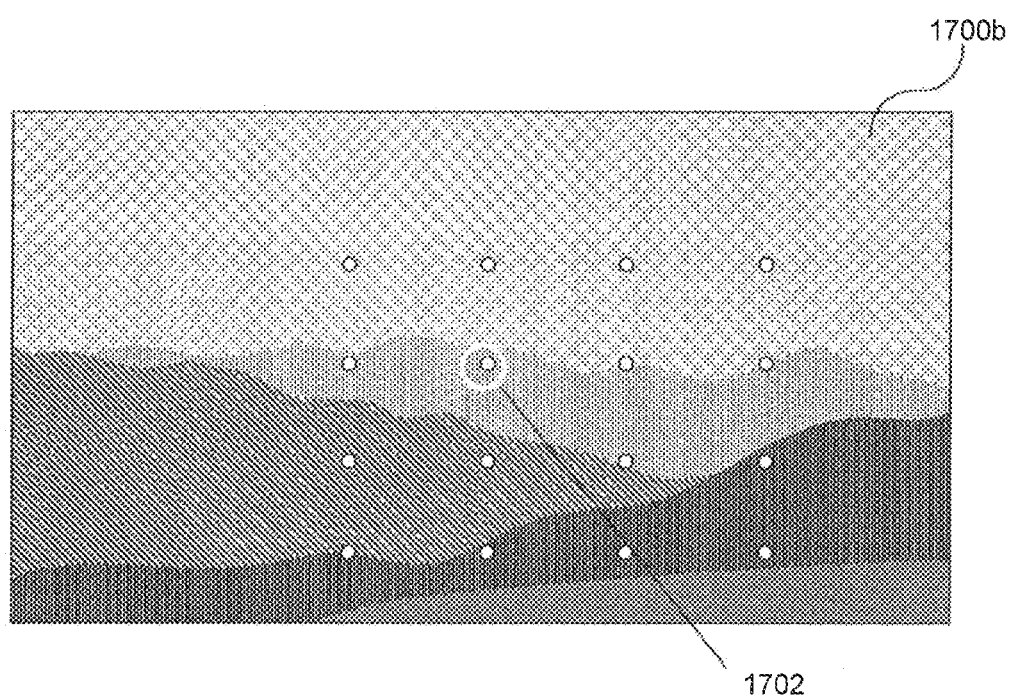

In FIG. 17B, interactive graphical display 1700*b* is shown. Graphical display 1700*b* may also represent an image shown to a user, such as user 1501, on display 204 of AR device 200. In the example illustrated in FIG. 17B, user 1501 has moved cursor 1702 over one of the points displayed in graphical display 1700*b*. In some embodiments, AR device 200, via visual processing module 374 and positional processing module 378, may determine an "input value" associated with the point. The determined input value may comprise, for example, the length of time ("dwell time") that cursor 1702 remains oriented over the particular point. In other embodiments, the input value may be determined in other ways, such as the accuracy of the alignment of cursor 1702 over the point, the speed at which the cursor is moved to the point, etc.

The input value, such as the dwell time, may be represented graphically to user 1501 within graphical displays such as graphical display 1700*b* via rendering services module 370. A graphical display associated with the point may be changed by rendering services module 370 to represent the increasing input value. For example, the graphical display could display a sequence of numbers from 1 to 10 as the cursor dwells on the particular point for specific time periods. Alternatively, the displayed sequence of numbers could progress downwards from 10 to 1. In other embodiments, colors could be used instead of numbers; for example, the graphical display associated with the particular point could cycle through the colors of the rainbow from red to violet. In still further embodiments, the graphical display could cycle progressively through letters of an alphabet, for example the English language Latin alphabet, a Cyrillic alphabet, or characters of Chinese, Japanese, or Korean languages. These examples are not intended to be limiting, and any graphical display may be used to indicate increasing input values for a particular point.

Figure 17C:
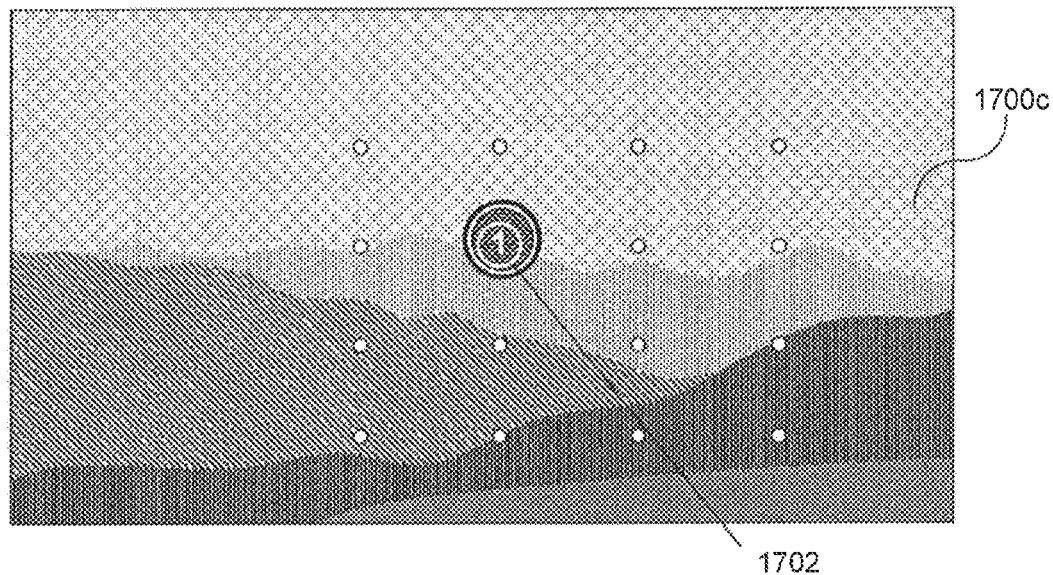
Figure 17D:
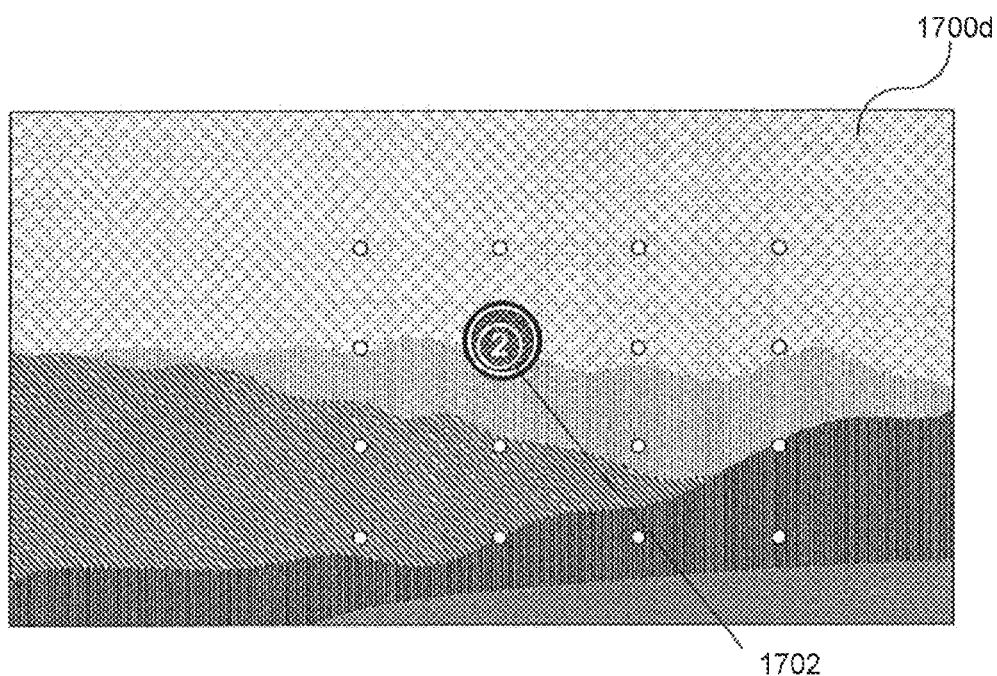
Figure 17E:
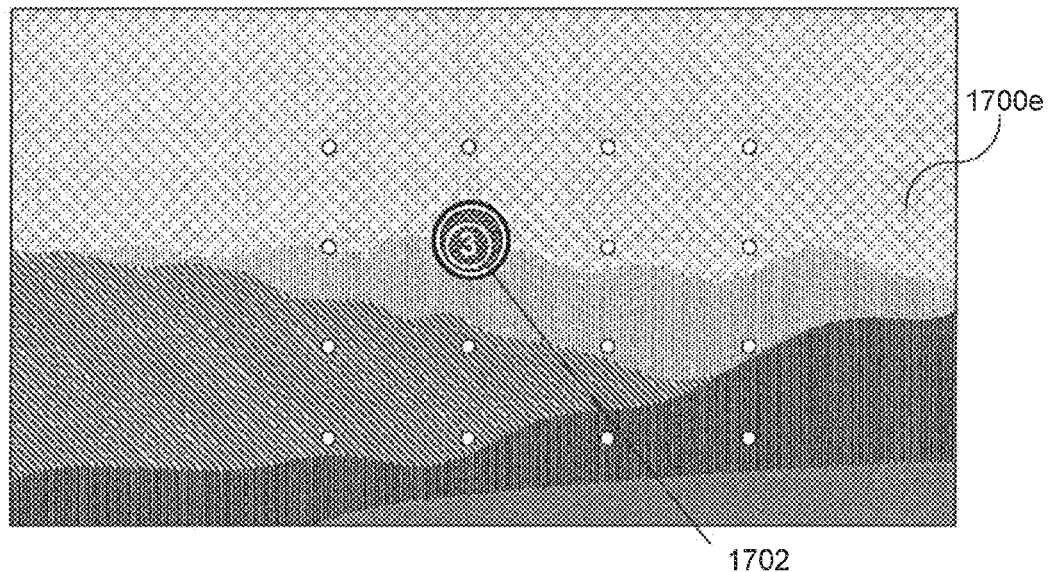
Figure 17F:
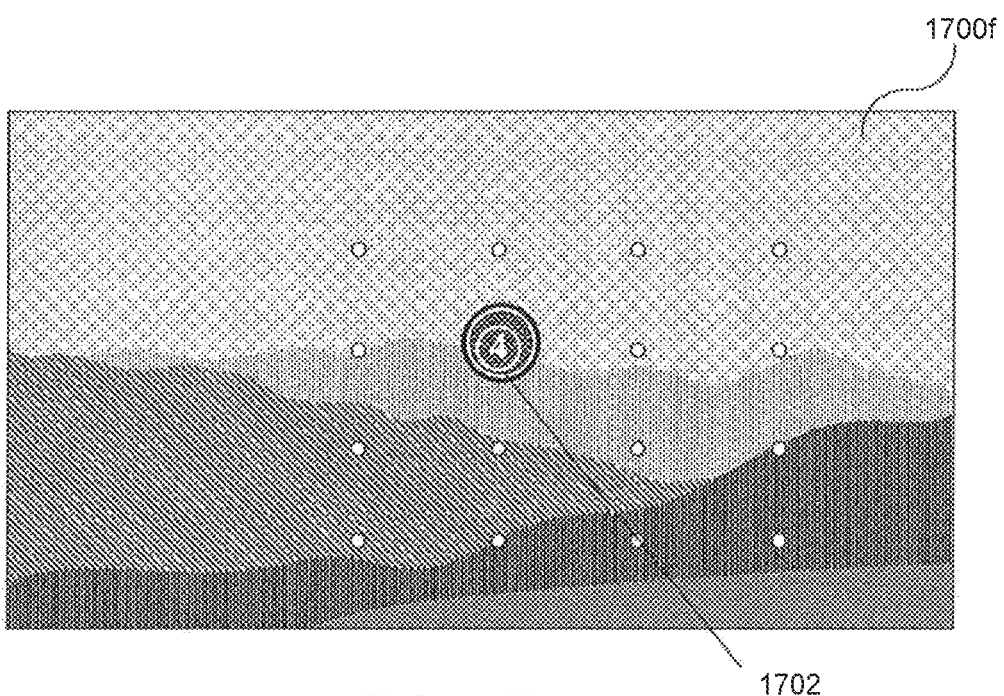

FIGS. 17C-17F illustrate an example advancement of input value for a particular point within a graphical display. In the example of FIGS. 17C-17F, cursor 1702 dwells on the point to which it was moved in FIG. 17B. For demonstration purposes, the input value required for that particular point in the entry of the password sequence is 4. In FIG. 17C, user 1501 has oriented his or her head in a manner to permit cursor 1702 within interactive graphical display 1700*c* to dwell on the particular point for a specified period of time, or dwell time. In the example of FIG. 17C, increasing input values are illustrated by displaying increasing numbers. Once the predetermined dwell time for the particular point contacted by cursor 1702 has passed, the input value for that point advances to 1. As cursor 1702 continues to dwell on the point, the input value continues to incrementally increase each time a specified period of time has passed. In FIG. 17D, the input value has increased to 2 within interactive graphical display 1700*d*. In FIG. 17E, the input value has increased to 3 within interactive graphical display 1700*e*. Finally, in FIG. 17F, the input value has reached 4 within interactive graphical display 1700*f*, which is the desired input value for the first of the input points in the password sequence pattern. Accordingly, user 1501 has successfully input the first element of the pattern in FIG. 17F.

Figure 17G:
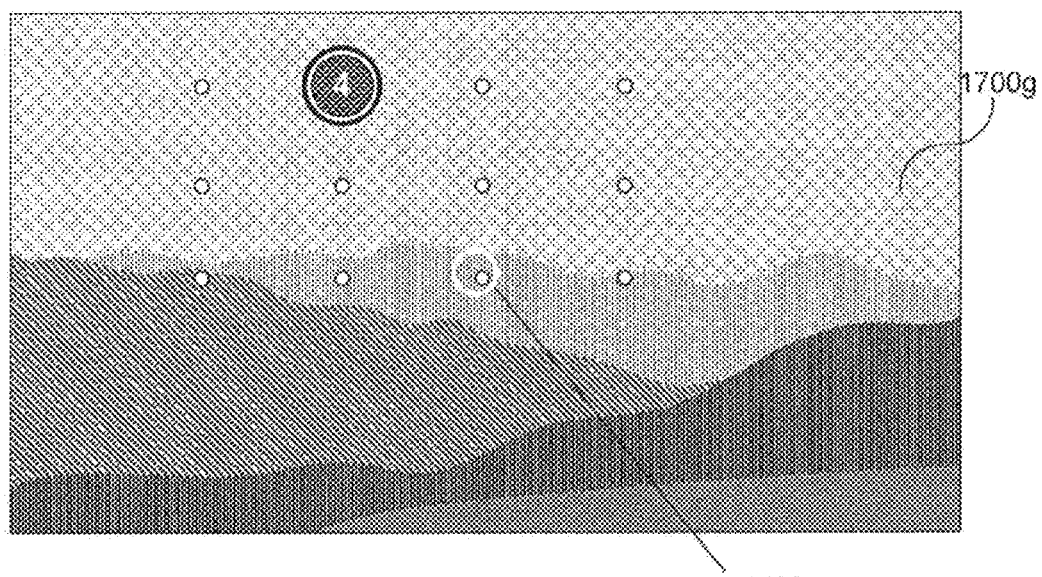
Figure 17H:
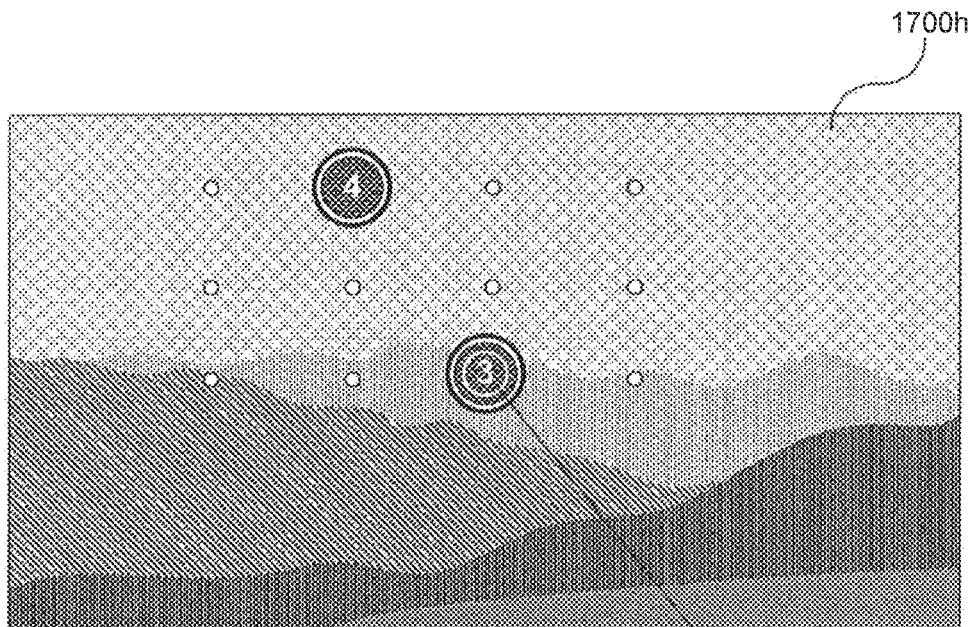

In the examples of FIGS. 17A-17K, the password to be entered has three inputs, so user 1501 must move cursor 1702 to the next input point in the sequence. In FIG. 17G, interactive graphical display 1700*g* is shown. Graphical display 1700*g* may represent an image shown to a user, such as user 1501, on display 204 of AR device 200. In the example illustrated in FIG. 17G, user 1501 has moved cursor 1702 over a second point in the array of points displayed in graphical display 1700*g*. This point may represent the location of the second point within the three-point object selection sequence pattern. FIG. 17H illustrates the input value increasing within interactive graphical display 1700*h* for the second point as user 1501 continues to dwell cursor 1702 on the point.

Figure 17I:
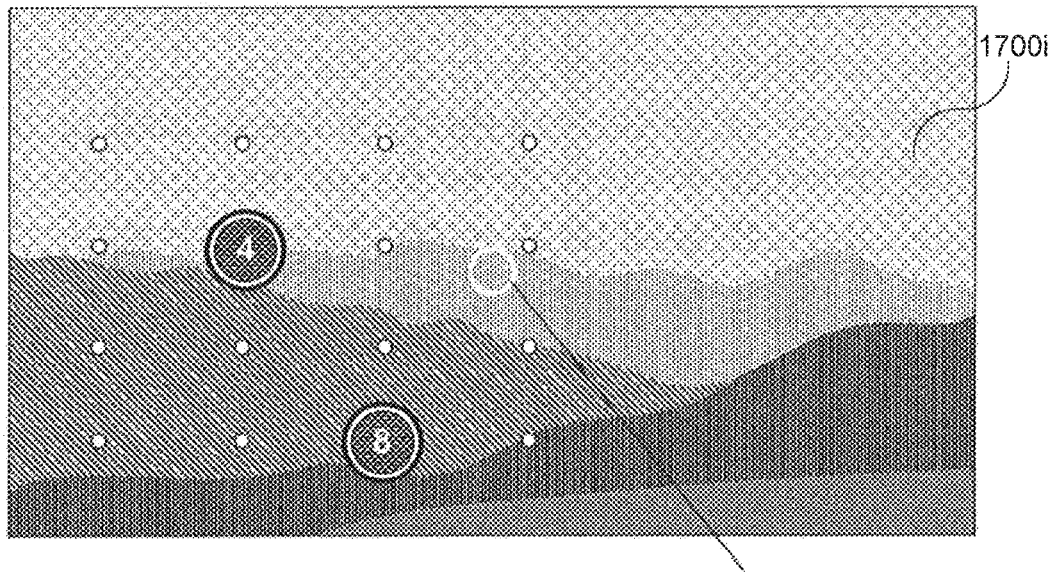
Figure 17J:
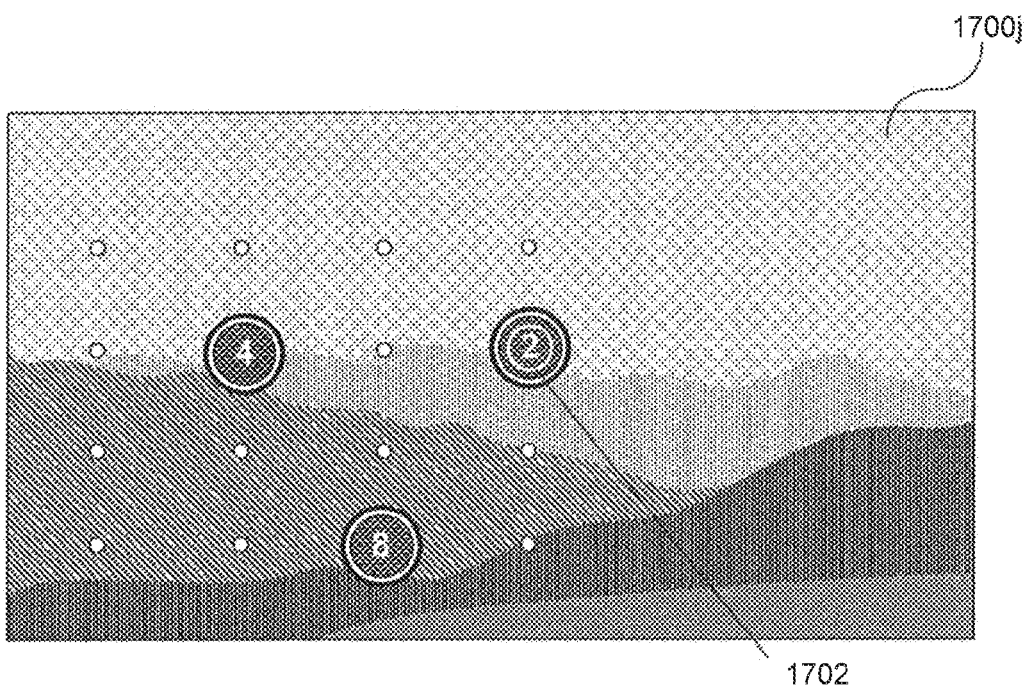

In FIG. 17I, interactive graphical display 1700*i* is shown. In the example illustrated in FIG. 17I, user 1501 has reached the required input value/dwell time for the second point in the password sequence pattern, which in this example is 8. User 1501 then is moving cursor 1702 towards the location of the third and final point in the sequence. In FIG. 17J, user 1501 has moved cursor 1702 over this third point in the array of points displayed in graphical display 1700*j*. FIG. 17J further illustrates the input value again increasing within interactive graphical display 1700*j* for this third point as user 1501 continues to dwell cursor 1702 on it.

Each input value is specific for its assigned point. For example, in the illustration of FIG. 17J, the first point in the password sequence pattern has an assigned input value of 4, and the second point in the sequence has an assigned input value of 8. The input value must match its assigned point. For example, placing an input value of 8 on the first point would constitute an incorrect or invalid password entry, as would placing an input value of 4 on the second point.

Figure 17K:

In some embodiments, after the correct number of points have been triggered by user 1501 for the appropriate amounts of time, rendering services module 370 may generate a button or new point that allows user 1501 to enter or submit the password for verification. Alternatively, the password may be automatically entered after successful input of the correct input values at the correct input points. Either successful sequence may lead to FIG. 17K, which indicates via interactive graphical display 1700k that the password has been successfully entered, and that wearable AR device 200 is now in an unlocked state. Although text is shown in FIG. 17K, AR device 200 may display any suitable message and/or graphic representing that AR device 200 has been unlocked. After AR device 200 has been unlocked, rendering services module 370 may then configure display 204 to permit user 1501 access to various features of AR device 200, such as virtual menu 1606 in the example of FIG. 16B.

Figure 18:
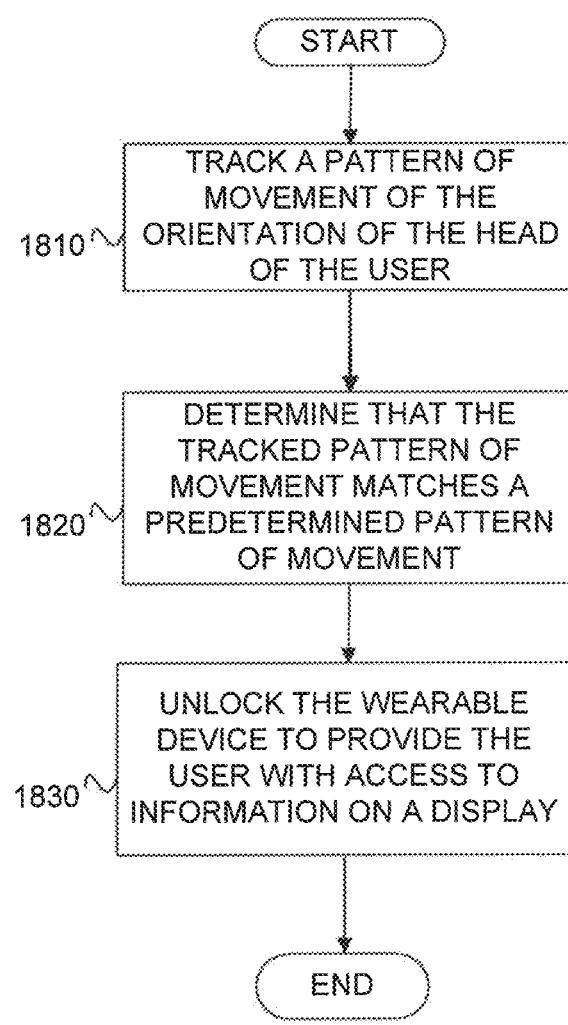
FIG. 18 is a flowchart of an exemplary process for unlocking a wearable AR device consistent with disclosed embodiments.

FIG. 18 is a flowchart of an exemplary process 1800 for providing a user with access to secured information on the display of a lockable, wearable AR device consistent with disclosed embodiments. As an example, one or more steps of process 1800 may be performed by AR device 200 shown in FIG. 2. For example, in process 1800 a sensor of AR device 200 (such as positional processing module 378) may detect an orientation of the head of user 1501 and provide a corresponding output to a processing device of AR device 200. User 1501 may move his or her head in order to correspondingly move a cursor or reticle within the display for purposes of entering a password or other user credential to unlock AR device 200. The processing device of AR device 200 may track the pattern of movement of the user, and unlock the device if the pattern matches a predetermined pattern used as the password.

As another example, in process 1800, a sensor of AR device 200 may detect a gaze direction of the eyes of user 1501 and provide a corresponding output to a processing device of AR device 200. User 1501 may move his or her eyes in order to correspondingly move a cursor or reticle within the display for purposes of entering a password or other user credential to unlock AR device 200. The processing device of AR device 200 may track the pattern of movement of the user, and unlock the device if the pattern matches a predetermined pattern used as the password.

At step 1810, AR device 200 may monitor a viewing direction of user 1501 (e.g., an orientation of the head of user 1501 and/or a gaze direction of the eyes of user 1501) based on output of at least one sensor associated with the AR device. For example, the processing device (e.g., microprocessor 208) of AR device 200 may execute instructions of positional processing module 378, discussed above in relation to FIG. 3, to perform this step. The sensor may be included in AR device 200 and may be configured to provide an output indicative of the viewing direction of the user. For example, the sensor may be configured to provide an output indicative of the viewing direction of the user by tracking a pattern of movement of an orientation of the head of the user. As another example, the sensor may be configured to provide an output indicative of the viewing direction of the user by tracking a gaze of the user's eyes.

User 1501 may be presented with a series of interactive graphical displays, such as displays 1700a-1700k described above in association with FIGS. 17A-17K. The graphical displays may be presented on display 204 of AR device 200, and may comprise an array of graphical objects, such as points, icons, etc. A subset of these graphical objects may be selected by user 1501 as part of a password, and AR device 200 may detect that selection by tracking the pattern of movement of user 1501's head.

In some embodiments, the pattern of movement may include two or more movements along different directions as user 1501 maneuvers the graphical display array to select the particular objects associated with the password. In some embodiments, the two or more movements along different directions may comprise a leftward movement and a rightward movement. In other embodiments, the two or more movements along different directions may include an upward movement and a downward movement.

The "tracking" of user 1501's movement in step 1810 may include tracking the position of a cursor or reticle on the display 204, which is movable by user 1501 in concert with the orientation of his or her head and/or eyes. This cursor may be similar to the cursor 1702 depicted in FIGS. 17A-17K.

At step 1820, AR device 200 may determine that the tracked pattern of movement for user 1501's head and/or eyes matches a predetermined pattern of movement—namely, the preset password configured for purposes of unlocking a lockable AR device. As discussed above in association with FIGS. 17A-17K, entry of the password may comprise having user 1501 move a cursor or reticle, such as cursor 1702, around the interactive graphical display to select the two or more objects or points within the graphical array. A processing device associated with AR device 200, such as microprocessor 208, may further determine a specific input value at each particular point in the sequence based on how long user 1501 maintains the orientation of his or her head and/or eyes to dwell on that point. Each point in the password sequence may be configured to require a specific input value in order to constitute a successful entry. Accordingly, AR device 200 may detect an interception of the position of the cursor 1702 with an area of the interactive graphical display (e.g., displays 1700a-1700k) associated with at least two objects displayed within an array of objects. AR device 200, via microprocessor 208, may further monitor dwell time of user 1501 on each of the given objects. Detection of a successful selection of a particular point within a password sequence pattern may occur when the dwell time exceeds a predetermined amount of time configured for each of the points.

The detection process associated with step 1820 may be modified to provide additional security features. In some embodiments, in order to minimize the opportunities for an outside entity to decipher the password by watching the head movement and/or eyes of the user the position of the plurality of points can be altered. For example, the positioning of the entire array may be shifted within the interactive graphical display each time the points are displayed. In other embodiments, the position of individual points within the array may be shifted. This may create some additional ambiguity in the motion of AR device 200.

In other embodiments, AR device 200 may ignore the required order of entry of the individual points within the password sequence pattern, permitting user 1501 to enter the individual inputs in any order, and in a different order each time if desired. In these embodiments, the ability of an outside observer to detect repeated, similar head movements and/or eye movements may be substantially reduced. Alternatively, the required order may cycle in a random order each time the device is unlocked. As an additional feature, password inputs may overlay on one another at a single point; in other words, user 1501 could enter input at a particular point within the array, then return to that same point later in the sequence entry to enter a second input.

Additional security measures may be included. In some embodiments, specific zones or travel paths may be configured for correct password entry. For example, user 1501 may be required to pass cursor 1702 through certain points or between certain regions of the screen while moving between the input-required points. In these embodiments, if AR device 200 does not detect that cursor 1702 passes through the additionally configured positions, then the inputs, even if correct, would not constitute an acceptable password. These configured "paths" may or may not be visible to the user on display 204 while entry is in progress.

In still other embodiments, rendering services module 370 may configure icons to be used as the objects within the array instead of discrete, identical points. Input value could then be indicated as described above by cycling numbers on top of each icon as a function of dwell length. The icons may be shuffled around each time the device is unlocked, increasing security. For example, the display may be configured to display icons representing animals as the points comprising the password. The password may then comprise, e.g., "chicken for 5 (dwell time)," "dog for 3," and "horse for 6." This password could therefore be entered no matter where those particular icons were displayed within the graphical array of objects. Alternatively, the display may be configured in a manner where the icons move on the screen, and password entry may be configured such that user 1501 is to dwell on a particular location until the desired, correct icon reaches that position (or any other particular position).

In some embodiments, AR device 200 may be equipped with additional input devices, such as a pointer, stylus, mouse device, etc. The additional input devices may provide input to AR device 200 via, for example, communications interface 121. In these embodiments, user 1501 may use a combination of dwell time and the input device(s) to select an icon or point. In some embodiments, the selection of the points or icons may be accomplished via movement of the head of user 1501 and/or via movement of the eyes of user 1501, and confirmation of the entry may be effected by use of a second input device (e.g., a fingerprint recognition device). For example, AR device may be equipped with a fingerprint recognition device that can recognize one or more fingerprints (e.g., a thumbprint of a user). In some embodiments, the fingerprint recognition device may be used to facilitate the unlocking of AR device 200 without the need of monitoring the orientation of the head of the user. In other embodiments, the fingerprint recognition device may be used in connection with entry of a password via tracking the orientation of the head of the user of AR device 200, as described above. Thus, the fingerprint recognition device may serve as a second factor in a two factor authentication process. In addition, in some embodiments, as an alternative (or in addition) to monitoring the orientation of the head of the user of AR device 200, AR device 200 may include an eye tracker device, which may monitor an eye of the user of AR device 200 in order to detect a password entered when the user looks at certain locations.

At step 1830, AR device 200 may transition from a locked state to an unlocked state to provide user 1501 with access to information on display 204 of the device. This process is illustrated above in association with FIGS. 16A-16B. AR device 200 may verify that the entered password pattern of movement is correct via comparison with a stored value within memory 124. Alternatively, AR device 200 may compare the entered password to a stored value on a remote server via network 130, such as memory 112 or database 113 of server system 110.

After transitioning to an unlocked state, user 1501 may gain access to any or all subset of features, functions, and programs stored within AR device 200. As an example, after being unlocked, AR device 200 may display a virtual menu such as virtual menu 1606 of FIG. 16B. In some embodiments, AR device 200 may be configured such that multiple users may be capable of using the device, each with a different password. In these embodiments, the display 204 may be configured to provide different options and functions to each individual user (e.g., options and functions associated with a user profile). Various permissions to access different options and functions may be configured and managed remotely, such as via server system 110.

Providing Task-Based Instructions

In one embodiment, the progress of a task assigned to a particular user of a wearable device may be monitored. As steps in the task are completed, information relating to the next steps may also be passed to the user. The information relating to the task and next steps in the task may be received by the wearable device over or a network and/or retrieved from a memory of the wearable device.

For example, consistent with some embodiments, a wearable device provides a user of the device with task-based instructions. The device comprises a display, a network interface, and a data input device configured to capture information relating to progress of a task. The device further comprises at least one processing device configured to provide to a server system, via the network interface, the captured information relating to progress of the task; receive from the server system, via the network interface, information relating to a next step in the task; and cause the information relating to the next step in the task to be shown on the display.

Referring to FIG. 1, user system 120 (e.g., AR device 200) may communicate with server system 110 via network 130 to assist a user to complete a task. For example, AR device 200 may send a request to server system 110. The request may identify information, such as instructions, needed for performing a task via AR device 200. AR device 200 may also send captured information relating to the task, such as an indication of progress of the task, an identifier of AR device 200, a location of AR device 200, etc., to server system 110 with the request. Server system 110 may store information relating to the task, such as instructions for a user of AR device 200 to perform the task, in database 113 and/or memory 112. In some embodiments, server system 110 may retrieve the task-related information from a remote server accessed over network 130 and store the retrieved information in database 113 and/or memory 112. Server system 110 may gather the requested information related to the task and send it to AR device 200 via network 130. In some embodiments, server system 110 may include legacy IT resources and/or constitute an enterprise resource planning (ERP) system (e.g., such as an ERP system available from SAP and Oracle).

In some embodiments, server system 110 may provide data to AR device 200 via network 130 according to a store-and-forward data model. In such an implementation, AR device 200 may not need to maintain connectivity with network 130. For example, AR device 200 may download tasks and workflows prior to the commencement of the work. AR device 200 may then provide instructions (e.g., images, video, text, audio, etc.) for one or more steps of the tasks and store the result or results of the task while AR device 200 is offline and not available and/or not in communication with network 130. The stored data may be stored in an encrypted format. Further, after AR device 200 resumes connectivity with network 140, AR device 200 may send the result or results of the task to server system 110.

Figure 19:
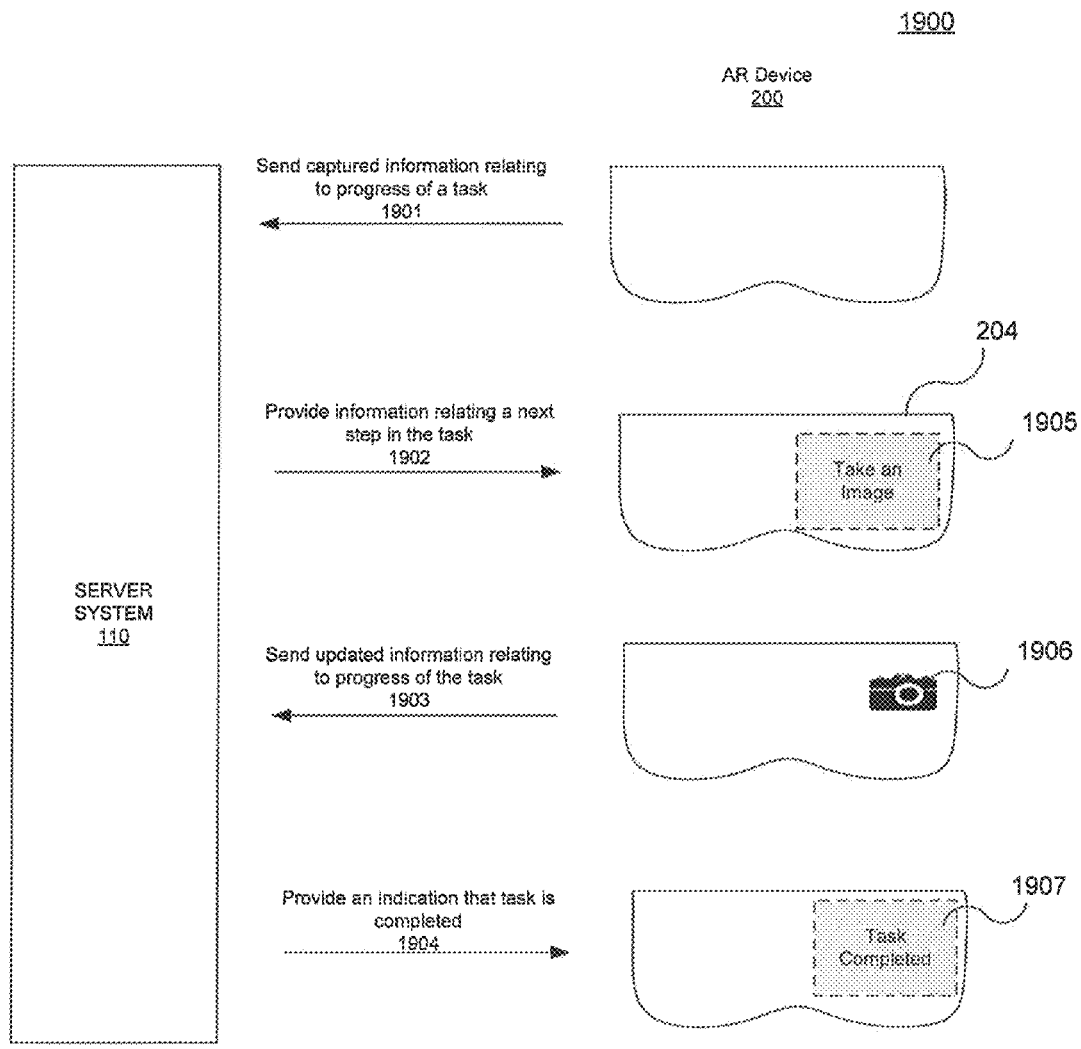
FIG. 19 illustrates an example of providing a user of an AR device with task-based instructions consistent with disclosed embodiments.

FIG. 19 illustrates an example diagram 1900 of a workflow for providing a user of an AR device with task-based instructions consistent with disclosed embodiments. For example, AR device 200 may receive user input to initiate a task that requires a series of steps to be taken by the device. The user input can be a command that causes AR device 200 to take a certain action, accomplish a certain task, provide certain information to the user, or any other types of actions associated with AR device 200. A data input device (e.g., camera 203, microphone 205) of AR device 200 may be configured to capture information relating to the progress of the task in response to the received user input. For example, the data input device may be an image capture device configured to acquire images, a voice recognition module configured to receive information from voice command of the user, a physical button for the user to press and confirm certain operations, a touch sensitive surface that can detect user gesture inputs selecting information, or any other input device that can be configured to capture information relating to the task.

As shown in FIG. 19, AR device 200 may send the captured information relating to progress of a task to server system 110 at step 1901. For example, at the initial stage of performing the task, AR device 200 may send a request for initiating the task to server system 110, indicating that the task is initiated by the user and has not been performed. In some embodiments, at the initial stage of performing the task, AR device 200 may send an identification code of the specific task that is requested, an identifier (e.g., any alphanumeric information) of AR device 200, and/or a current location (e.g., GPS coordinates, a street address, etc.) of AR device 200, to server system 110 such that server system 110 may identify the related task that is requested and also retrieve appropriate task-related information based on properties associated with AR device 200. For example, server system 110 may determine whether AR device 200 or a user of AR device 200 is authorized to perform the task based on the received identifier of AR device 200. If AR device 200 is not authorized to perform the task, server system 110 may send a message to AR device 200 informing the device that information related to the task will not be provided and instructing the device to stop the task. In other embodiments, AR device 200 may be authenticated via other information, such as a username and password combination submitted by a user.

In some embodiments, server system 110 may identify the required hardware and/or software configurations of an AR device in order to perform the task and determine whether the AR device has the capability to perform the task. For example, server system 110 may store the hardware and/or software configurations of AR device 200 in database 113 and may retrieve the configurations of AR device 200 based on the received identifier of AR device 200. As another example, AR device 200 may send its hardware and/or software configurations to server system 110 during the initial stage of performing the task such that server system 110 may determine whether AR device 200 is capable of performing the task. If server system 110 determines that AR device 200 is not capable of performing the task, server system 110 may send a message to AR device 200 indicating that the device is not capable of performing the task and instructing the device to stop the task. On the other hand, if server system 110 determines that AR device 200 is capable of performing the task, server system 110 may proceed and provide the task-related information to AR device 200.

In some embodiments, server system 110 may identify that additional information related to AR device 200 is required in order to provide the task-related information to the device. For example, server system 110 may identify that information related to hardware and/or software configurations of AR device 200 is required in order to determine whether the requested task can be performed by the device. In this situation, server system 110 may send a message to AR device 200 requesting the additional required information via network 130. When additional information is received from AR device 200, server system 110 may store the received information in database 113 such that server system 110 may retrieve the information directly for future tasks. In some embodiments, server system 110 may require the user of AR device 200 to input a passcode in order to authenticate the identity of the user. For example, server system 110 may send a message to AR device 200 requesting an input of the passcode, and if an incorrect passcode is received from AR device 200, server system 110 may send a message to AR device 200 informing the device that the passcode is incorrect and requires AR device 200 to resend the passcode. After a number of unsuccessful attempts, server system 110 may instruct AR device 200 to stop the task. If the correct passcode is received from AR device 200, server system 110 may proceed to provide the task-related information to AR device 200.

At step 1902, server system 110 may provide information relating to a next step in the task to AR device 200. After receiving the information relating to the next step in the task, the processing device of AR device 200 may cause the information to be shown on display 204. As illustrated in FIG. 19, an example of the next step in the task is to take an image of the user's current field of view. Server system 110 may send the information relating to the next step in the task to AR device 200, and the processing device of AR device 200 may cause task-assist information 1905 (e.g., the message "Take an Image") to be shown on display 204. While a text-based instruction is used in this example, the information relating to the next step in the task may be provided to AR device 200 in a variety of forms, such as a text-based instruction, a graphical-based instruction, an audible instruction, a video instruction, or a combination thereof.

Task-assist information 1905 may be shown at a predetermined position on display 204, such as the center of display 204, an upper portion of display 204, or any other suitable location. The predetermined location for displaying task-assist information 1905 may be pre-configured by user 401 through a user interface of AR device 200. For example, display 204 may allow user 401 to select a location of display 204 at which task-assist instruction 1905 will be displayed. In some embodiments, after task-assist information 1905 is displayed at a pre-set location, user 401 may be allowed to drag task-assist information 1905 to another location on display 204 that is preferred by user 401. For example, the processing device of AR device 200 may set the new location as a default location for displaying task-assist information 1905, and display task-assist information 1905 at the new location when AR device 200 receives information relating to a next step in a task. In other embodiments, the location of task-assist information 1905 may be locked to a predetermined position of display 204 such that user 401 cannot reposition the task-assist information.

In response to the displayed information relating the next step in the task, the user of AR device 200 may perform actions to continue execution of the task based on the displayed information. For example, the user may take an image of the current field of view according to task-assist information 1905. In some embodiments, the processing device of AR device 200 may cause an action interface, such as a command or icon, to be displayed on display 204 subsequent to or concurrently with the display of task-assist information 1905. The command or icon may be associated with actions of the next step in the task indicated in the task-assist information in order to facilitate the user to take the next step. For example, a camera icon 1906 may be displayed on display 204, and the user of AR device 200 may perform the next step in the task (e.g., taking a picture) by simply selecting the icon. In some embodiments, the information relating to the next step in the task may include more than one option that the user may take to continue the task, and more than one command or icon may be displayed on display 204. For example, the information relating to the next step in the task may indicate that the user may either take an image of the current field of view or input the current location of the user. Accordingly, an input field may be displayed along with a camera icon on display 204, and the user may either select the camera icon or input the user's current location in the displayed input field to proceed. In other embodiments, the processing device of AR device 200 may not cause an action interface to be shown on the display and may require the user to initiate the next step in the task by opening a menu or pressing a button of the AR device to perform the action in the next step.

In some embodiments, the user of AR device 200 may confirm completion of a step of the task by taking certain actions associated with a data input device of AR device 200. For example, the data input device (e.g., microphone 205) may include a voice recognition module configured to determine whether the user has audibly confirmed completion of a task step. In such an embodiment, the user may issue a voice command to confirm completion of the task step when the step is completed. As another example, the user may press a button on AR device 200 to confirm completion of a task step. In another example, a text command, icon, or check-box may be displayed on display 204 for the user to select and confirm completion of a task step. In other embodiments, the processing device may determine completion of a task step by detecting that the step provided by server system 110 has been performed, and thus would not require confirmation by the user of the completion of a task step.

After the next step in the task is performed, the data input device of AR device 200 may be configured to capture information relating to the progress of the task. For example, the data input device may cause the progress of the task to be updated when a certain step is completed. Referring to FIG. 19, after the user of AR device 200 takes the image according to task-assist information 1905, the data input device (e.g., the camera of the device) may capture information indicating that the image has been taken and provide this information to the processing device of AR device 200. The processing device may correspondingly update the progress of the task to reflect that the next step is completed. The data input device may also provide the captured data to the processing device. For example, camera 203 of AR device 200 may save the captured image data in a digital file that is accessible by the processing device.

At step 1903, the processing device of AR device 200 may send the updated information relating to the progress of the task, such as the completion of the next step provided in step 1902, to server system 110 via network 130. The processing device may also send the captured data in performing the step in the task, e.g., the captured image file, to server system 110 if server system requires the captured data to proceed in the task. For example, after receiving the updated information relating to the progress of the task, server system 110 may send a message to AR device 200 requesting for the captured data in performing the step in the task, and AR device 200 may send the captured data to server system 110 via network 130.

After receiving the updated information relating to the progress of the task, server system 110 may determine whether the task is completed or additional steps of the task remain incomplete. In some embodiments, server system 110 may determine the required steps by accessing database 113, compare the required steps and the completed steps, and determine whether the task is completed. In other embodiments, server system 110 may forward the information related to the progress of the task to a remote server that may determine whether the task is completed. For example, the remote server may provide server system 110 with additional steps to be taken by AR device 200, or send a confirmation message to server system 110 indicating that the task is completed.

If additional steps are required, server system 110 may provide information relating to the next step in the task to AR device 200, similar to step 1902. AR device 200 may display information relating to the next step in the task. After the next step is completed, AR device 200 may send updated information relating to the progress of the task to server system 110, similar to step 1903. In other words, steps 1902 and 1903 may be repeated until all the steps of the task are completed. In some embodiments, server system 110 may provide information including multiple steps (e.g., a list of the required steps) to perform a task in one or more messages transmitted to AR device 200. AR device 200 may correspondingly display the required steps on display 204. After the steps in the task are completed, AR device 200 may send updated information relating to the progress of the task to server system 110, indicating that the steps have been completed.

At step 1904, when the steps of the task are completed, server system 110 may send an indication to AR device 200 indicating that the task is completed. In some embodiments, server system 110 may provide automatic confirmation of step and/or task completion (e.g., based on images, text, and/or video transmitted to server system 110). For example, server system 110 may analyze information received from AR device 200 after a step has been completed and determine whether the step was completed correctly. If so, server system 110 may automatically confirm completion and my send the next task instruction to AR device 200 based on this determination. If the step was not completed correctly, server system 110 may provide an instruction to clarify and/or correct the prior step and transmit that information to AR device 200.

In addition, in some embodiments, an operator of a workstation (e.g., computer, smartphone, tablet, etc.) may receive data over network 130 from server system 110 regarding a completed step, and the operator may determine whether the step was completed correctly. For example, the operator may review text, images, and/or video transmitted from AR device 200 regarding a step performed by the user of AR device 200. If the step was completed correctly, the operator may confirm the correct completion, and the operator may then select and send the next instruction AR device 200. If the step was not completed correctly, the operator may send supplemental information to AR device 200 to clarify and/or correct the step.

After receiving an indication indicating that a task has been completed, AR device 200 may display a message 1907 on display 204 informing the user that the task has been completed. In some embodiments, a progress bar may be shown on display 204 informing the user of the progress of the task. The percentage of the task being completed may be increased in the progress bar each time a step of the task is completed. After the task has been completed, the processing device of AR device 200 may cause the progress bar to show that 100 percent of the task is completed.

In some embodiments, an operator may modify and/or select the information that is transmitted to AR device 200 relating to a step in a task. For example, a workstation (e.g., computer, smartphone, tablet, etc.) may receive data over network 130 from server system 110. An operator of the workstation may monitor information (e.g., text, images, and/or video) received by server system 110 from AR device 200. The operator may then determine whether a task is complete and/or send the next instruction. For example, via a user interface of the workstation, the operator may send one or more auxiliary instructions to supplement and/or modify instructions being sent to AR device 200. The operator may send these auxiliary instructions to, for example, correct errors that may have been made and/or to address unexpected events.

In addition, in some embodiments, the operator may annotate information provided to display 204 of AR device 200. The operator may access a workstation (e.g., computer, smartphone, tablet, etc.) and use a user interface to draw annotations that are transmitted to display 204 of AR device 200. For example, the operator may highlight areas of interest associated with a workplace, the user's environment, and/or an object in the user's environment. As another example, the operator may circle a part to be worked on (e.g., point to a fastener), or identify problems by circling or pointing to objects in the user's field of view. Server system 110 may receive these annotations from the workstation over network 130 and then transit the annotations with or supplemental to information being transmitted to AR device 200. Accordingly, AR device 200 may display the annotations received from the operator of the workstation when displaying any of the instructions to complete a task on display 204 of AR device 200.

Figure 20:
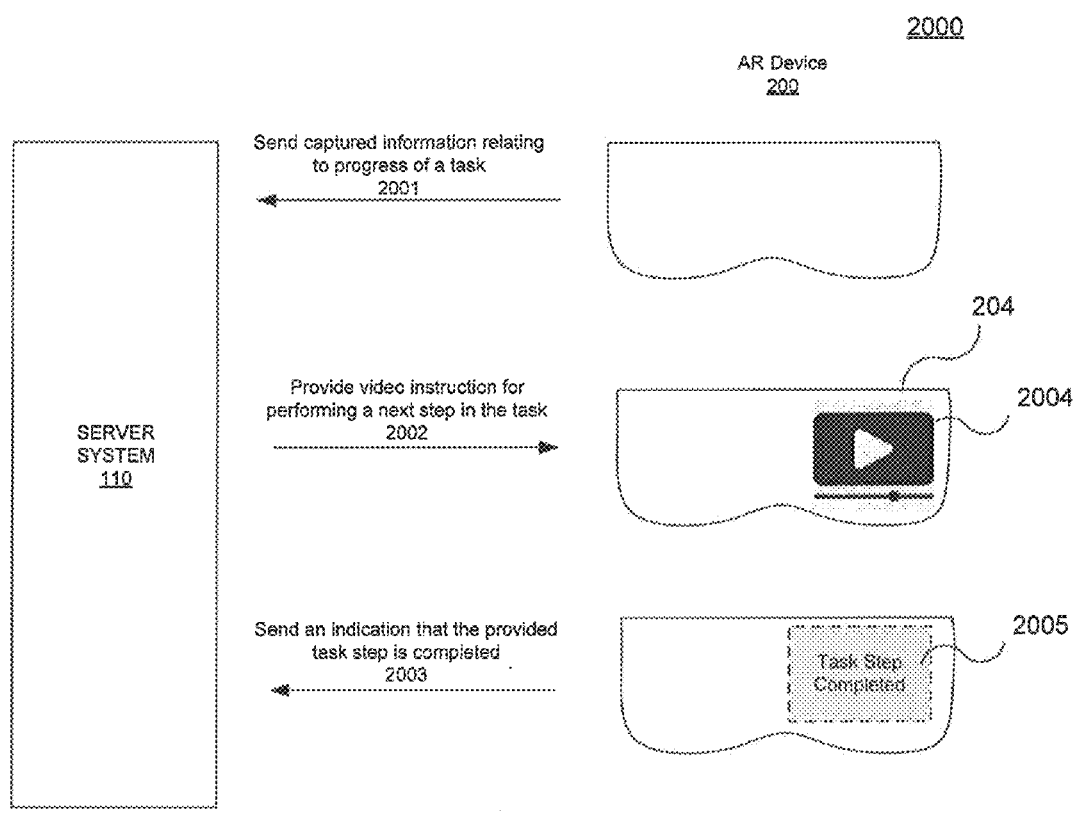
FIG. 20 illustrates another example of providing a user of an AR device with task-based instructions consistent with disclosed embodiments.

FIG. 20 illustrates another example diagram 2000 of a workflow for providing a user of an AR device with task-based instructions consistent with disclosed embodiments. For example, AR device 200 may receive user input to initiate a task that includes a series of steps. A data input device (e.g., camera 203, microphone 205) of AR device 200 may be configured to capture information relating to the progress of the task in response to the received user input.

At step 2001, AR device 200 may send the captured information relating to progress of a task (e.g., a request for providing task-based instructions relating to the task) to server system 110. For example, AR device 200 may send a request to initiate the task to server system 110. AR device 200 may also send an identifier of the specific task that is requested, an identifier of the AR device, and/or a current location of the AR device, to server system 110.

At step 2002, server system 110 may provide a video instruction for performing a next step in the task to AR device 200. Alternatively, AR device 200 may retrieve a video instruction for performing a next step in the task from a memory included in AR device 200. The video instruction may include a video presentation of how the next step in the task should be conducted. After receiving the video instruction for performing the next step in the task, the processing device of AR device 200 may cause a video icon 2004 to be shown on display 204, indicating to the user of AR device 200 that a video instruction for performing the next step in the task is available. Video icon 2004 may be shown at a predetermined position on display 204, such as the center of display 204, an upper portion of display 204, or any other suitable location. In some embodiments, a text notification may be displayed in place of or in addition to the video icon to inform the user that a video instruction is available. In some embodiments, an audio notification, such as a ring tone, may alert the user that a video instruction is available. It should be understood that while a video instruction is used in this example, the information relating to the next step in the task may be presented in other forms, such as an audio instruction, a text instruction, a graphic instruction, or a combination thereof, without departing from the spirit of the present disclosure.

The user of AR device 200 may select video icon 2004 to play the video instruction. In some embodiments, the video instruction may include multiple steps in the task or all of the steps in the task. When the next step in the task is completed, the processing device of AR device 200 may cause a text message 2005 shown in the display, indicating completion of the task step. In some embodiments, text message 2005 may be selectable, and the user of AR device 200 may select text message 2005 to confirm that the task step is completed (e.g., by looking in the direction of text message 2005 for a certain period of time, touching the portion of the display that text message 2005 is shown, moving a reticle to intercept with text message 2005, pressing a button on AR device 200, or the like). If the video instruction includes multiple steps in the task, the selectable text message may be displayed after all the steps provided in the instruction are completed, and the user of AR device 200 may select text message 2005 to confirm that all the steps provided in the instruction are completed by performing the operations described above.

At step 2003, AR device 200 may send an indication to server system 110 that the provided task step is completed. AR device 200 may send the indication when AR device 200 is in communication with server 110. After receiving the indication, server system 110 may determine whether there are additional steps in the task to be performed by AR device 200. Alternatively, AR device 200 may retrieve a video instruction for performing a next step in the task from a memory included in AR device 200. If there are additional steps in the task, steps 2002 and 2003 may be repeated until all the steps in the task have been performed. If server system 110 determines that all the steps in the task have been performed, server system 110 may provide an indication to AR device 200 indicating that the task is completed. Alternatively, AR device 200 may determine whether the task is completed based on data stored in a memory of AR device 200.

Figure 21:
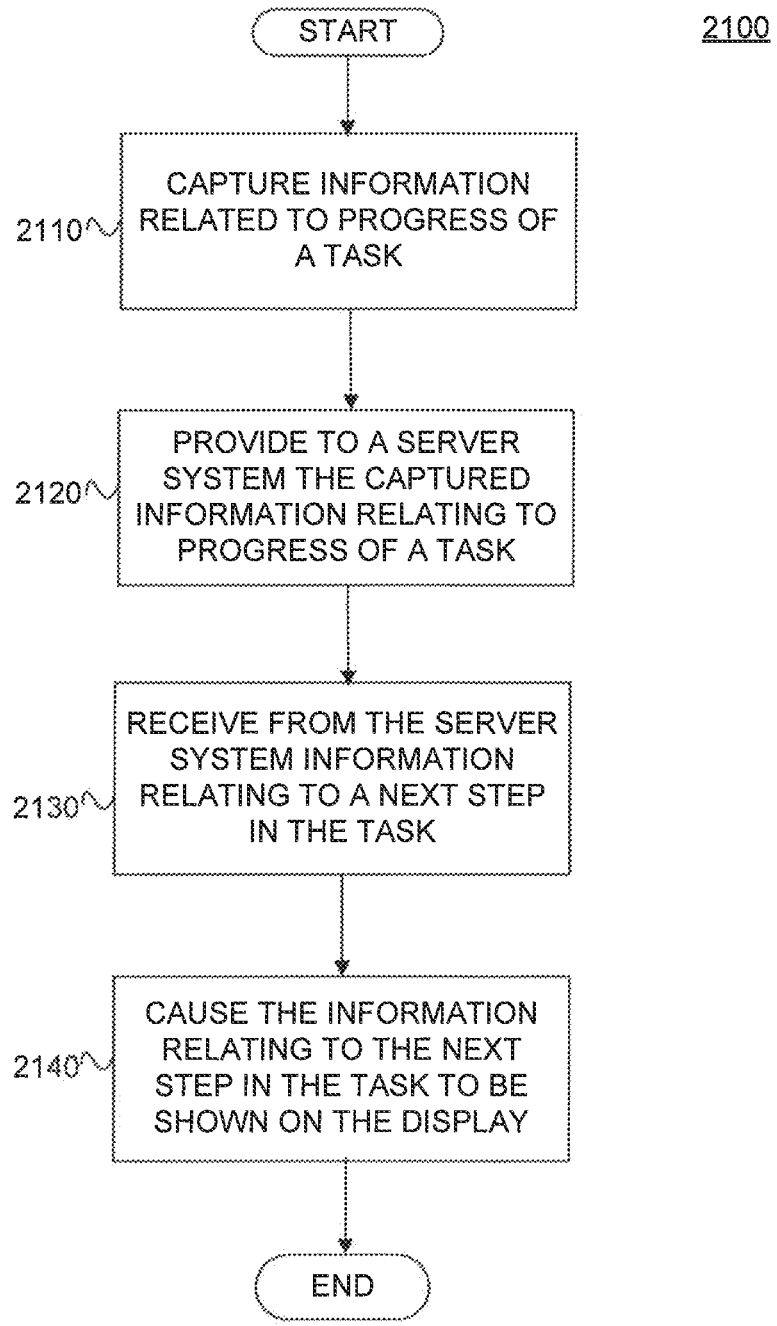
FIG. 21 is a flowchart of an exemplary process for providing task-based instructions via an AR device consistent with disclosed embodiments.

FIG. 21 is a flowchart of an exemplary process 2100 for providing task-based instructions via an AR device consistent with disclosed embodiments. As an example, one or more steps of process 2100 may be performed by AR device 200 shown in FIG. 2.

At step 2110, AR device 200 may capture information relating to progress of a task. For example, a data input device (e.g., camera 203, microphone 205, display 204) of AR device 200 may capture information relating to progress of a task and provide the information to a processing device of AR device 200. For example, the data input device may include an image capture device configured to acquire image data during performance of steps in the task.

At step 2120, AR device 200 may provide to a server system, via a network interface, the captured information relating to progress of the task. For example, the processing device of AR device 200 may execute instructions of network interaction services 372 to perform this step. The network interface may include one or more of an Internet connection, a cellular connection, a WAN connection, or a LAN connection, or any other type of network connection.

In some embodiments, AR device 200 may also provide an identifier of AR device 200 to the server system. In some embodiments, the server system may include an enterprise resource planning system.

At step 2130, AR device 200 may receive from the server system, via the network interface, information relating to a next step in the task. For example, the processing device of AR device 200 may execute instructions of network interaction services 372 to perform this step. Alternatively, AR device 200 may retrieve a video instruction for performing a next step in the task from a memory included in AR device 200. The information received from the server may include a video instruction, a text-based instruction, a graphical-based instruction, or an audible instruction for performing the next step in the task. At step 2140, AR device 200 may cause the information relating to the next step in the task to be shown on the display. For example, the processing device of AR device 200 may execute instructions of rendering services module 370 to perform this step. The information relating to the next step in the task may be shown at a predetermined location on the display. A user of AR device 200 may subsequently follow the information and cause the next step in the task to be performed. In some embodiments, the data input device may include a voice recognition module configured to determine that the user has audibly confirmed completion of a task step. In some embodiments, the data input device may include a button for the user to press to confirm completion of a task step. In some embodiments, the processing device of AR device 200 may cause an indication to be sent to the server system after completion of the task step.

Controlling an on-Board Component

In one embodiment, an interface is disclosed for controlling an on-board component without relying upon voice or button activated controls.

For example, consistent with an embodiment, a wearable device may control one or more operations of an on-board component. The device may comprise a display and at least one sensor configured to provide an output indicative of a viewing direction of a user (e.g., an orientation of a head of a user and/or a gaze direction of the eyes of a user). The device may further comprise at least one processing device configured to cause at least one graphical icon associated with a control of at least one aspect of the on-board component to be shown on the display such that the user perceives the location of the at least one graphical icon as fixed relative to real world coordinates; determine, based on the output of the at least one sensor, whether the user is looking in a direction of the at least one graphical icon; and initiate the control of the at least one aspect of the on-board component when the user is determined to be looking in the direction of the at least one graphical icon.

Figure 22:
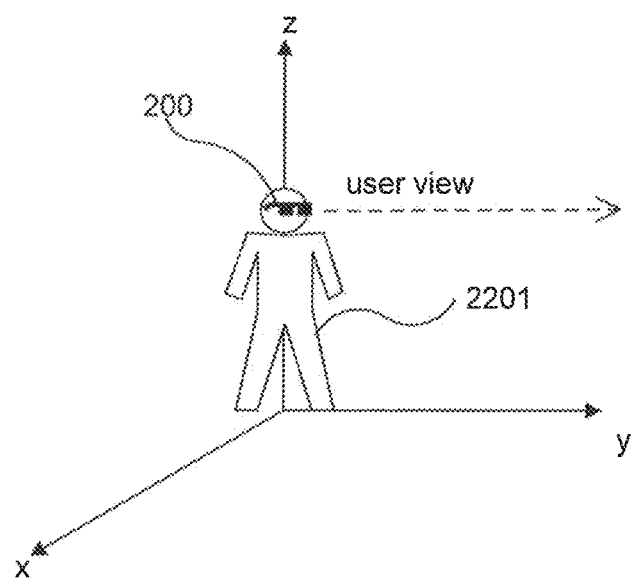
FIG. 22 illustrates an example of a user wearing an AR device to control operation of an on-board component consistent with disclosed embodiments.

FIG. 22 illustrates an example of a user wearing an AR device configured to control an operation of an on-board component consistent with disclosed embodiments. As shown in FIG. 22, user 2201 is in an environment 2200 and is wearing AR device 200, as discussed above regarding FIG. 2. The processing device of AR device 200 may be configured to display a graphical icon and/or text associated with controlling one or more on-board components on display 204. For example, the processing device may be configured to display a graphical icon associated with controlling an on-board component on display 204 in response to detecting that a button of AR device 200 is pressed by user 2201. In some embodiments, user 2201 may cause AR device 200 to operate an on-board component by changing the orientation of his or her head and/or eyes. For example, user 2201 may look in a direction of the graphical icon associated with controlling the on-board component for a certain period of time, and cause AR device 200 to initiate the control of an aspect of the on-board component.

As discussed above, AR device 200 may include sensor array 125, which may include one or more sensors configured to detect a viewing direction of user 2201. For example, the processing device of AR device 200 may be configured to determine whether user 2201 is looking in a direction of the graphical icon based on the monitored orientation of the head and/or eyes of user 2201. In some embodiments, positional processing module 378 shown in FIG. 3 may be configured to store instructions that, when executed by a processing device (e.g., microprocessor 208) of AR device 200, determine whether user 2201 is looking in a direction of the graphical icon on output from the one or more sensors.

For example, the processing device may determine the direction of the user's sight line based on the monitored orientation of the head of user 2201 and/or the gaze direction of the eyes of user 2201. The processing device may identify a region on display 204 that includes the graphical icon associated with controlling the on-board component. The identified region may be the same as or slightly larger than the area the graphical icon occupies. If the direction of the user's sight line falls into the identified region, the processing device may determine that user 2201 is looking in the direction of the graphical icon and initiate operation of the on-board component. On the other hand, if the direction of the user's sight falls outside the identified region, the processing device may determine that user 2201 is not looking in the direction of the graphical icon associated with control of the on-board component, and thus, may not initiate control of the on-board component.

In some embodiments, the processing device may be configured to determine a time duration that user 2201 looks in a direction of the location of the graphical icon associated with controlling the on-board component based on output received from the sensor. For example, the sensors of AR device 200 may sense the orientation of the user's head and/or gaze direction of the user at a predetermined time interval (e.g., 2, 4, 6, 10 or more times per second) and provide an output to the processing device.

The processing device may determine the time duration that user 2201 looks in a direction of the graphical icon based on whether the sensed viewing direction of the user's head and/or gaze direction changes from the previously detected viewing direction. For example, if the currently detected viewing direction stays unchanged from the previously detected viewing direction (e.g., at the last time interval), the processing device may increase the amount of time that the user has looked in the direction of the graphical icon by the predetermined time interval. If the currently detected viewing direction changes from the previously detected orientation, the processing device may determine that the user has moved the direction of his or her sight line away from the graphical icon and may reset the amount of elapsed time that the user has looked in the graphical icon to zero. If the time duration that the user 2201 looks in a direction of the graphical icon is less than a predetermined time threshold, the processing device may determine that user 2201 does not intend to initiate control of the on-board component and may not take any action. On the other hand, if the time duration that the viewing direction of user 2201 stays in a detected viewing direction is greater than or equal to the predetermined time threshold, the processing device may determine that user 2201 intends to control operation of the on-board component and may initiate the control of the on-board component.

In some embodiments, as discussed above, alternative or in addition to monitoring an orientation of the user's head, the processing device of AR device 200 may be configured to monitor a user's gaze direction based on output received from one or more eye tracking sensors. For example, the processing device may be configured to determine whether user 2201 is looking in a direction of the graphical icon based on the detected gaze direction of user 2201.

Figure 23A:
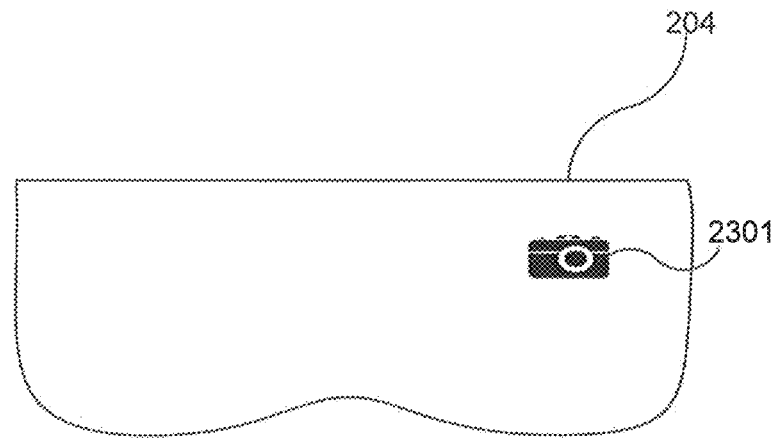
FIG. 23A illustrates an example of a graphical icon associated with controlling an on-board component of an AR device consistent with disclosed embodiments.

FIG. 23A illustrates an example of a graphical icon associated with controlling an on-board component of an AR device consistent with disclosed embodiments. For example, rendering services module 370, discussed above in reference to FIG. 3, may store software instructions that, when executed by a processing device (e.g., microprocessor 208), cause a graphical icon associated with controlling one or more aspects of an on-board component to be displayed.

As shown in FIG. 23A, a graphical icon 2301 associated with control of an on-board component is displayed on display 204 of AR device 200. In some embodiments, the on-board component of AR device 200 may include an on-board camera (e.g., camera 203), and the graphical icon displayed on display 204 may be associated with operations of the on-board camera. For example, graphical icon 2301 may be associated with a power-on function of the on-board camera, an image capture function of the on-board camera, and/or other camera functionality. It should be understood that while a graphical icon is used in connection with control of the on-board component, text, symbols, graphics, and/or a combination thereof may be used for controlling operation of the on-board component without departing from the spirit of the present disclosure.

Graphical icon 2301 may be shown at a predetermined position on display 204, such as the center of display 204, an upper portion of display 204, or any other suitable location. The predetermined location for displaying graphical icon 2301 may be pre-configured by user 2201 through a user interface of AR device 200. For example, display 204 may allow user 2201 to select a location of display 204 at which graphical icon 2301 will be displayed. In some embodiments, after graphical icon 2301 is displayed at a pre-set location, user 2201 may be allowed to drag graphical icon 2301 to another location on display 204 that is preferred by user 2201. For example, the processing device of AR device 200 may set the new location as a default location for displaying graphical icon 2301, and display graphical icon 2301 at the new location when AR device 200 receives user input to display the graphical icon associated with control of the on-board component. In other embodiments, the location of graphical icon 2301 may be locked to a predetermined position of display 204 such that user 2201 cannot reposition the graphical icon.

After graphical icon 2301 associated with control of the on-board component is provided on display 204, AR device 200 may be configured to display graphical icon 2301 in a fixed location relative to real world coordinates. For example, the user may perceive that graphical icon 2301 is located at a particular location in the real world, and when the user moves or looks away from that particular location, graphical icon 2301 may not appear on the display. That is, the display of graphical icon 2301 may depend not only on the specific viewing direction of the user, but also the physical location of the user. Even if the viewing direction of the user remains the same, if the physical location of the user changes, graphical icon 2301 may disappear from the display. Graphical icon 2301 may reappear on the display when the user looks again at the particular location in the real world.

In other embodiments, graphical icon 2301 may be provided at a fixed, perceived location relative to the user, such as in an unlocked mode. For example, graphical icon 2301 may appear on the display whenever the head and/or eyes of user 2201 is moved to a particular viewing direction (e.g., a certain degree to the right direction, regardless the physical location of the user in the real world). Once graphical icon 2301 is displayed, the location of graphical icon 2301 may be changed as the user rotates his or her head and/or eyes toward the icon. For example, once graphical icon 2301 is shown on the display, subsequent head and/or eye movements further in the upward direction may cause the location of graphical icon 2301 to move downward on the display. Similarly, subsequent head and/or eye movements in a downward direction may cause the location of graphical icon 2301 to move upward on the display. Additionally, the processing device may be configured to also cause changes in the left-right position of the graphical icon relative to the display in response to detected horizontal movements of the user's head and/or eyes (e.g., right-left changes in the looking direction of the user's head and/or eyes).

Figure 23B:
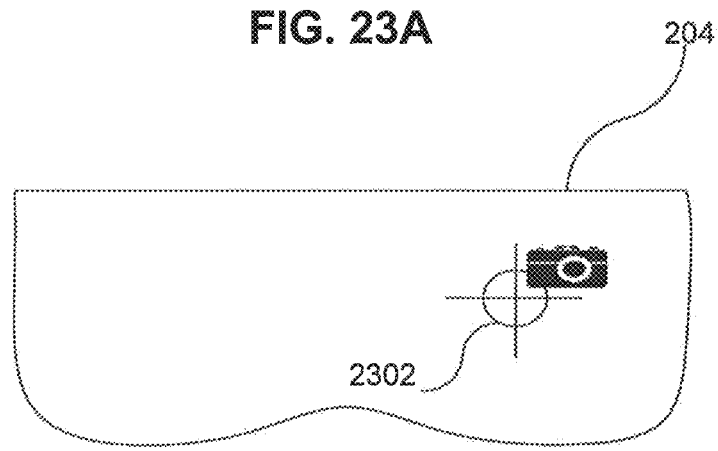
FIG. 23B illustrates an example of accessing a graphical icon associated controlling an on-board component of an AR device consistent with disclosed embodiments.

FIG. 23B illustrates an example of accessing a graphical icon displayed by an AR device that is associated with controlling an on-board component consistent with disclosed embodiments. As shown in FIG. 23B, a reticle 2302 may be shown on display 204. While a cross-hair shape is used in FIG. 23B, reticle 2302 may have any suitable shape. For example, reticle 2302 may be represented as a cross shape, a dot, a circle, a square, an arrow, etc. In some embodiments, the reticle may be represented on the display as one or more icons, still or video images, or text. Various aspects of the reticle may be changed by user input. For example, the size, color, shape, orientation, or any other attribute associated with the reticle may be changed according to user input provided via a user interface of AR device 200.

Reticle 2302 may constitute a virtual reticle shown on display 204 whose position on display 204 may be changed in response to user input. For example, one or more eye tracking sensors, as described above, may enable tracking of a user's gaze direction, and the position of reticle 2304 on display 204 may be changed with determined changes in the user's gaze direction.

In some embodiments, reticle 2302 may be fixed relative to display 204 (e.g., may be physical inscribed or otherwise marked on display 204 or any other suitable component of AR device 200) such that reticle 2302 moves with changes in the user's head orientation and/or direction of the user's gaze. In such embodiments, reticle 1001 may be used, e.g., to selectively overlap with and select portions of graphical icon 2301 that remains unlocked relative to display 204 and fixed relative to real world coordinates.

For example, if the processing device determines that the position of reticle 2302 is moved to intercept a portion of graphical icon 2301, the processing device may cause graphical icon 2301 to be highlighted on display 204. By highlighting graphical icon 2301, the processing device of AR device 200 may provide an indication to user 2201 that graphical icon 2301 may be selected if the user continues looking in the direction of graphical icon 2301 for a certain period of time. In some embodiments, if the processing device determines that the position of reticle 2302 is moved to intercept a portion of graphical icon 2301, the processing device may cause aspects of the reticle to be changed to provide an indication to user 2201 that graphical icon 2301 may be selected by further user actions, such as looking in the direction of graphical icon 2301 for a certain period of time. For example, the color of reticle 2302 may be changed when the position of reticle 2302 is moved to intercept a portion of the graphical icon 2301.

In some embodiments, reticle 2302 may be shown at the center of display 204 when it is initially turned on, and may be moved to other locations in response to user input. For example, user 401 may drag reticle 2302 from one position to another position on display 204 by touching display 204. Alternatively or additionally, the processing device may be configured to move the position of reticle 2302 in response to sensed changes in the user's gaze direction (e.g. using eye tracking, as discussed above). Further, as discussed above, the position of reticle 2302 relative to graphical icon 2301 may be changed by tracking the user's viewing direction (e.g., head orientation and/or gaze direction0 and updating the position on display 204 at which graphical icon 2301 is displayed as the user's viewing direction changes. The processing device may move the position of graphical icon 2301 the opposite direction as the detected direction of the movement of the head and/or eyes of user 401, such that reticle 2302 intercepts graphical icon 2301.

Once reticle 2302 is moved into a position that intercepts a portion of graphical icon 2301, the processing device of AR device 200 may cause graphical icon 2301 to be highlighted on display 204. Subsequently, user 2201 may cause graphical icon 2301 to be selected by looking in the direction of graphical icon 2301. Alternatively, user 2201 may cause graphical icon 2301 to be selected by pressing the portion of the display at which reticle 2302 is located for a certain period of time. In some embodiments, user 2201 may cause graphical icon 2301 to be selected by pressing a physical button that is placed on AR device 200.

If the processing device of AR device 200 detects that graphical icon 2301 is selected (e.g., by determining that user 2201 is looking in a direction of the graphical icon), the processing device may initiate control of certain aspect of an on-board component. For example, the on-board component may include an on-board camera, and the processing device may cause the on-board camera to be powered on in response to the detected selection of graphical icon 2301. As another example, the processing device may cause the image capture function of the on-board camera to be turned on in response to the detected selection of graphical icon 2301. In another example, the processing device may cause an image to be captured by the on-board camera on in response to the detected selection of graphical icon 2301.

In some embodiments, the on-board component may include an on-board microphone, and a graphical icon associated with operations of the microphone may be displayed on display 204. For example, the processing device of AR device 200 may cause the on-board microphone to be powered on in response to the detected selection of graphical icon. As another example, the processing device may cause the audio recording function of the on-board microphone to be turned on in response to the detected selection of the graphical icon.

In some embodiments, in response to a detected selection of a graphical icon that is associated with control of an on-board component, the processing device of AR device 200 may cause a menu of control icons to be shown on the display. The menu of control icons may include operations associated with different aspects of the on-board component, thereby allowing the user to control a particular aspect of the on-board component as desired.

Figure 23C:
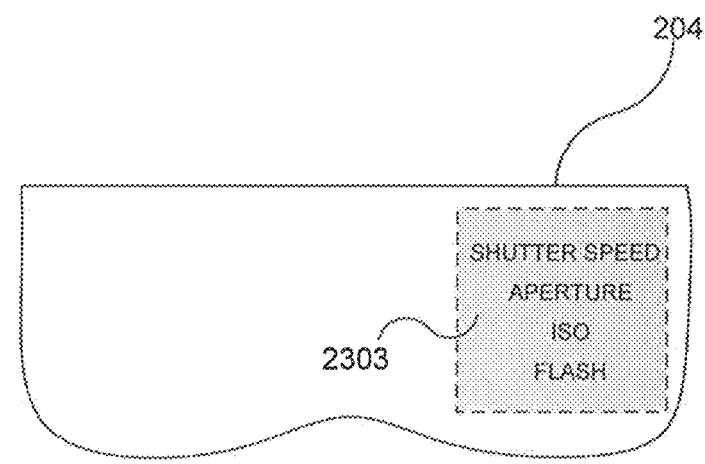
FIG. 23C illustrates an example of a menu of operations associated with an on-board camera associated with an AR device consistent with disclosed embodiments.

FIG. 23C illustrates an example of a menu of operations associated with an on-board camera that is displayed by an AR device consistent with disclosed embodiments. For example, rendering services module 370, discussed above in reference to FIG. 3, may store software instructions that, when executed by a processing device (e.g., microprocessor 208), cause a control menu to be displayed. The control menu may include text, symbols, graphics, and/or a combination thereof.

As shown in FIG. 23C, in response to the detected selection of graphical icon 2301 (e.g., by determining that user 2201 is looking in a direction of the graphical icon), the processing device of AR device 200 may cause a camera control menu 2303 to be displayed on display 204 of AR device 200. The camera control menu 2303 may include text, icons, and/or symbols associated with one or more of shutter speed, aperture, International Standards Organization (ISO), flash, and/or other functions of the on-board camera. Camera control menu 2303 may be semi-transparent such that it is layered on top of the user's field of view and does not completely block the user's field of view. In some embodiments, camera control menu 2303 may be displayed at a location on the display that is the same or near to the location where graphical icon 2301 was displayed such that user 2201 does not need to move his or her sight line drastically in order to make further selections on camera control menu 2303.

After camera control menu 2303 is displayed, the processing device of AR device 200 may cause a particular aspect of the on-board camera to be controlled if the processing device determines that user 2201 is looking in a direction intersecting a particular item shown on camera control menu 2303. For example, if the processing device determines that user 2201 is looking in a direction intersecting menu item "flash" on camera control menu 2303, the processing device may cause the flash function of the on-board camera to be turned on. As another example, if the processing device determines that user 2201 is looking in a direction intersecting menu item "flash" on camera control menu 2303 and the flash function of the camera is currently turned on, the processing device may cause the flash function of the on-board camera to be turned off. In some embodiments, user 2201 may cause a particular item shown on camera control menu 2303 to be selected by moving a reticle to the location of the particular item, touching the portion of the display where the item is shown, pressing a physical button of the device, or the like.

Figure 24:
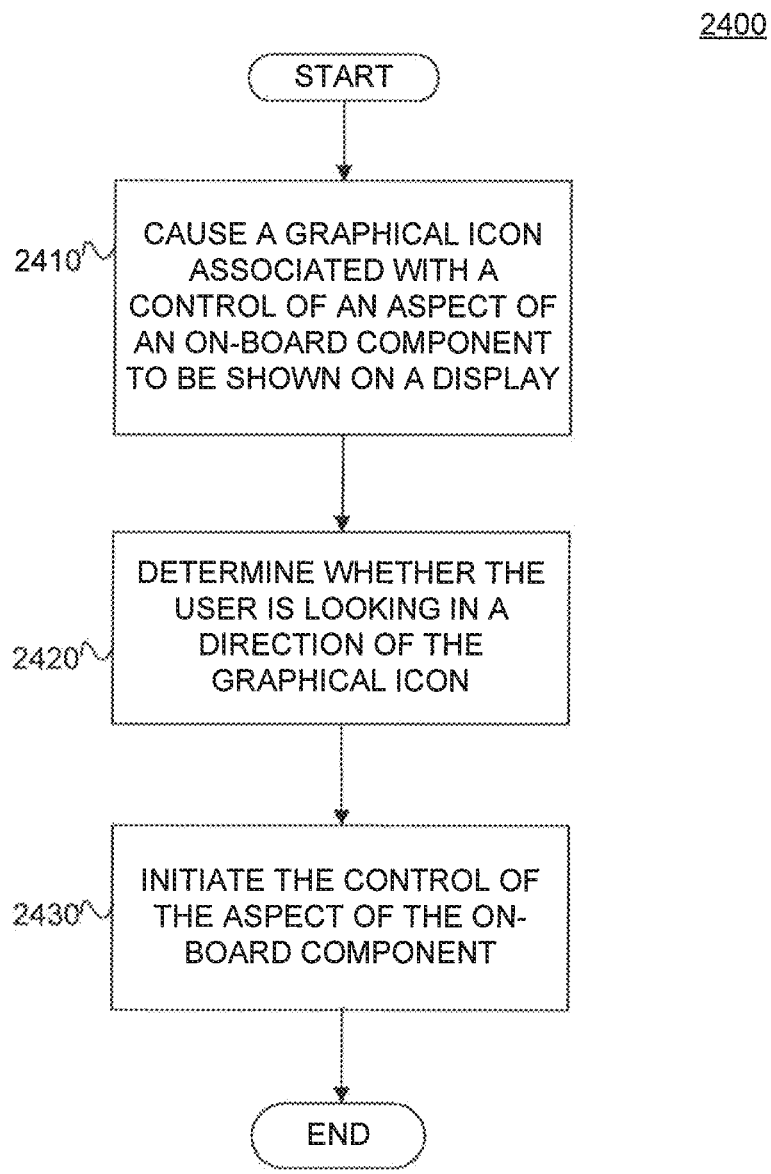
FIG. 24 is a flowchart of an exemplary process for controlling an on-board component of an AR device consistent with disclosed embodiments.

FIG. 24 is a flowchart of an exemplary process 2400 for controlling operation of an on-board component by an AR device consistent with disclosed embodiments. As an example, one or more steps of process 2400 may be performed by AR device 200 shown in FIG. 2. For example, in process 2400, a sensor of AR device 200 may detect a viewing direction (e.g., head orientation or gaze direction) of user 401 and provide a corresponding output to a processing device of AR device 200.

At step 2410, AR device 200 may cause a graphical icon associated with controlling an aspect of an on-board component to be shown on display 204. For example, the processing device of AR device 200 may execute instructions of rendering services module 370 to perform this step. The on-board component of AR device 200 may include a camera. The graphical icon may be associated with a power-on function of the on-board camera, an image capture function of the on-board camera, or any other functions of the on-board camera.

The graphical icon may be displayed in a manner such that the user perceives the location of the graphical icon as fixed relative to real world coordinates. In some embodiments, the processing device may be configured to update a position at which the graphical icon is shown on the display based on the output of the sensor. For example, the location of the graphical icon shown on the display may be changed by a detected movement in the orientation of the head of the user and/or by a detected movement in the gaze of the user's eyes.

At step 2420, AR device 200 may determine, based on the output of the sensor, whether user 2201 is looking in a direction of a selectable element of the graphical icon. For example, the sensor may be configured to provide an output indicative of the viewing direction of the user by tracking a pattern of movement of an orientation of the head of the user. As another example, the sensor may be configured to provide an output indicative of the viewing direction of the user by tracking a gaze of the user's eyes. For example, the processing device of AR device 200 may execute instructions of positional processing module 378 to perform this step. The processing device may determine the direction of the user's sight line based on the viewing direction of user 2201. The processing device may further use coordinates of multiple references points of AR device 200 received from the sensors to determine the direction of the user's sight line.

At step 2430, AR device 200 may control an aspect of the on-board component when user 2201 is determined to be looking in the direction of the graphical icon. Further, in some embodiments, AR device 200 may initiate control of an aspect of the on-board component after the user has looked in the direction of the graphical icon for a predetermined period of time (e.g., 1 second, 2 second, 3 seconds, 5 seconds, 10 seconds, etc.) The processing device of AR device 200 may execute instructions of rendering services module 370, command processor 366, and/or third party applications 362 to perform this step. The on-board component may include an on-board camera, and the control of the aspect of the on-board component may include powering on the on-board camera, capturing an image using the on-board camera, and so on. In some embodiments, a menu of camera control icons may be shown on the display when user 2201 is determined to be looking in the direction of graphical icon. The menu of camera control icons may include icons associated with one or more of shutter speed, aperture, ISO, flash, and so on.

Sharing Information Between Users of AR Devices

In some embodiments, a one-to-many system may enable sharing of information between multiple wearable devices. For example, information available to a particular wearable device user may be made available to multiple other users by showing that information on the displays of the multiple users.

For example, consistent with an embodiment, a system may interact with and share information among a plurality of users of a corresponding plurality of wearable devices. The system may comprise a network interface and at least one processing device associated with the system. The at least one processing device may be configured to receive, via the network interface, information from a first wearable device; select from the plurality of wearable devices one or more designated wearable devices to receive the information; and send, via the network interface, the information to the one or more designated wearable devices.

Figure 25:
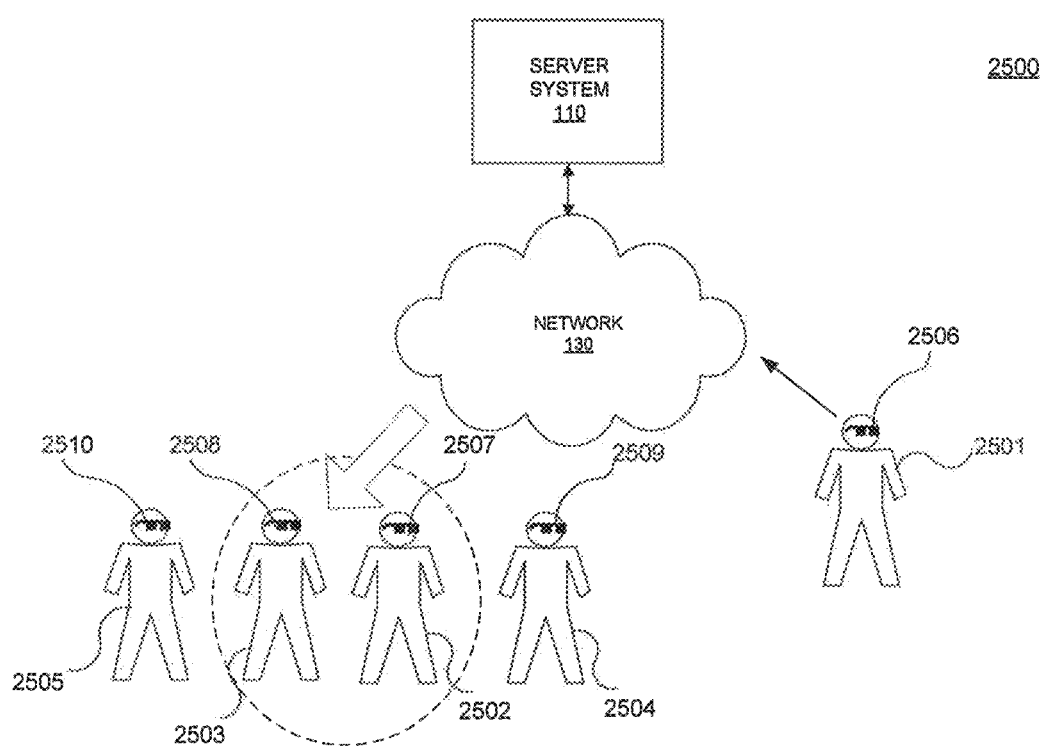
FIG. 25 illustrates an example environment for sharing information between users of AR devices consistent with disclosed embodiments.

FIG. 25 illustrates an example environment 2500 for sharing information between users of AR devices consistent with disclosed embodiments. As shown in FIG. 25, users 2501-2505 each wears an AR device 2506-2510, respectively. AR devices 2506-2510 may include similar components as those of AR device 200 shown in FIG. 2, while each of the AR devices 2506-2510 may be implemented with different hardware components and/or software configurations. AR devices 2506-2510 may communicate with server system 110 via network 130 to share information with one another. Users may share any kind of information (e.g., text, images, audio, and/or video) with one another. For example, user 2501 may share an image retrieved by AR device 2506 with users 2502 and 2503 by sending the image to AR devices 2507 and 2508 via server system 110 and network 130. As another example, user 2501 may share an audio recording retrieved by AR device 2506 with users 2504 and 2505 by sending the audio recording to AR devices 2509 and 2510 via server system 110 and network 130.

Server system 110 may include a network interface for communicating with the AR devices via network 130. For example, server system 110 may include an Internet connection, a cellular connection, a WAN connection, a LAN connection, and/or any other types of network connections that can be used for communication. Server system 110 may receive information from one or more AR devices and send information to one or more AR devices via the network interface.

In some embodiments, when the same information is to be sent to multiple AR devices, server system 110 may be configured to send the information to the AR devices simultaneously through broadcasting or multicasting mechanisms. For example, server system 110 may broadcast certain information on a given time and/or frequency resource such that AR devices 2505-2510 may receive the information at a substantially same time. As another example, server system 110 may multicast certain information to a particular set of AR devices on a given time and/or frequency resource such that the particular set of AR devices may receive the information at a substantially same time, while other AR devices may not receive the information. In other embodiments, server system 110 may be configured to send the information to each of AR devices 2505-2510 individually at a different time and/or using different frequency resources.

Server system 110 may include one or more processing devices configured to execute software instructions programmed to facilitate information sharing between users 2501-2505. For example, the processing devices may execute software instructions to identify a group of users that shares one or more common user attributes, such as a geographic location, an affiliation with certain organization, a hobby, etc. The processing devices may include one or more suitable hardware-based processing devices, such as a microprocessor, controller, central processing unit, etc. that can execute software-based instructions. Such software instructions may be stored, for example, in memory devices (e.g., memory 112). In some embodiments, the software instructions for performing information sharing between users of AR devices may be stored in a computer-readable storage medium, and/or in a database co-located with or remotely located from server system 110.

In some embodiments, server system 110 may include one or more databases (e.g., database 113) for storing information of users of AR devices. For example, server system 110 may include databases for storing profiles of users of AR devices. The user profiles may include information of users such as name, age, location, profession, interests, contacts, and so on. The user profiles may also include user preferences related to information sharing. For example, user 2501 of AR device 2506 may set certain information to be public and accessible to other users. On the other hand, user 2501 may set other information to be private and only accessible to a group of designated users, such as users in a contact list of user 2501. In some embodiments, the user profiles may include user activity data, for example, a history of user activity, such as interactions with other users of AR devices, information retrieved by the user from the server system, locations that the user went to, days and/or times during which the AR device was used by the user, or the like, collected over a certain period of time (e.g., the past week, month, three months, or any other suitable time period).

As shown in FIG. 25, AR device 2506 may send certain information to server system 110 via network 130 in response to a request received from user 2501 to share the information. For example, user 2501 may initiate AR device 2506 to capture an image of the user's current field of view and instruct AR device 2506 to share the image with other users of AR devices. In some embodiments, a graphical icon or text command may be shown on the display of AR device 2506 after the image is captured, allowing user 2501 to share the image with other users. In other embodiments, a virtual menu may be shown on the display of AR device 2506 after the image is captured, and user 2501 may initiate sharing of the image by selecting a corresponding item on the virtual menu. After detecting the selection of the graphical icon, text command, or menu item, AR device 2506 may send the captured image to server system 110 for sharing with other users.

In some embodiments, user 2501 may request that AR device 2506 share certain information before the particular information is acquired by the AR device. For example, user 2501 may request that AR device 2506 share an image of the user's current field of view before the image is captured. User 2501 may select a graphical icon or text command on the display of AR device 2506, indicating a request to share an image of the user's current field of view with other users. In response, AR device 2506 may cause the image to be captured and then send the captured image to server system 110 for sharing with other users without requiring further input from user 2501.

In some embodiments, user 2501 may designate one or more users for sharing the information with, and AR device 2506 may send information from the designated users to server system 110 along with the information to be shared. For example, user 2501 may select one or more users from the contact list to receive the shared information, and AR device 2506 may send identifiers of the selected users to server system 110 along with the information to be shared. As another example, AR device 2506 may retrieve identifiers of the AR devices corresponding to the selected users, and send identifiers of the AR devices to server system 110 along with the information to be shared. As another example, user 2501 may input names of the users to receive the shared information. In response, AR device 2506 may retrieve identifiers of the users corresponding to the names, and send the user identifiers to server system 110 along with the information to be shared.

After receiving the shared information from AR device 2506, server system 110 may select one or more designated AR devices to receive the shared information. For example, if user identifiers are provided by AR device 2506 along with the shared information, server system 110 may retrieve, from the database, information of the corresponding AR devices based on the received user identifiers, and send the shared information to the corresponding AR devices. As another example, if identifiers of the AR devices for receiving the shared information are provided by AR device 2506, server system 110 may send the shared information to the corresponding AR devices without having to look up the information of the AR devices in the database. In another example, if the shared information is marked as public and may be shared with all users of AR devices or all users of AR devices belonging to, for example, a particular user group, server system 110 may retrieve, from the database, information of the users and the corresponding AR devices that have subscribed to receive information from user 2501, and send the shared information to the corresponding AR devices.

In some embodiments, if user 2501 does not designate any users to receive the shared information, a default setting may be applied for selecting the users to receive the shared information. For example, if user 2501 does not designate any users to receive the shared information, server system 110 may determine that the information may be publicly shared, and thus, any users of AR devices may receive the information. As another example, if user 2501 does not designate any users to receive the shared information, server system 110 may determine that the information may be shared among users who are listed as contacts of user 2501, and thus, only users that are contacts of user 2501 may receive the information. Alternatively, if user 2501 does not designate any users to receive the shared information, server system 110 may share the information among the users that were previously designated by user 2501 as users to share information with in a previous request by user 2501. In some embodiments, if user 2501 does not designate any users to receive the shared information, server system 110 may send a message to AR device 2506 requiring information of the designated users to receive the shared information. AR device 2506 may then display a message on the display, prompting user 2501 to provide input as to the users to receive the shared information.

In some embodiments, if user 2501 does not designate any users to receive the shared information, server system 110 may analyze the user profile of user 2501 and other users of AR devices, and select the users to receive the shared information based on the user profiles. For example, server system 110 may identify a commonality between user 2501 and other users, and send the shared information to the users that have the commonality. The commonality may be a location, an affiliation, a profession, an interest, and/or any other attributes that can be identified based on profiles of the users. In some embodiments, in addition to sending the shared information to the users that have a commonality with user 2501, server system 110 may also send a message to user 2501 including information of the users that receive the shared information, such as name and/or location of the users, and the identified commonality between user 2501 and the users that receive the shared information.

In some embodiments, a combination of commonalties may be used to select users to receive the shared information. For example, server system 110 may identify users that share both the same location and same interest as that of user 2501 and send the received information to these users. Referring to FIG. 25, for example, after receiving the shared information from user 2501, server system 110 may analyze the user profiles of users 2501-2505, identify that user 2502 and user 2503 share the same location and interest with user 2501, and then send the received information to user 2502 and user 2503.

After receiving the shared information, each of the AR devices may cause the information to be shown on a display such that the shared information can be accessible by the users of the AR devices. For example, the shared information may be displayed at a predetermined location on the display of the AR devices. The predetermined location at which the shared information is displayed may be pre-configured by the users of the AR devices. In some embodiments, the shared information may be shown on a portion of the display of the AR device so that the shared information does not block the view of the user. In other embodiments, AR device may display the shared information on the display such that the shared information is semi-transparent and the user can view his or her environment behind the shared information. When the shared information includes an audio recording, each of the AR devices may cause the audio recording to be played by the AR devices. In other embodiments, real time video from one user may be streamed to a portion of the display of the AR devices of one or more other users.

In some embodiments, a notification may be first displayed on the display of the AR device prior to the display of the shared information, notifying the user receipt of the shared information. The notification may also indicate an identity of the sending user. In some embodiments, the notification may indicate certain features of the shared information, such as the type of the shared information, the size of the shared information, the time at which the shared information was received, or the like. In some embodiments, along with the notification, the display of the AR device may also show operations associated with the shared information that the user may select to perform. For example, an option may be shown on the display allowing the user to access the shared information. As another example, an option may be shown on the display allowing the user to access the shared information at a later time. In another example, an option may be shown on the display allowing the user to delete the shared information without viewing the information. It should be understood that the AR devices that receive the shared information may have different hardware and/or software configurations, and the shared information and/or the notification may be displayed in a same or different manner in each of the AR devices.

In some embodiments, another user may respond to the shared information with audio and/or images related to the shared information. For example, a user of an AR device may send an image (e.g., an image of an engine) to another person using anther device (e.g., a similar or different AR device, or another computing device, such as a smartphone, tablet, etc.) who is located elsewhere and who may respond with screen annotations and/or audible instructions to help guide the user. The screen annotations and/or audible instructions may assist the user (e.g., providing instructions to the user related to the engine).

In some embodiments, a user of the AR device may also request to access information associated with another user via server system 110 and network 130. For example, user 2501 may wish to access an image of the current field of view of user 2502, and user 2501 may request user 2502 to share the image via server system 110 and network 130. In response to a user input from user 2501, AR device 2506 may send a request to server system 110, requesting user 2502 to share an image of the user's current field of view. Server system 110 may forward the request to AR device 2507 and inquire whether user 2502 will accept the request to share the image. After receiving the request, AR device 2507 may cause a message to be shown on the display, indicating to user 2502 that a request to share the image is received from user 2501 and inquiring whether user 2502 will accept the request. If user 2502 provides an input rejecting the request, AR device 2507 may send a response to server system 110, indicating that the request was rejected, and server system 110 may subsequently forward the response to AR device 2506. If user 2502 provides an input accepting the request, AR device 2507 may capture an image of the current field of view of user 2502 and send the image to server system 110. Server system 110 may subsequently forward the image to AR device 2506, which may in turn cause the image to be shown on the display of AR device 2506.

In some embodiments, a user of the AR device may set a degree of sharing with respect to certain information stored on the AR device. For example, user 2501 may select a picture folder on the AR device to be shared with a designated group of users, e.g., user 2502 and user 2503. As a result, when a new picture is added to the picture folder, AR device 2506 may automatically send the picture to server system 110 and request the picture to be shared with user 2502 and user 2503. Server system 110 may then send the picture to AR devices 2507 and 2508 according to the received request from AR device 2506. Similarly, when an existing picture in the picture folder is changed or updated, AR device 2506 may automatically send the updated picture to server system 110 and request the updated picture to be shared with user 2502 and user 2503. Server system 110 may then send the updated picture to AR devices 2507 and 2508 according to the received request from AR device 2506.

As another example, user 2501 may select a picture folder on the AR device to be shared with users that have the same location and interest with user 2501. When a new picture is added to the picture folder, AR device 2506 may automatically send the picture to server system 110 and request the picture to be shared with users that have the same location and interest with user 2501. Server system 110 may then identify the users of AR devices that have the same location and share one or more interests with user 2501 based on the user profiles, and send the picture to the corresponding AR devices. Similarly, when an existing picture in the picture folder is changed or updated, AR device 2506 may automatically send the updated picture to server system 110 and request the updated picture to be shared with users that have the same location and one or more shared interests with user 2501. Server system 110 may then identify the users of AR devices that have the same location and shared interests with user 2501, and send the updated picture to the corresponding AR devices. It should be understood that while in this example location and interest are used as target user attributes in selecting users to receive the shared information, any other attributes associated with the users may be used for the selection of users.

In some embodiments, shared information from multiple users may be organized on the display of an AR device. For example, shared information may be shown on the display of an AR device in a hierarchy (e.g., a scrollable list of selectable images, videos, and/or audio icons). The hierarchy of available information may be shown, for example, on a side of the display or along a top of the display of the AR device.

Figure 26:
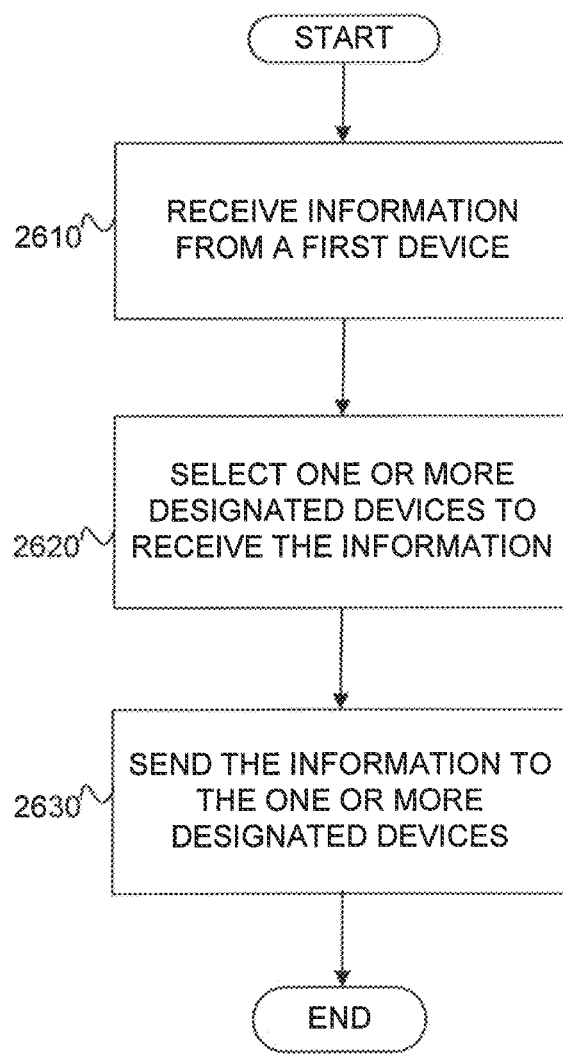
FIG. 26 is a flowchart of an exemplary process for sharing information between users of AR devices consistent with disclosed embodiments.

FIG. 26 is a flowchart of an exemplary process 2600 for sharing information between users of AR devices consistent with disclosed embodiments. As an example, one or more steps of process 2600 may be performed by server system 110 shown in FIG. 1.

At step 2610, server system 110 may receive, via a network interface, information from a first wearable device, such as AR device 200. The network interface may include one or more of an Internet connection, a cellular connection, a WAN connection, a LAN connection, and/or any other types of network connections. The information may include image data retrieved from an image capture device associated with the first wearable device, audio data retrieved from an audio device associated with the first wearable device, text messages retrieved from an input device associated with the first wearable device, and/or a combination thereof.

At step 2620, server system 110 may select from a plurality of wearable devices one or more designated wearable devices to receive the information. For example, the processing device of server system 110 may be configured to select the one or more designated wearable devices based on a predetermined setting retrieved over the network interface. As another example, the processing device may select the one or more designated wearable devices based on an analysis of user profiles of the corresponding plurality of users of the plurality of wearable devices. In some embodiments, the analysis of user profiles may include identifying a commonality of the plurality of users based on the user profiles.

At step 2630, server system 110 may send, via the network interface, the information to the one or more designated wearable devices. In some embodiments, the processing device of server system 110 may further cause the information sent to the designated devices to be shown on a display associated with each of the designated devices.

Figure 27:
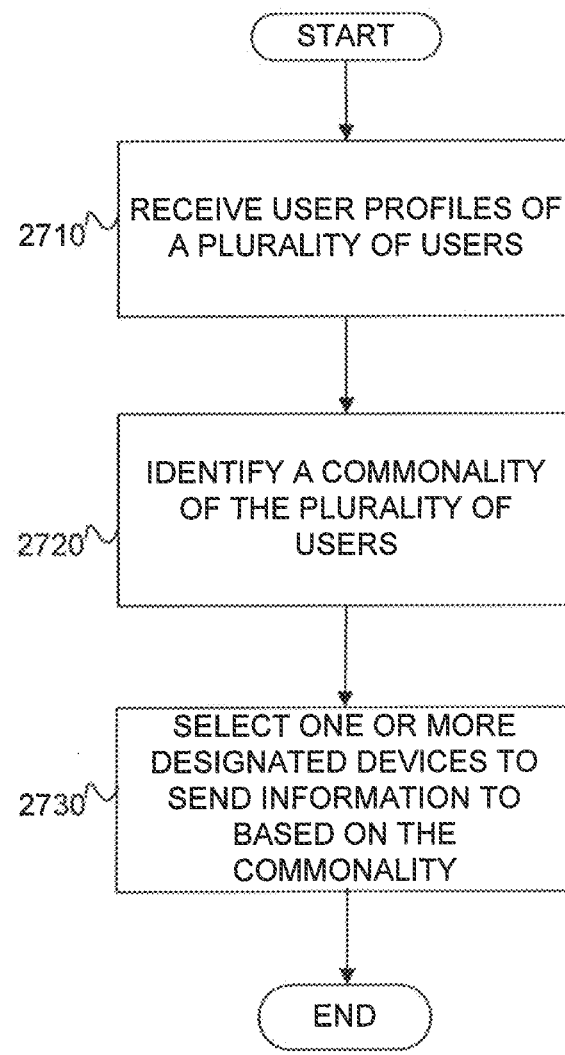
FIG. 27 is a flowchart of an exemplary process for selecting designated AR devices to receive information consistent with disclosed embodiments.

FIG. 27 is a flowchart of an exemplary process 2700 for selecting designated AR devices to receive information consistent with disclosed embodiments. As an example, one or more steps of process 2700 may be performed by server system 110 shown in FIG. 1.

At step 2710, server system 110 may receive user profiles of a plurality of users of corresponding AR devices. For example, the processing device of server system 110 may receive the user profiles from each of the corresponding AR devices via the network interface. As another example, the processing device of server system 110 may receive the user profiles from a database that is co-located with or remotely located from server system 110. In another example, the processing device of server system 110 may receive the user profiles from a third-party system that stores information of the user profiles.

At step 2720, server system 110 may identify a commonality of the plurality of users based on user profiles. For example, the processing device of server system 110 may identify a common user attribute, such as a location, an affiliation, a profession, an interest, and/or any other attributes that can be identified based on the user profiles, among the plurality of users. In some embodiments, the processing device may identify more than one commonality among the plurality of users. For example, the processing device may identify both a location and an interest as commonalities shared by a subset of the plurality of users based on the user profiles.

At step 2730, server system 110 may select one or more designated devices to send information to based on the commonality. For example, the processing device of server system 110 may select the devices corresponding to users that share a certain commonality with a particular user (e.g., the user of the sending device that provides the information) as the receiving devices to send information to. As another example, the processing device may select the devices corresponding to users that share a combination of commonalities with a particular user (e.g., the user of the sending device that provided the information). In some embodiments, the required commonality may be indicated by the sending device that provides the information, and the processing device of server system 110 may select the devices corresponding to users who share the required commonality.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks, floppy disks, or CD ROM, or other forms of RAM or ROM, USB media, DVD, Blu-ray or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets. One or more of such software sections or modules can be integrated into a computer system or existing e-mail or browser software.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A wearable device for providing a user of the wearable device with task-based instructions, the wearable device comprising:
   a display;
   a network interface;
   a data input device configured to capture information relating to progress of a task; and
   at least one processing device configured to:
     provide to a server system, via the network interface, the captured information relating to progress of the task, wherein the captured information includes an identifier of the wearable device, and the identifier is associated with at least one property of the wearable device;
     receive from the server system, via the network interface, information relating to a next step in the task; and
     cause the information relating to the next step in the task to be shown on the display based on the at least one property of the wearable device.

2. The wearable device of claim 1, wherein the data input device includes an image capture device configured to acquire image data during performance of steps in the task.

3. The wearable device of claim 1, wherein the data input device includes a voice recognition module configured to determine when the user audibly confirms completion of a task step.

4. The wearable device of claim 1, wherein the data input device includes a button for the user to press to confirm completion of a task step.

5. The wearable device of claim 1, wherein the network interface includes one or more of an Internet connection, a cellular connection, a WAN connection, or a LAN connection.

6. The wearable device of claim 1, wherein the information received from the server includes a video instruction for performing the next step in the task.

7. The wearable device of claim 1, wherein the information received from the server includes a text-based instruction for performing the next step in the task.

8. The wearable device of claim 1, wherein the information received from the server includes a graphical-based instruction for performing the next step in the task.

9. The wearable device of claim 1, wherein the information received from the server includes an audible instruction for performing the next step in the task.

10. The wearable device of claim 1, wherein the server system includes an enterprise resource planning system.

11. The wearable device of claim 1, wherein the at least one property of the wearable device is used to identify at least one of hardware and software configurations of the wearable device for the next step in the task.

12. The wearable device of claim 1, the wearable device further comprises receiving, from a user interface, a location on the display at which to display information relating to one or more steps in the task.

13. The wearable device of claim 12, wherein causing the information relating to the next step in the task to be shown on the display comprises causing the information relating to the next step in the task to be shown on the display at the location.

14. A method for providing a user of a wearable device with task-based instructions, the method comprising:
   capturing, via a data input device of the wearable device, information relating to progress of a task;
   providing to a server system, via a network interface, the captured information relating to progress of the task, wherein the captured information includes an identifier of the wearable device, and the identifier is associated with at least one property of the wearable device;
   receiving from the server system, via the network interface, information relating to a next step in the task; and
   causing the information relating to the next step in the task to be shown on a display of the wearable device based on the at least one property of the wearable device.

15. The method of claim 14, wherein the data input device includes an image capture device configured to acquire image data during performance of steps in the task.

16. The method of claim 14, wherein the data input device includes a voice recognition module configured to determine when the user audibly confirms completion of a task step.

17. The method of claim 14, wherein the data input device includes a button for the user to press to confirm completion of a task step.

18. The method of claim 14, further comprising using a voice recognition module to determine when the user audibly confirms completion of a task step.

19. The method of claim 14, wherein the captured information relating to progress of the task is received via a button for the user to press to confirm completion of a task step.

20. The method of claim 14, wherein the network interface includes one or more of an Internet connection, a cellular connection, a WAN connection, or a LAN connection.

21. The method of claim 14, wherein the information received from the server includes a video instruction for performing the next step in the task.

22. The method of claim 14, wherein the information received from the server includes a text-based instruction for performing the next step in the task.

23. The method of claim 14, wherein the information received from the server includes a graphical-based instruction for performing the next step in the task.

24. The method of claim 14, wherein the information received from the server includes an audible instruction for performing the next step in the task.

25. A non-transitory computer-readable storage medium storing program instructions executable by at least one processor to perform a method for providing a user of a wearable device with task-based instructions, the method comprising:
   capturing, via a data input device of the wearable device, information relating to progress of a task;
   providing to a server system, via a network interface, the captured information relating to progress of the task, wherein the captured information includes an identifier of the wearable device, and the identifier is associated with at least one property of the wearable device;
   receiving from the server system, via the network interface, information relating to a next step in the task; and
   causing the information relating to the next step in the task to be shown on a display of the wearable device based on the at least one property of the wearable device.

26. A wearable device for providing a user of the wearable device with task-based instructions, the wearable device comprising:
   a display;
   a network interface;
   a data input device configured to capture information relating to progress of a task; and
   at least one processing device configured to:
      provide to a server system, via the network interface, the captured information relating to progress of the task, wherein the captured information includes an identifier of the wearable device, and the identifier is associated with at least one property of the wearable device;
      receive from the server system, via the network interface, annotation information and information relating to a next step in the task, wherein the annotation information is associated with at least one object in an environment of the user; and
      cause the information relating to the next step in the task and the annotation information to be shown on the display based on the at least one property of the wearable device.

* * * * *